US010402655B2

(12) United States Patent
Javan Roshtkhari et al.

(10) Patent No.: US 10,402,655 B2
(45) Date of Patent: Sep. 3, 2019

(54) SYSTEM AND METHOD FOR VISUAL EVENT DESCRIPTION AND EVENT ANALYSIS

(71) Applicant: Sportlogiq Inc., Montréal (CA)

(72) Inventors: Mehrsan Javan Roshtkhari, Montréal (CA); Martin Levine, Montréal (CA)

(73) Assignee: Sportlogiq Inc., Montreal (CA)

( * ) Notice: Subject to any disclaimer, the term of this patent is extended or adjusted under 35 U.S.C. 154(b) by 0 days.

(21) Appl. No.: 15/388,666

(22) Filed: Dec. 22, 2016

(65) Prior Publication Data

US 2017/0103264 A1    Apr. 13, 2017

Related U.S. Application Data

(63) Continuation of application No. PCT/CA2015/050569, filed on Jun. 19, 2015.

(Continued)

(51) Int. Cl.
 *G06K 9/00* (2006.01)
 *G06K 9/46* (2006.01)
 (Continued)

(52) U.S. Cl.
 CPC ..... *G06K 9/00718* (2013.01); *G06F 16/7328* (2019.01); *G06F 16/7847* (2019.01);
 (Continued)

(58) Field of Classification Search
 CPC combination set(s) only.
 See application file for complete search history.

(56) References Cited

U.S. PATENT DOCUMENTS

| 6,434,522 B1 * | 8/2002 | Tsuboka ............... G10L 15/144 |
| | | 704/222 |
| 7,949,050 B2 | 5/2011 | Xu et al. |

(Continued)

FOREIGN PATENT DOCUMENTS

| WO | 2014055874 A1 | 4/2014 |
| WO | 2014070013 A1 | 5/2014 |

OTHER PUBLICATIONS

Derpanis, K.G. et al.; "Efficient Action Spotting Based on a Space-time Oriented Structure Representation"; Computer Vision and Pattern Recognition (CVPR), 2010 IEEE Conference on; 2010; pp. 1990-1997.

(Continued)

*Primary Examiner* — Alex Kok S Liew
(74) *Attorney, Agent, or Firm* — Brett J. Slaney; Blake, Cassels & Graydon LLP

(57) ABSTRACT

A system and method are provided for analyzing a video. The method comprises: sampling the video to generate a plurality of spatio-temporal video volumes; clustering similar ones of the plurality of spatio-temporal video volumes to generate a low-level codebook of video volumes; analyzing the low-level codebook of video volumes to generate a plurality of ensembles of volumes surrounding pixels in the video; and clustering the plurality of ensembles of volumes by determining similarities between the ensembles of volumes, to generate at least one high-level codebook. Multiple high-level codebooks can be generated by repeating steps of the method. The method can further include performing visual event retrieval by using the at least one high-level codebook to make an inference from the video, for example comparing the video to a dataset and retrieving at least one similar video, activity and event labeling, and performing abnormal and normal event detection.

26 Claims, 34 Drawing Sheets

Related U.S. Application Data

(60) Provisional application No. 62/016,133, filed on Jun. 24, 2014.

(51) Int. Cl.
*G06K 9/62* (2006.01)
*G06F 16/783* (2019.01)
*G06F 16/732* (2019.01)

(52) U.S. Cl.
CPC ..... *G06K 9/00758* (2013.01); *G06K 9/00765* (2013.01); *G06K 9/4676* (2013.01); *G06K 9/6215* (2013.01); *G06K 9/6219* (2013.01); *G06K 9/6224* (2013.01); *G06K 9/6284* (2013.01)

(56) References Cited

U.S. PATENT DOCUMENTS

| 2007/0201558 A1* | 8/2007 | Xu ..................... G06K 9/00765 375/240.22 |
| 2013/0113877 A1 | 5/2013 | Sukthankar et al. |
| 2013/0246055 A1* | 9/2013 | Gao ........................ G10L 19/04 704/205 |
| 2015/0206026 A1* | 7/2015 | Kim ..................... G06K 9/4642 382/170 |

OTHER PUBLICATIONS

Schuldt, C. et al.; "Recognizing Human Actions: A Local SVM Approach"; International Conference on Pattern Recognition (ICPR'04); vol. 3; 2004; pp. 32-35.
Gorelick, L. et al.; "Actions as Space-Time Shapes"; IEEE Trans. Pattern Anal. Mach. Intell.; vol. 29 (12); 2007; pp. 2247-2253.
Shechtman, E. et al.; "Space-Time Behavior-Based Correlation-OR-How to Tell if Two Underlying Motion Fields are Similar without Computing Them?"; IEEE Trans. Pattern Anal. Mach. Intell.; vol. 29 (11); 2007; pp. 2045-2056.
Efros, AA. et al.; "Recognizing Action at a Distance"; Computer Vision (ICCV), IEEE international Conference on; Oct. 2003; pp. 726-733.
Sadanand, S. et al.; "Action Bank: A High-Level Representation of Activity in Video"; Computer Vision and Pattern Recognition (CVPR), IEEE Conference on; 2012; pp. 1234-1241.
Yuan, J. et al.; "Discriminative Subvolume Search for Efficient Action Detection"; Computer Vision and Pattern Recognition (CVPR), IEEE Conference on, 2009; pp. 2427-2449.
Zhong, H. et al.; "Detecting Unusual Activity in Video"; Computer Vision and Pattern Recognition (CPVR), IEEE Conference on; 2004; vol. 2; pp. 819-826.
Adam, A. et al.; "Robust Real-Time Unusual Event Detection Using Multiple Fixed-Location Monitors"; IEEE Transactions on Pattern Analysis and Machine Intelligence; 30 (3); 2008; pp. 555-560.
Dollar, P. et al.; "Behavior Recognition via Sparse Spatio-Temporal features"; 2nd joint IEEE International Workshop on Visual Surveillance and Performance Evaluation of Tracking and Surveillance; IEEE; 2005; pp. 65-72.
Neibles, C. et al.; "Unsupervised Learning of Human Action Categories Using Spatial-Temporal Words"; Int. J. Comput. Vision; 79 (3); 2008; pp. 299-318.
Savarese, A. et al.; "Spatial-Temporal correlatons for unsupervised action classification"; WMVC; 2008; pp. 1-8.
Wang, L. et al.; "Elastic Sequence Correlation for Human Action Analysis"; IEEE Trans. on Image Processing; 20 (6); Jun. 2011; pp. 1725-1738.
Boiman, O. et al.; "Detecting Irregularities in Images and in Video"; Int. Comput. Vision; 74 (1); 2007; pp. 17-31.
Oikonomopoulos, A. et al.; "Spatiotemporal Localization and Categorization of Human Actions in Unsegmented Image Sequences"; IEEE Trans. Image Processing; 20 (4); 2011; pp. 1126-1140.
Yuan, J. et al.; "Discriminative Video Pattern Search for Efficient Action Detection"; IEEE Trans. on Pattern Analysis and Machine Intelligence; 33 (9); 2011; pp. 1728-1743.
Yuan, G. et al.; "Mid-level features and spatio-temporal context for activity recognition"; Pattern Recognition; 45 (12); 2012; pp. 4182-4191.
Yilmaz, M. A. et al.; "Actions Sketch: A Novel Action Representation"; Computer Vision and Pattern Recognition (CVPR), IEEE Conference on; 2005; pp. 984-989.
Ke, Y. et al.; "Volumetric Features for Video Event Detection"; Int. J. Comput. Vision; 88 (3); 2010; pp. 339-362.
Yao, A. et al.; "A Hough Transform-Based Voting Framework for Action Recognition"; Computer Vision and Pattern Recognition (CVPR), IEEE Conference on; 2010, pp. 2061-2058.
Bregonzio, M. et al.; "Recognising Action as Clouds of Space-Time Interest Points"; Computer Vision and Pattern Recognition (CVPR), IEEE Conference on; 2009; pp. 1543-1955.
Yu, G. et al.; "Unsupervised Random Forest Indexing for Fast Action Search"; Computer Vision and Pattern Recognition (CVPR), IEEE Conference on; 2011; pp. 865-872.
Han, D. et al.; "Selection and Context for Action Recognition"; Computer Vision (ICCV), IEEE International Conference on; 2009; pp. 1933-1940.
Wang, J. et al.; "Action Recognition with Multiscale Spatio-Temporal Contexts"; Computer Vision and Pattern Recognition (CVPR), IEEE Conference on; 2011; pp. 3125-3192.
Kratz, L. et al.; "Anomaly Detection in Extremely Crowded Scenes Using Spatio-Temporal Motion Pattern Models"; Computer Vision and Pattern Recognition (CVPR), IEEE Conference on; 2009; pp. 1446-1453.
Liu, J. et al.; "Learning Human Actions via Information Maximization"; Computer Vision and Pattern Recognition (CVPR), IEEE Conference on; 2008; pp. 1-8.
Zhang, V. et al.; "Spatio-Temporal Phrases for Activity Recognition"; European Conference on Computer Vision (ECCV); vol. 7574; 2012; pp. 707-721; Springer. Berlin/Heidelberg.
Gilbert, A. et al.; "Scale Invariant Action Recognition Using Compound Features Mined from Dense Spatio-temporal corners"; European Conference on Computer Vision (ECCV); 2008; pp. 222-233; Springer-Verlag.
Boiman, O. et al.; "Detecting Irregularities in Images and in Video"; International Journal of Computer Vision; 74 (1); 2007; pp. 17-31.
Mahadevan, V. et al.; "Anomaly Detection in Crowded Scenes"; IEEE Conference on Computer Vision and Pattern Recognition (CVPR); 2010; pp. 1975-1981.
Jodoin, P.M. et al.; "Modeling Background Activity for Behavior Subtraction"; ACM/IEEE International Conference on Distributed Smart Cameras (ICDSC); 2008; pp. 1-10.
Benezeth, Y. et al.; "Abnormal Events Detection Based on Spatio-Temporal Co-occurences"; IEEE Conference on Computer Vision and Pattern Recognition (CVPR); 2009; pp. 2458-2465.
Ke, Y. et al.; "Volumetric Features for Video Event Detection"; International journal of Computer Vision; 88 (3); 2010; pp. 339-362.
Oikonomopoulos, A. et al.; "Spatiotemporal Localization and Categorization of Human Actions in Unsegmented Image Sequences"; IEEE Transactions on Image Processing; 20 (4); 2011; pp. 1126-1140.
Savarese, S. et al.; "Spatial-Temporal correlations for unsupervised action classification"; IEEE Workshop on Motion and Video Computing (WMVC); 2008; pp. 1-8.
Kim, J. et al.; "Observe Locally, Infer Globally: a Space-Time MRF for Detecting Abnormal Activities with Incremental Updates"; IEEE Conference on Computer Vision and Pattern Recognition (CVPR); 2009; pp. 2921-2928.
Zhao, B. et al.; "Online Detection of Unusual Events in Videos via Dynamic Sparse Coding"; IEEE Conference on Computer Vision and Pattern Recognition (CVPR); 2011; pp. 3313-3320.
Al-Saber, E.;International Search Report from corresponding PCT Application No. PCT/CA2015/050569; search completed Aug. 20, 2015.

(56) References Cited

OTHER PUBLICATIONS

Martinez, F.; Search Report from corresponding European Application No. 15812843.9; search completed Nov. 29, 2017.

\* cited by examiner a) A sample video frame from the KTH dataset.

Hierarchical codebook construction for the query video
For a query video, $\mathcal{Q}$, containing a particular action,
- Densely sample the video at all scales and construct spatio-temporal video volumes and their descriptors: $\mathcal{Q} = \{v_j\}_{j=1}^{N_\mathcal{Q}}$
- Construct the low level codebook of video volumes for the query: $\mathbf{C}^\mathcal{L}$
- Construct ensembles of spatio-temporal volumes: $E(x, y, t)$
- Construct the topological models of the ensembles of volumes as described in section 3.2.2.
- Construct the high level codebook, $\mathbf{C}^\mathcal{H}$, to cluster similar ensembles of volumes.
- Remove non-informative codewords from $\mathbf{C}^\mathcal{H}$.

This procedure results in two codewords for a query video containing a particular activity: $\{\mathbf{C}^\mathcal{L}, \mathbf{C}^\mathcal{H}\}$ Similarity map construction for a target video
For each video, $\mathcal{V}$, in the target dataset,
- Densely sample the video at all scales and construct spatio-temporal volumes: $\mathcal{V} = \{v_j\}_{j=1}^{N_\mathcal{V}}$
- Assign each video volume in the target video to the low level codewords of each subset of query videos: $v_j \leftarrow c_k, \quad c_k \in \mathbf{C}^\mathcal{L}$
- Construct an ensemble of volumes at each particular pixel, $E(x, y, t)$
- Construct the topological models of the ensembles of volumes
- Measure similarity between ensembles of STVs in the target video to the high level codebook and assign the most similar codeword to the ensemble:
  $E(x, y, t) \leftarrow c_{k^*}$
  $k^* = \arg\max_k s_{E(x,y,t), c_k}, \quad c_k \in \mathbf{C}^\mathcal{H}$
- The similarity map between the query and target at each point is then constructed as: $\mathcal{S}_{\mathcal{Q},\mathcal{V}}(x, y, t) = s_{E(x,y,t), c_{k^*}}$

SYSTEM AND METHOD FOR VISUAL EVENT DESCRIPTION AND EVENT ANALYSIS

CROSS-REFERENCE TO RELATED APPLICATIONS

This present application is a continuation of PCT Application No. PCT/CA2015/050569 filed on Jun. 19, 2015 which claims priority to U.S. Provisional Application No. 62/016,133 filed on Jun. 24, 2014, both incorporated herein by reference.

TECHNICAL FIELD

The following relates to systems and methods for visual event description and contextual-based event analysis.

BACKGROUND

Human activity analysis is required for a variety of applications including video surveillance systems, human-computer interaction, security monitoring, threat assessment, sports interpretation, and video retrieval for content-based search engines [A1, A2]. Moreover, given the tremendous number of video data currently available online, there is a great demand for automated systems that analyze and understand the contents of these videos. Recognizing and localizing human actions in a video is the primary component of such a system, and also typically considered to be the most important, as it can affect the performance of the whole system significantly. Although there are many methods to determine human actions in highly controlled environments, this task remains a challenge in real world environments due to camera motion, cluttered background, occlusion, and scale/viewpoint/perspective variations [A3-A6]. Moreover, the same action performed by two persons can appear to be very different. In addition, clothing, illumination and background changes can increase this dissimilarity [A7-A9].

To date, in the computer vision community, "action" has largely been taken to be a human motion performed by a single person, taking up to a few seconds, and containing one or more events. Walking, jogging, jumping, running, hand waving, picking up something from the ground, and swimming are some examples of such human actions [A1, A2, A6]. Accordingly, it would be beneficial for a solution to the problem of event recognition and localization in real environments to be provided. It would be further beneficial for such a solution to offer a fast data-driven approach, which describes the content of a video.

Similarly, in a range of applications it would beneficial to provide an automated video surveillance system capable of determining/detecting unusual or suspicious activities, uncommon behaviors, or irregular events in a scene. Accordingly, it would be beneficial to provide a system whose primary objective in respect of automated video surveillance systems is anomaly detection because the sought after situations are not observed frequently. Although the term anomaly is typically not defined explicitly, such systems are based upon the implicit assumption that events that occur occasionally are potentially suspicious, and thus may be considered as being anomalous [B3-B12]. It would also be beneficial if the system were self-starting such that no human training or input was required such that the system establishes anomalies with respect to the context and regularly observed patterns.

Within the prior art, spatio-temporal volumetric representations of human activity have been used to eliminate some pre-processing steps, such as background subtraction and tracking, but have been shown to suffer major drawbacks such as requiring salient point detection in activity detection implementations and ignoring geometrical and temporal structures of the visual volumes due to the non-ordered manner of storage. Further, they are unable to handle scale variations (spatial, temporal, or spatio-temporal) because they are too local, in the sense that they consider just a few neighboring video volumes (e.g., five nearest neighbors in [11] or just one neighbor in [4]). Accordingly, it would be beneficial to have a multi-scale, hierarchical solution which incorporates spatiotemporal compositions and their uncertainties allowing statistical techniques to be applied to recognize activities or anomalies.

As noted above, event understanding in videos is an important element of all computer vision systems either in the context of visual surveillance or action recognition. Therefore, an event or activity should be represented in such a way that it retains all of the important visual information in a compact structure.

In the context of human behavior analysis, many studies have focused on the action recognition problem by invoking human body models, tracking-based methods, and local descriptors [A1]. The early work often depended on tracking [A16-A19], in which humans, body parts, or some interest points were tracked between consecutive frames to obtain the overall appearance and motion trajectory. It is recognized that the performance of these algorithms is highly dependent on tracking, which sometimes fails for real world video data [A20].

Alternatively, shape template matching has been employed for activity recognition; e.g., two-dimensional (2D) shape matching [A23] or its three-dimensional (3D) extensions, as well as exploiting optical flow matching [A13, A24, A25]. In these prior art approaches, action templates are constructed to model the actions and these are then used to locate similar motion patterns. Other studies have combined both shape and motion features to achieve more robust results [A26, A27], claiming that this representation offers improved robustness to object appearance [A26].

In a recent study [A27], shape and motion descriptors were employed to construct a shape motion prototype for human activities within a hierarchical tree structure and action recognition was performed in the joint shape and motion feature space. Although it may appear that these prior art approaches are well suited to action localization, they require a priori high-level representations of the actions to be identified. Further, they depend on such image pre-processing stages as segmentation, object tracking, and background subtraction [A28], which can be extremely challenging when it is considered that in real-world deployments, one typically has unconstrained environments.

Normal events observed in a scene will be referred to herein as the "dominant" behaviors. These are events that have a higher probability of occurrence than others in the video and hence generally do not attract much attention. One can further categorize dominant behaviors into two classes. In the literature on human attention processes, the first usually deals with foreground activities in space and time while the second describes the scene background (by definition, the background includes pixels in the video frames whose photometric properties, such as luminance and color, are either static or stationary with respect to time).

Typically, the detection of the latter is more restrictively referred to as background subtraction, which is the building block of many computer vision algorithms. However, dominant behavior detection is more general and more complicated than background subtraction, since it includes the scene background while not being limited to it. Thus the manner in which these two human attention processes differ is the way that they use the scene information. Most background subtraction methods are based on the principal that the photometric properties of the scene in the video, such as luminance and color, are stationary. In contrast, dominant behavior understanding can be seen as a generalization of the classical background subtraction method in which all of the dynamic contents of the video come into play as well.

In the context of abnormality detection, approaches that focus on local spatio-temporal abnormal patterns are very popular. These rely mainly on extracting and analyzing local low-level visual features, such as motion and texture, either by constructing a pixel-level background model and behavior template [B29, B30, B31, B32] or by employing spatio-temporal video volumes, \emph{STV}s, (dense sampling or interest point selection) [B4, B33, B34, B35, B36, B37, B38, B39, B40, B41, B42, B43, B68, B31]. In large part, the former relies on an analysis of the activity pattern (busy-idle rates) of each pixel in each frame as a function of time. These are employed to construct a background model, either by analyzing simple color features at each pixel [B29] or more complex motion descriptors [B8, B32].

More advanced approaches also incorporate the spatio-temporal compositions of the motion-informative regions to build background and behavior templates [B31, B43, B44]} that are subtracted from newly observed behaviors in order to detect an anomaly. In [B8], dynamic behaviors are modeled using spatio-temporal oriented energy filters to construct an activity pattern for each pixel in a video frame. Generally, the main drawback associated with these methods is their locality. Since the activity pattern of a pixel cannot be used for behavioral understanding, their applicability in surveillance systems is restricted to the detection of local temporal phenomena [B8, B30].

In order to eliminate the requirement for such pre-processing, Derpanis et al. [A10] proposed so-called "action templates". These are calculated as oriented local spatio-temporal energy features that are computed as the response of a set of tuned 3D Gaussian third order derivative filters applied to the data. Sadanand et al. [A29] introduced action banks in order to make these template based recognition approaches more robust to viewpoint and scale variations Recently, tracking and template-based approaches have been combined to improve the action detection accuracy [A18, A30].

In a completely different vein within the prior art, models based on exploiting so-called bags of local visual features have recently been studied extensively and shown promising results for action recognition [A3, A7, A11, A26, A8, A31, A32, A33, A34, A49]. The idea behind the Bag of Visual Words (BOW) comes from text understanding problems. The understanding of a text document relies on the interpretation of its words. Therefore, high-level document understanding requires low-level word interpretation. Analogously, computers can accomplish the task of visual recognition in a similar way.

In general, visual event understanding approaches based on BOW, extract and quantize the video data to produce a set of video volumes that form a "visual vocabulary". These are then employed to form a "visual dictionary". Herein this visual dictionary is referred to as a "codebook". Using the codebook, visual information is converted into an intermediate representation, upon which sophisticated models can be designed for recognition. Codebooks are constructed by applying "coding" rules to the extracted visual vocabularies. The coding rules are essentially clustering algorithms which form a group of visual words based on their similarity [B43]. Each video sequence is then represented as a histogram of codeword occurrences and the obtained representation is fed to an inference mechanism, usually a classifier.

A major advantage of using volumetric representations of videos is that it permits the localization and classification of actions using data driven non-parametric approaches instead of requiring the training of sophisticated parametric models. In the literature, action inference is usually determined by using a wide range of classification approaches, ranging from sub-volume matching [A24], nearest neighbor classifiers [A40] and their extensions [A37], support [A32] and relevance vector machines [A11], as well as even more complicated classifiers employing probabilistic Latent Semantic Analysis (pLSA) [A3].

In contrast, Boiman et al. [A40] have shown that a rather simple nearest neighbor image classifier in the space of the local image descriptors is equally as efficient as these more sophisticated classifiers. This also implies that the particular classification method chosen is not as critical as originally thought, and that the main challenge for action representation is therefore using appropriate features.

However, it may be noted that classical bag of video word (BOW) approaches suffer from a significant challenge. That is, the video volumes are grouped solely based on their similarity, in order to reduce the vocabulary size. Unfortunately, this is detrimental to the compositional information concerning the relationships between volumes [A3, A41]. Accordingly, the likelihood of each video volume is calculated as its similarity to the other volumes in the dataset, without considering the spatio-temporal properties of the neighboring contextual volumes. This makes the classical BOW approach excessively dependent on very local data and unable to capture significant spatio-temporal relationships. In addition, it has been shown recently that detecting anions using an "order-less" BOW does not produce acceptable recognition results [A7, A31, A33, A38, A41-A43].

What makes the BOW approaches interesting is that they code the video as a compact set of local visual features and do not require object segmentation, tracking or background subtraction. Although an initial spatio-temporal volumetric representation of human activity might eliminate these pre-processing steps, it suffers from a major drawback, namely it ignores the contextual information. In other words, different activities can be represented by the same visual vocabularies, even though they are completely different.

To overcome this challenge, contextual information should be included in the original BOW framework. One solution is to employ visual phrases instead of visual words as proposed in [A43] where a visual phrase is defined as a set of spatio-temporal video volumes with a specific pre-ordained spatial and temporal structure. However, a significant drawback of this approach is that it cannot localize different activities within a video frame. Alternatively, the solution presented by Boiman and Irani [A7] is to densely sample the video and store all video volumes for a video frame, along with their relative locations in space and time. Consequently, the likelihood of a query in an arbitrary space-time contextual volume can be computed and thereby used to determine an accurate label for an action using just simple nearest neighbor classifiers [A40]. However, the significant issue with this approach is that it requires excessive computational time and a considerable amount of memory to store all of the volumes as well as their spatio-temporal relationships. The inventors within embodiments of the invention have established an alternative to this approach as described below.

In addition to Boiman and Irani [A7], several other methods have been proposed to incorporate spatio-temporal structure in the context of BOW [A61]. These are often based on co-occurrence matrices that are employed to describe contextual information. For example, the well-known correlogram exploits spatio-temporal co-occurrence patterns [A4]. However, only the relationship between the two nearest volumes was considered. This makes the approach too local and unable to capture complex relationships between different volumes. Another approach is to use a coarse grid and construct a histogram to subdivide the space-time volumes [A35]. Similarly, in [A36], contextual information is added to the BOW by employing a coarse grid at different spatio-temporal scales. An alternative that does incorporate contextual information within a BOW framework is presented in [A42], in which three-dimensional spatio-temporal pyramid matching is employed. While not actually comparing the compositional graphs of image fragments, this technique is based on the original two-dimensional spatial pyramid matching of multi-resolution histograms of patch features [A41]. Likewise in [A44], temporal relationships between clustered patches are modeled using ordinal criteria, e.g., equals, before, overlaps, during, after, etc., and expressed by a set of histograms for all patches in the whole video sequence. Similar to [A44], in [A45] ordinal criteria are employed to model spatio-temporal compositions of clustered patches in the whole video frame during very short temporal intervals.

However, as with Boiman and Irani [A7] the main problems associated with this are the large size of the spatio-temporal relationship histograms and the many parameters associated with the spatio-temporal ordinal criteria. Accordingly [A46] exploits spatial information which is coded through the concatenation of video words detected in different spatial regions as well as data mining techniques, which are used to find frequently occurring combinations of features. Similarly, [A47] addresses the complexity and processing overhead by using the spatial configuration of the 2D patches through incorporating their weighted sum. In [A38], these patches were represented using 3D Gaussian distributions of the spatio-temporal gradient and the temporal relationship between these Gaussian distributions was modeled using hidden Markov models (HMMs). An interesting alternative is to incorporate mutual contextual information of objects and human body parts by using a random tree structure [A28, A34] in order to partition the input space. The likelihood of each spatio-temporal region in the video is then calculated. The primary issue with this approach [A34], however, is that it requires several pre-processing stages including background subtraction, interest point tracking and detection of regions of interest.

Accordingly, within the prior art hierarchical clustering has been presented as an attractive way of incorporating the contextual structure of video volumes, as well as presenting the compactness of their description [A33, A11]. Accordingly, a modified version of [A7] was presented in [A11] with a hierarchical approach in which a two-level clustering method is employed. At the first level, all similar volumes are categorized. Then clustering is performed on randomly selected groups of spatio-temporal volumes while considering the relationships in space and time between the five nearest spatio-temporal volumes. However, the small number of spatio-temporal volumes involved again makes this method inherently local in nature. Another hierarchical approach is presented in [A33] attempting to capture the compositional information of a subset of the most discriminative video volumes. However, within these prior art solutions presented to date, although a higher level of quantization in the action space produces a compact subset of video volumes, it also significantly reduces the discriminative power of the descriptors, an issue which is addressed in [A40].

Generally, the prior art described above for modeling the mutual relationships between video volumes have one or more limitations including, but not limited to, considering relationships between only a pair of local video volumes [A42, A4]; being too local and unable to capture interactions of different body parts [A33, A48]; and considering either spatial or temporal order of volumes [A4].

SUMMARY

The systems and methods described herein relate to non-specific and unconstrained activities and events in videos in order to build a complete scene understanding, with the particular emphasis on the spatial and temporal context of the scene. More particularly, a multi-level and multi-scale hierarchical bag of video words structure is introduced for content-based video retrieval with applications including abnormal event detection, event recognition, and content based video searches.

Accordingly, embodiments of the system described herein allow for a query, e.g. a video comprising the action of interest (walking) to be used to search for all videos within a target set that are similar, implying the same activity. Beneficially, the herein described method provides a solution to the so-called action classification problem. It would also be beneficial if the approach did not require long training sequences, did not require object segmentation or tracking, nor required background subtraction.

At least one other embodiment allows for the identification of spatio-temporal compositions in a video or set of videos that have a low probability of occurrence with respect to the previous observations.

In this manner, beneficially, embodiments can be configured to establish a particular activity in a particular context as an anomaly whereas within another context that activity is normal [B11].

Accordingly, solutions are provided that address the above-noted limitations of prior approaches, and provide the benefits identified supra through the use of a hierarchical codebook model of local spatio-temporal video volumes to provide action recognition, localization and video matching. Beneficially these embodiments do not require prior knowledge about actions, background subtraction, motion estimation or tracking and are robust against spatial and temporal scale changes, as well as some deformations.

In one aspect, there is provided a method of analyzing a video, the method comprising: sampling the video to generate a plurality of spatio-temporal video volumes; clustering similar ones of the plurality of spatio-temporal video volumes to generate a low-level codebook of video volumes; analyzing the low-level codebook of video volumes to generate a plurality of ensembles of volumes surrounding pixels in the video; and clustering the plurality of ensembles of volumes by determining similarities between the ensembles of volumes, to generate at least one high-level codebook.

In another aspect, the method further comprises performing visual event retrieval by using the at least one high-level codebook to make an inference from the video.

In yet another aspect, the visual event retrieval comprises comparing the video to a dataset and retrieving at least one similar video.

In yet another aspect, the visual event retrieval comprises activity and event labeling.

In yet another aspect, the visual event retrieval comprises performing abnormal and normal event detection.

In other aspects, there are provided computer readable media and systems configured to perform the methods.

BRIEF DESCRIPTION OF THE DRAWINGS

Embodiments will now be described, by way of example, with reference to the attached Figures, wherein:

FIG. 8 depicts an algorithm for similarity measurement between query and target videos according to an embodiment comprising two hierarchical layers;

FIG. 10A depicts a confusion matrix for action classification using a Weizmann dataset;

FIG. 10B depicts a confusion matrix for action classification using a KTH dataset;

DETAILED DESCRIPTION

Figure 1:
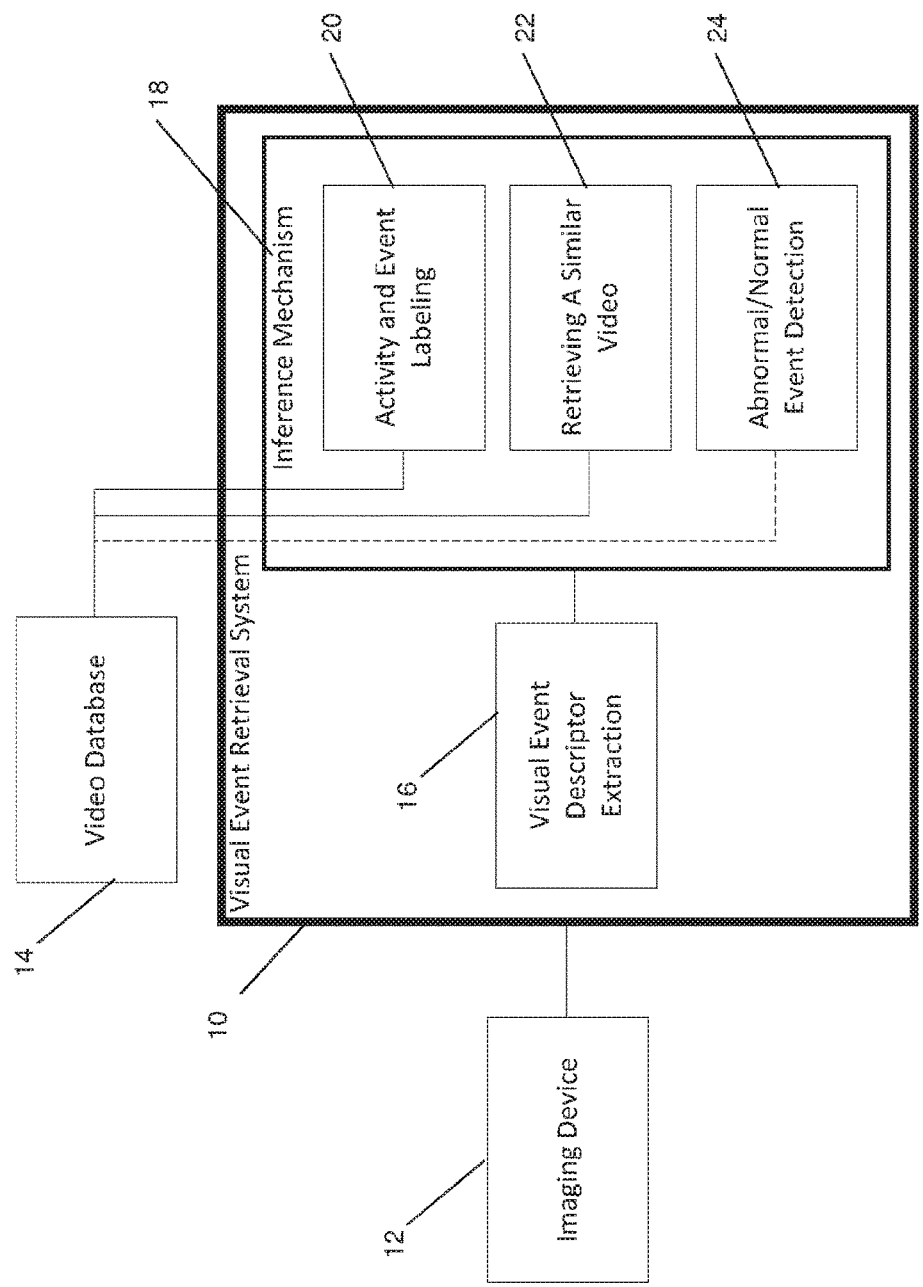
FIG. 1 is a block diagram illustrating an example of a configuration for a visual event retrieval system.

The following is directed to event (e.g. activity) analysis and more particularly to spatial and temporal scale change robust analysis for action recognition, and localization and video matching without prior action knowledge or pre-processing.

As discussed above, it has been found that given the tremendous number of video data produced every day, there is a great demand for automated systems that analyze and understand the events in these videos. In particular, retrieving and identifying human activities in videos has become more interesting due to its potential real-world applications. These include the following practical applications, without limitation: automated video surveillance systems, human-computer interaction, assisted living environments and nursing care institutions, sports interpretation, video annotation and indexing, and video summarization. The following system provides solutions for monitoring non-specific and unconstrained activities in videos.

A system is herein described for visual event understanding using a hierarchical framework of video fragments to describe objects and their motions. These are employed to simultaneously detect and localize both dominant events and activities (that occur on a regular basis) and rare ones (which are not observed regularly), describe and recognize events, and eventually search videos and find similar videos based on their contents.

The approach presented herein for modeling the scene context can be considered as an extension of the original Bag-of-Video-Words (BOW) approaches in which a spatio-temporal scene configuration comes into play. It imposes spatial and temporal constraints on the video fragments so that an inference mechanism can estimate the probability density functions of their arrangements. An aspect of the methodology is the way that scene information is represented while keeping the computational cost low enough for real-time implementation using currently available hardware resources. Moreover, it has been found that the system described herein can be configured to not require lengthy training periods, object segmentation, tracking and background subtraction, with their attendant weaknesses, which form the basis for previously reported approaches. By observing a scene in real-time, the system builds a dynamically changing model of the environment. This adaptive appearance-based model, which is probabilistic in nature, is employed to describe the ongoing events.

The following approach provides probabilistic graphical structures of all moving objects while simultaneously coding the spatio-temporal context of the scene in the surrounding regions. The probabilistic graphical structures are then used to find and localize different events in the scene. Therefore, a video is represented by a set of events, localized in space and time, and coded by probabilistic graphical structures. Such a framework can be considered as the building block for various computer vision applications. For example, based on the produced probabilistic models for all events and objects in a scene, further analysis of the behaviors and interactions of these events and objects can be performed to produce video semantics and a complete scene description.

The following summarizes some terminology to clarify the present disclosure with respect to the related literature.

Spatio-temporal video words refer to 3D (space with time, XYT) pixel level features extracted at each pixel in a video.

An ensemble of video volumes refers to a large spatio-temporal region having many video volumes.

Low-level behaviors refer to those activities that can be localized in space and time.

The term "event" is deemed to be more general than "activity" as it is not restricted to just humans (i.e. animate objects). To date, in the computer vision community, the term "activity" has largely been taken to be a human action performed by a single person, lasting for just a few video frames, taking up to a few seconds, and containing one or more events.

By using the term "context" or "contextual information", such use herein refers to the relative spatio-temporal location in 3D XYT space obtained by sampling video observations.

The systems and methods described herein address limitations of prior approaches relating to event analysis, and more particularly to spatial and temporal scale change robust analysis for action recognition, localization and video matching without prior action knowledge/pre-processing.

In an embodiment, there is provided a method of recognizing a predetermined action within video data based upon a process comprising: generating a hierarchal codebook model of local spatio-temporal video volumes; establishing a plurality of contextual volumes, each contextual volume comprising multiple spatio-temporal video volumes at multiple scales; and constructing a probabilistic model of video volumes and their spatio-temporal compositions in dependence upon the plurality of contextual volumes.

A hierarchical codebook structure is introduced for action detection and labelling. This is achieved by considering a large volume containing many STVs and constructing a probabilistic model of this volume to capture the spatio-temporal configurations of STVs. Subsequently, similarity between two videos is calculated by measuring the similarity between spatio-temporal video volumes and their compositional structures.

The salient pixels in the video frames are selected by analyzing codewords obtained at the highest level of the hierarchical codebook's structure. This depends on both the local spatio-temporal video volumes and their compositional structures. This approach differs from conventional background subtraction and salient point detection methods.

In order to learn both normal and abnormal patterns for event detection, a new framework is introduced. The main characteristics of such a framework include, without limitation:

i) The spatio-temporal contextual information in a scene is decomposed into separate spatial and temporal contexts, which make the algorithm capable of detecting purely spatial or temporal activities, as well as spatio-temporal abnormalities.

ii) High level activity modeling and low level pixel change detection are performed simultaneously by a single algorithm. Thus the computational cost is reduced since the need for a separate background subtraction algorithm is eliminated. This makes the algorithm capable of understanding behaviors of different complexity.

iii) The algorithm adaptively learns the behavior patterns in the scene in an online manner. As such, the approach is a preferable choice for visual surveillance systems.

iv) A major benefit of the algorithm is its extendibility, which is achieved by hierarchical clustering. This makes the algorithm capable of understanding dominant behaviors of different complexity.

In an embodiment, there is provided a method of creating a hierarchal codebook comprising; i) sampling a first video at multiple scales and constructing a plurality of spatio-temporal video volumes and a plurality of descriptors; ii) constructing a low level codebook of video volumes; iii) repeatedly doing the following steps (iii-a to iii-c) to create multiple high level codebooks of the topology of the local regions in videos: iii-a) constructing ensembles of spatio-temporal video volumes; iii-b) constructing topological models of the ensembles of spatio-temporal video volumes; iii-c) constructing a higher level codebook to cluster similar ensembles of spatio-temporal video volumes; and iv) removing non-informative codewords from the higher level codebook.

In another embodiment, there is provided a method of detecting anomalies within a video exploiting multi-scale spatio-temporal video volumes without any at least one of offline and supervised learning.

In another embodiment, there is provided a method of detecting anomalies within a video exploiting multi-scale spatio-temporal video volumes without any at least one of background suppression, motion estimation and tracking.

In another embodiment, there is provided a method of determining an activity within a video exploiting multi-scale spatio-temporal video volumes to compare with an activity within another video such that the method is robust against spatial and temporal scale changes.

Other aspects and features of the systems and methods described herein will become apparent from the following description of the appended drawings, without departing from the scope of the claims appended hereto.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment.

A hierarchical probabilistic codebook method is provided, for action recognition in videos, which is based on spatio-temporal video volume (STV) construction. The method uses both local and global compositional information of the volumes, which are obtained by dense sampling at various scales. Embodiments beneficially do not require pre-processing in order to perform actions such as background subtraction, motion estimation, or complex models of body configurations and kinematics. Moreover, such embodiments are robust against variations in appearance, scale, rotation, and movement.

Accordingly, limitations in prior approaches are addressed through the exploitation of a hierarchical probabilistic codebook method for visual event description. The codebook structure according to embodiments is a probabilistic framework for quantifying the arrangement of the spatio-temporal volumes at a pixel in the video. It models contextual information in the BOW is a multi-level hierarchical probabilistic codebook structure. This method can be considered as an extension to the original Bag of Video Words (BOW) approach for visual event modeling.

1. MULTI-SCALE HIERARCHICAL CODEBOOKS

Turning now to the figures, FIG. 1 illustrates an example of a configuration for a visual event retrieval system 10, which is coupled to or otherwise in communication with an imaging device 12 and a video database 14. The system 10 includes a visual event descriptor extraction module 16 and an inference mechanism 18. The inference mechanism 18 includes an activity and event labeling module 20, a retrieving a similar video module 22, and an abnormal/normal event detection module 24. The system 10 includes two stages, visual event descriptor extraction 16 and the inference mechanism 18. The visual event descriptor 16 is a hierarchical bag of words structure that considers both local and global context in space and time. Given the video descriptors, different information can be extracted for various computer vision tasks. The dashed line indicates that for finding dominant and abnormal events the algorithm does not require a training video dataset.

In general, the system 10 includes the following characteristics. First, the system 10 can provide low level visual cues (pixel level changes) to describe high level events (e.g., activities and behaviors) in videos, as well as allow for simultaneously modeling normal (dominant) and abnormal (rare) patterns/events/activities/behaviours in videos. Abnormalities are defined as incontinent patterns with the previous observations. The system 10 can also operate with no separate training data. The input video (query) is used as a reference for normal patterns, and a separate training dataset can be employed if such a dataset is available and/or necessary. Online and adaptive learning and identification of dominant and rare events can also be achieved using the system 10 as described in greater detail below.

Moreover, the system 10 provides a model free structure to learn visual patterns, a hierarchical layered model of the scene and events, and a space/time contextual structure of local and global shape and motion patterns to model different events in a scene. Also, multiple sets of multi-scale hierarchical codebook models of local and global shape and motion patterns in space and time can be used, and two models of visual events (decomposition of contextual graphs in space and time) are used, namely: Spatial visual events, and Temporal visual events.

A generalized framework is therefore provided for salient event detection and background/foreground segmentation. Newly observed patterns are learned in an unsupervised manner, and the spatio-temporal contextual information in a scene is decomposed into separate spatial and temporal contexts, which make the algorithms used by the system 10 capable of detecting purely spatial or temporal activities, as well as spatio-temporal abnormalities. High level activity modeling and low level pixel change detection are performed simultaneously by a single algorithm. Thus, the computational cost is reduced since the need for a separate background subtraction algorithm is eliminated. This makes the algorithm capable of understanding behaviors of different complexities. The algorithm adaptively learns the behavior patterns in the scene in an online manner. This makes it a preferable choice for visual surveillance systems. Finally, a major benefit of the algorithm is its extendibility, achieved by a hierarchical clustering.

Figure 2:
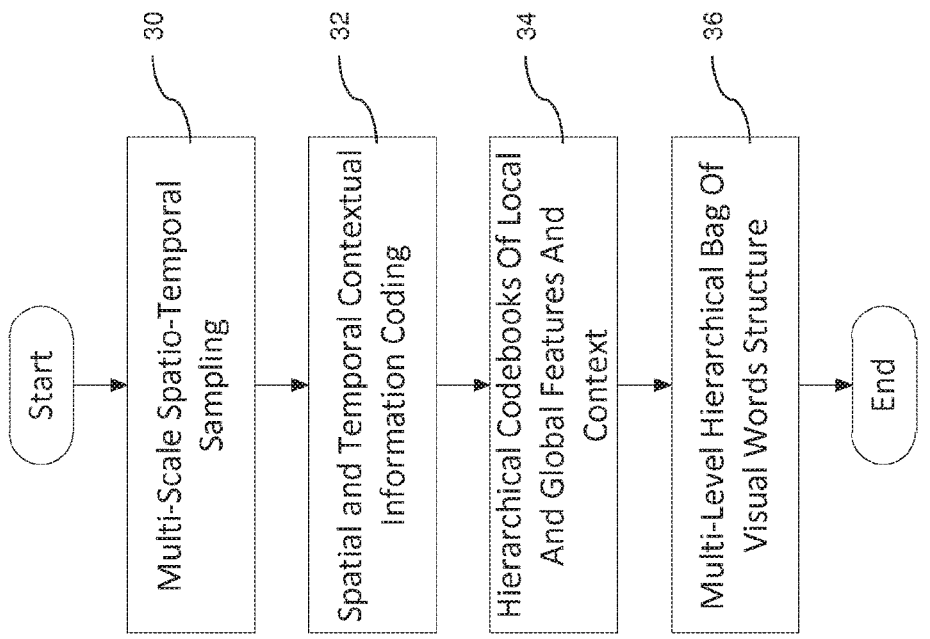
FIG. 2 is a flow diagram illustrating a method for learning visual events from local and global low- and high-level visual information.

FIG. 2 illustrates how visual events are learned from local and global low- and high-level visual information, which is achieved by constructing a hierarchical codebook of the spatio-temporal video volumes. To capture spatial and temporal configurations of video volumes, a probabilistic framework is employed by estimating probability density functions of the arrangements of video volumes. The uncertainty in the codeword construction of spatio-temporal video volumes and contextual regions is considered, which makes the final decision more reliable. The method shown in FIG. 2 therefore includes a step 30 of multi-scale spatio-temporal sampling, a step 32 of spatial and temporal contextual information coding, a step 34 of using hierarchical codebooks of local and global features and context, and a step 36 of using a multi-level hierarchical bag of visual words structure.

Figure 3:
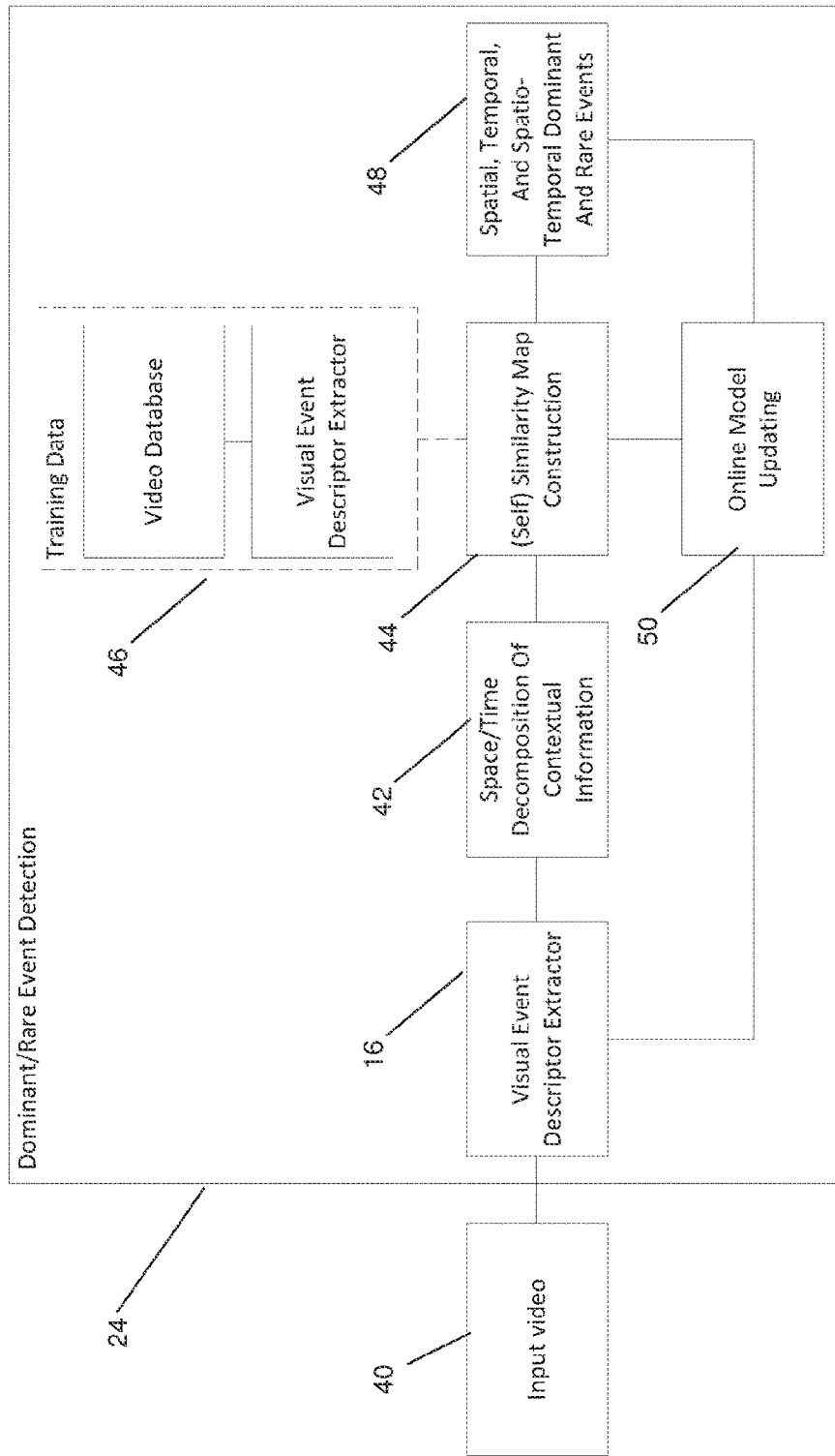
FIG. 3 is a block diagram illustrating an example of a configuration for an inference mechanism for abnormal and dominant event detection.

FIG. 3 illustrates application of the inference mechanism 18 for abnormal and dominant event detection 24. An input video 40 is sampled by the visual event descriptor extractor at 16, and the likelihood of being normal of each pixel at different spatial and temporal scales is computed at 42 by considering the contextual information. This data structure facilitates the computation of the similarity between all pixels and their local context at 44. The computation involves both new and previously observed data by using data obtained by the visual event descriptor extractor and (or) from a video database, collectively the training data 46. While training data 46 can be used to enhance the results, the algorithms described herein can be applied without requiring such training data 46. The similarity map can be constructed for each frame given a video dataset or only the video itself (self-similarity map). The model parameter and the learnt dominant and rare events generated at 48 are updated over time at 50. It may be noted that the algorithm does not require a training dataset 46 and can learn everything while observing the video 40 (i.e. the dashed line in FIG. 3 indicates that for finding dominant and abnormal events the algorithm does not require a training video dataset).

Figure 4:
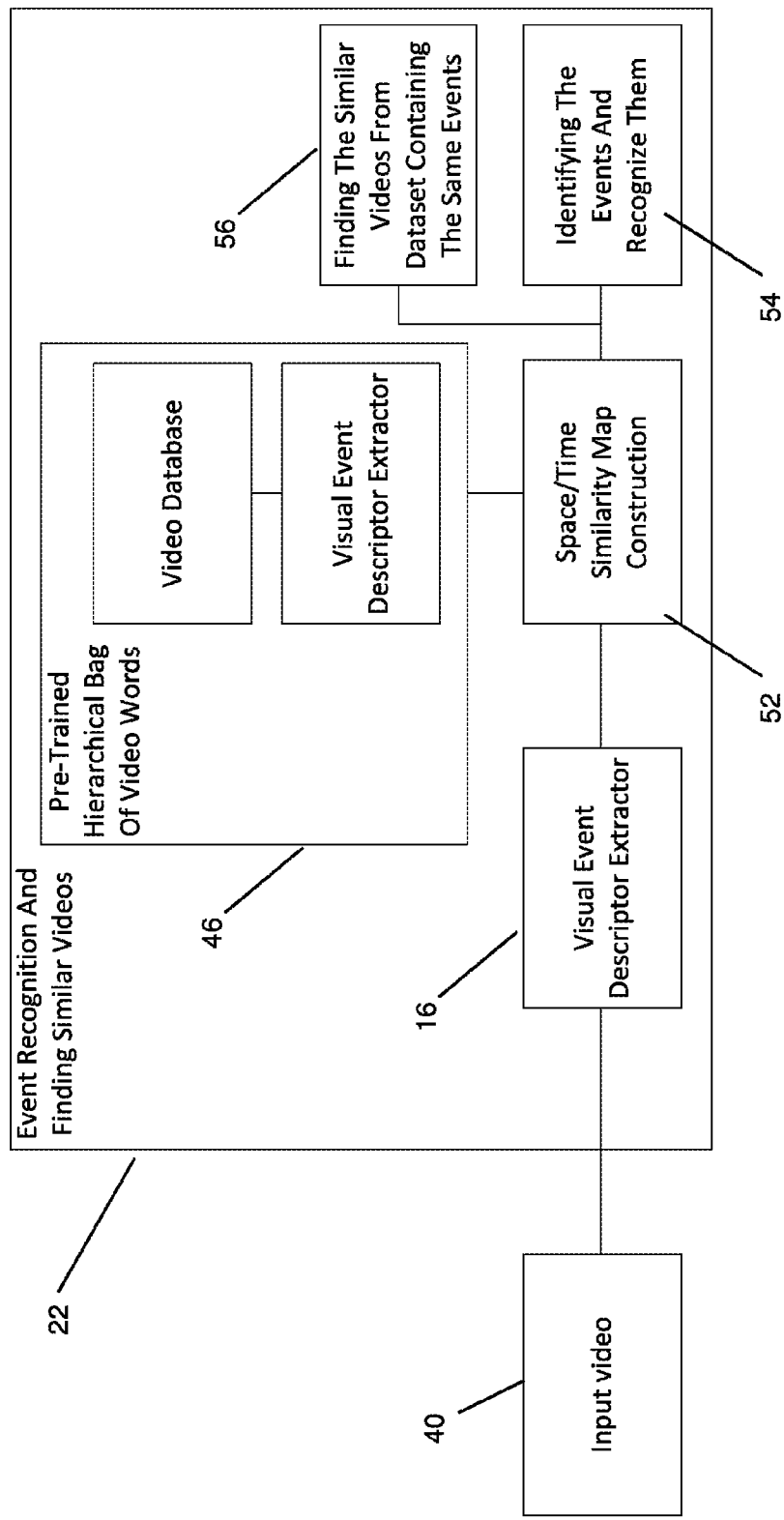
FIG. 4 is a block diagram illustrating an example of a configuration for performing event recognition.

FIG. 4 provides an overview of event recognition for finding similar videos 22, wherein the goal is to apply a label to the event based on a training dataset 46. Additionally, the configuration shown in FIG. 4 depicts a content-based video search mechanism wherein the goal is to find similar videos in order to query a video in the target set using an algorithm described herein. As shown in FIG. 4, the input video 40 is processed by the visual event descriptor extractor 16 after which a space/time similarity map is constructed at 52, which also considers pre-trained hierarchical bags of video words 46. As a result, similar videos from a dataset containing the same events are identified at 56, and the events are identified and recognized at 54.

Considering the structure presented in FIG. 1, one application of activity analysis within a variety of applications includes video surveillance systems, human-computer interaction, security monitoring, threat assessment, sports interpretation, and video retrieval for content-based search engines is to find the similarity between a queried video and a pool of target videos. As presented below, the various embodiments described herein exploit a "bag" of space-time features approach in that a set of spatio-temporal video volumes (STVs) are employed in measuring similarity. As depicted in FIG. 1 the event understanding algorithm includes two main stages, firstly a visual information extraction in which the video(s) 40 are sampled, and thereafter hierarchical codebooks are constructed which process is depicted in FIG. 2. Subsequently, an inference mechanism 18 is applied for finding the appropriate labels for events in the target videos 40. Accordingly, within this section the former is presented, and in subsequent sections inference mechanisms 18 for anomaly detection and event recognition respectively are presented.

Figure 22:
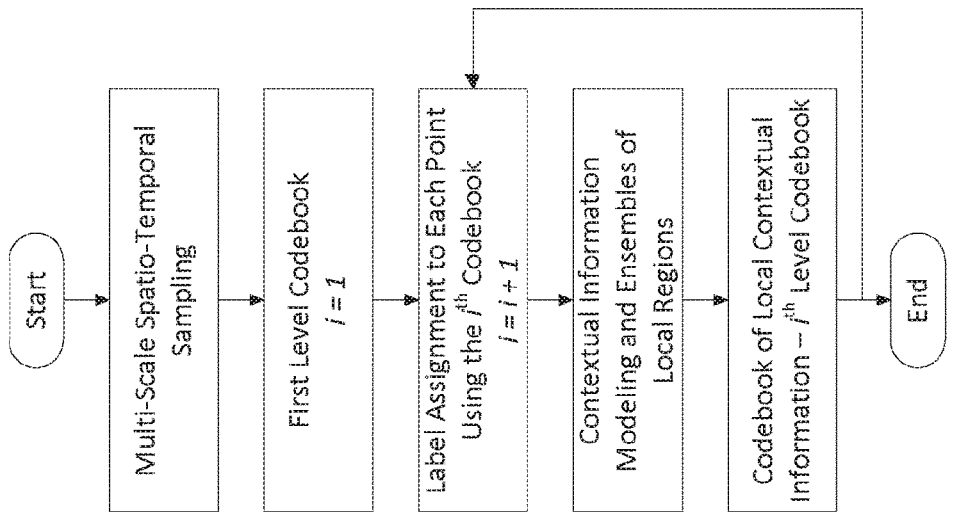
FIG. 22 depicts multi-level hierarchical visual content descriptor extraction.

For multiple high level codebooks, as illustrated in FIG. 22, the first codebook is constructed by considering similarities between local regions in the video. Then a label (or a set of multiple labels with a confidence score) can be assigned to each local region. Given the assigned labels, ensembles of local regions are formed for another codebook can be generated by grouping similar ensembles of local regions. This process can be done repeatedly to generate multi-level codebooks of local spatio-temporal regions.

1.1 Low Level Scene Representation

Figure 5:
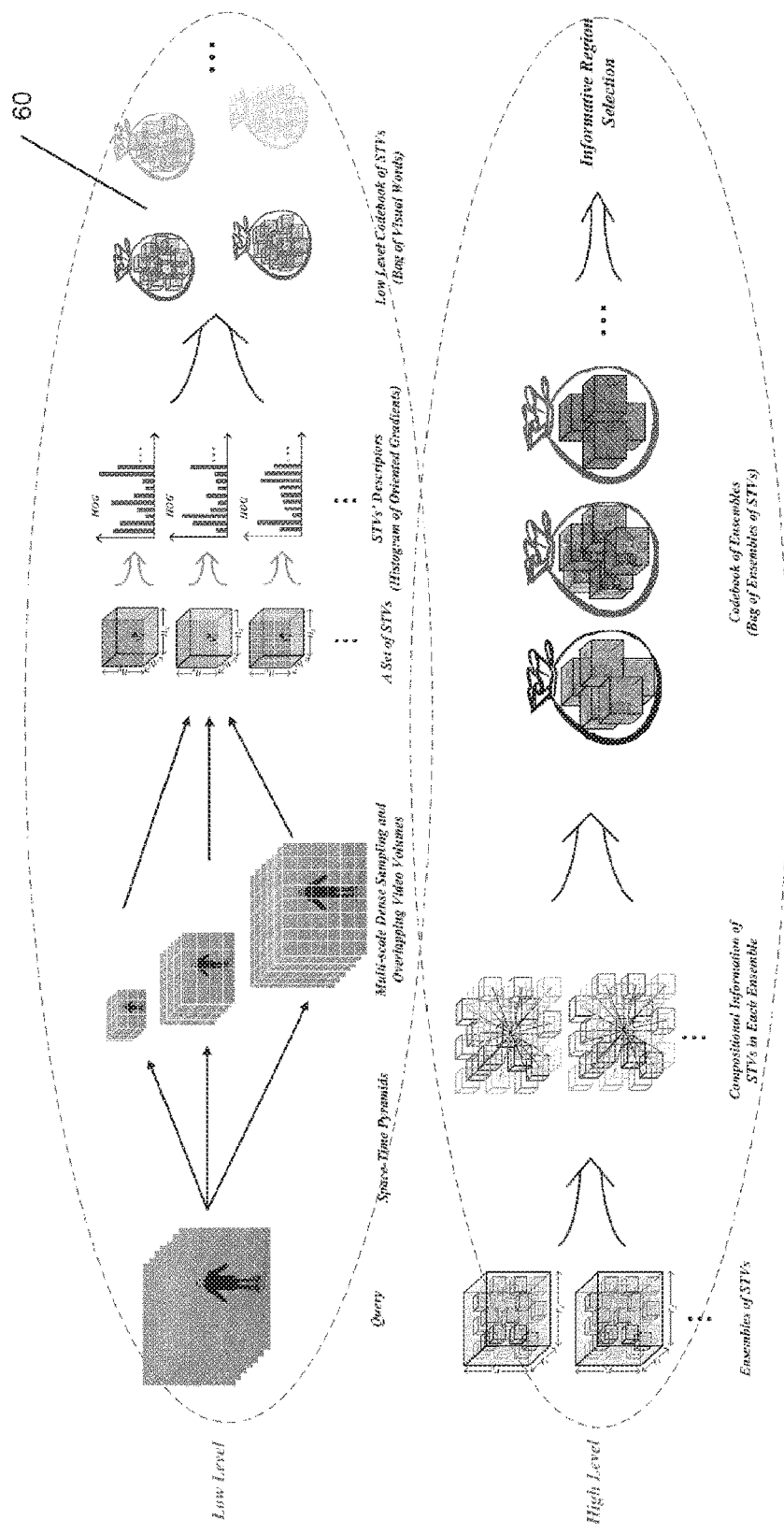
FIG. 5 depicts an overview of the scene representation and hierarchical codebook structure enabling one or more than one high level codebook to be generated.

The first stage is to represent a video 40, e.g. a query video, by meaningful spatio-temporal descriptors. This is achieved by applying a sampling mechanism (e.g., dense sampling, key points, interest point sampling, random sampling, etc.), thereby producing a large number of spatio-temporal video volumes, before similar video volumes are clustered to form a codebook. Due to the computational processes, this can be done on-line, frame-by-frame, etc., so that the codebook can be made adaptive. The constructed codebook at this level is called the low-level codebook 60, as illustrated in FIG. 5.

1.1.1. Multi-Scale Dense Sampling

In a manner similar to other bag of video (BOW) word methodologies three-dimensional STVs within a video are constructed at the lowest level of the hierarchy. Although there are many methods for sampling the video 40 for volume construction, dense sampling has been shown to be superior to the others in terms of retaining the information features of a video [A61]. Therefore, performance typically increases with the number of sampled spatio-temporal volumes (STVs), making dense sampling a preferable choice despite the increased computational requirements [A39, A7, A61].

The 3D spatio-temporal video volumes, $v_i \in \Re^{n_x \times n_y \times n_t}$, are constructed by assuming a volume of size $n_x \times n_y \times n_t$ around each pixel, wherein $n_x \times n_y$ is the size of the spatial image window and $n_t$ is the depth of the video volume in time. Spatio-temporal volume construction is performed at several spatial and temporal scales of a Gaussian space-time video pyramid thereby yielding a large number of volumes at each pixel in the video. FIG. 2 illustrates this process of spatio-temporal volume construction. These volumes are then characterized by a descriptor, which is the histogram of the spatio-temporal oriented gradients in the video, expressed in polar coordinates [A49, A51]. If it is assumed that $G_x(x,y,t)$ and $G_y(x,y,t)$ are the respective spatial gradients and $G_t(x,y,t)$ the temporal gradient for each pixel at (x,y,t) then the spatial gradient(s) may be used to calculate a three-dimensional (3D) gradient magnitude which may then be normalized to reduce the effects of local texture and contrast. Hence, by defining the normalized spatial gradient, $\tilde{G}_s$ as given by Equations (1A) and (1B) where $\varepsilon_{max}$ is a constant, which can be set to 1% of the maximum spatial gradient magnitude in order to avoid numerical instabilities. Hence, the 3D normalized gradient is represented in polar coordinates by $(M(x,y,t), \theta(x,y,t), \phi(x,y,t))$ as defined in Equations (2A) to (2C) respectively where $M(x,y,t)$ is the 3D gradient magnitude, and $\theta(x,y,t)$ and $\phi(x,y,t)$ are the orientations within $$\left[\frac{-\pi}{2}, \frac{\pi}{2}\right] \text{ and } [-\pi, \pi],$$

respectively.

$$G_s(x, y, t) = \sqrt{G_x(x, y, t)^2 + G_y(x, y, t)^2} \quad (x, y, t) \in v_i \quad (1A)$$

$$\tilde{G}_s(x, y, t) = \frac{G_s(x, y, t)}{\sum_{(x,y,t) \in v_i} G_s(x, y, t) + \varepsilon_{max}} \quad (1B)$$

$$M(x, y, t) = \sqrt{\tilde{G}_s(x, y, t)^2 + G_t(x, y, t)^2} \quad (2A)$$

$$\theta(x, y, t) = \tan^{-1}\left(\frac{G_y(x, y, t)}{G_x(x, y, t)}\right) \quad (2B)$$

$$\phi(x, y, t) = \tan^{-1}\left(\frac{G_t(x, y, t)}{\tilde{G}_s(x, y, t)}\right) \quad (2C)$$

The descriptor vector for each video volume, taken as a histogram of oriented gradients (HOG), is constructed using the quantized $\theta$ and $\phi$ into $n_\theta$ and $n_\phi$, respectively, weighted by the gradient magnitude, M. The descriptor of each video volume will be referred to by $h_i \in \R^{n_\theta + n_\phi}$. This descriptor represents both motion and appearance and possesses also a degree of robustness to unimportant variations in the data, such as illumination changes [A49]. However, it should be noted that the processes discussed herein do not need to rely on a specific descriptor for the video volumes. Accordingly, other descriptors not described below may enhance the performance of the solutions exploiting the principles discussed herein. Examples of more complicated descriptors include those described within [A9], the spatio-temporal gradient filters in [A52], the spatio-temporal oriented energy measurements in [A10], the three-dimensional Scale Invariant Feature Transform (SIFT) [A50], and the learned features from deep neural network architectures (e.g. deep convolutional neural networks).

1.1.2. Exemplary Codebook of Video Volumes

As the number of these volumes is extremely large, for example approximately $10^6$ in a one minute video, then it is advantageous to group similar STVs in order to reduce the dimensions of the search space. This is commonly performed in BOW approaches [A42, A9, A61]. Similar video volumes can also be grouped when constructing a codebook [A15, A61]. The first codeword is made equivalent to the first observed spatio-temporal volume. After that, by measuring the similarity between each observed volume and the codewords already existing in the codebook, either the codewords are updated or a new one is formed. Then, each codeword is updated with a weight of $w_{i,j}$, which is based on the similarity between the volume and the existing codewords. Here, the Euclidean distance can be used for this purpose, although it would be evident that other weightings may be applied. Accordingly, the normalized weight of assigning a codeword $c_j$ to video volume $v_i$ is given by Equation (3) where $d(v_i,c_j)$ represents the Euclidean distance.

$$w_{i,j} = \frac{1}{\sum_j \frac{1}{d(v_i, c_j)}} \times \frac{1}{d(v_i, c_j)} \quad (3)$$

Another important parameter is the number of times, $f_j$, that a codeword has been observed [A61]. The codebook is continuously being pruned to eliminate codewords that are either infrequent or very similar to the others, which ultimately generates $M^3$ different codewords that are taken as the labels for the video volumes, $C^3 = \{c\}_{i=1}^{M^3}$.

Figure 6A:
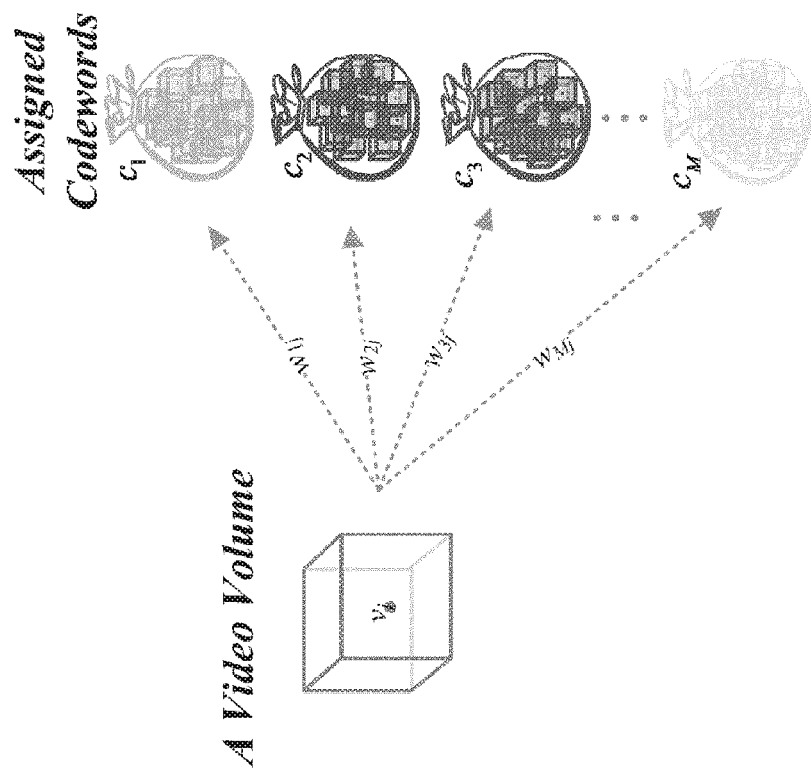
FIG. 6A is a schematic diagram depicting codeword assignment to spatio-temporal video volumes.

After the initial codebook formation, which exploits at least one video frame, each new 3D volume, $v_i$, can be assigned to all labels, $c_j$'s, with a degree of similarity, $w_{i,j}$, as shown in FIG. 6A. It is worth noting that the number of labels, $M^3$, is less than the number of volumes, N. Moreover, codebook construction may be performed using other clustering methods, such as k-means, online fuzzy c-means [A51], or mutual information [A42].

1.2. High Level Scene Representations

In the preceding step, similar video volumes were grouped in order to construct the low level codebook. The outcome of this is a set of similar volumes, clustered regardless of their positions in space and time. This is the point at which known prior art BOW methods stop. As stated previously a significant limitation within many of the prior art BOW approaches is that they do not consider the spatio-temporal composition (context) of the video volumes. Certain methods for capturing such information have appeared in the literature, see [A7, A41, and A47]. Within the embodiments presented herein a probabilistic framework is exploited for quantifying the arrangement of the spatio-temporal volumes.

1.2.1. Ensembles of Volumes

Figure 6B:
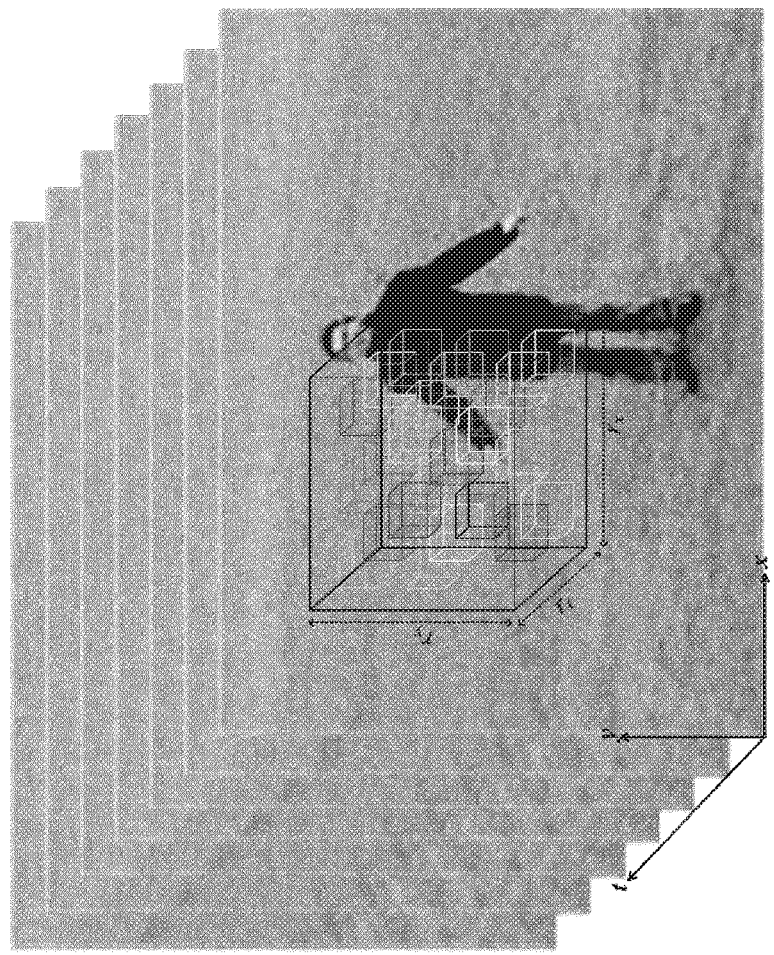
FIG. 6B illustrates an ensemble of spatio-temporal volumes.

Suppose a new video is to be analyzed, hereinafter referred to it as the query. An objective is to measure the likelihood of each pixel in one or more target videos given the query. To accomplish this, the spatio-temporal arrangement of the volumes in the clusters that have been determined in Section 1.1 supra are analyzed. Accordingly, a large 3D volume around each pixel in (x,y,t) space is then considered. This large region contains many volumes with different spatial and temporal sizes as shown in FIG. 6B. This region captures both the local and more distant information within the video frame(s). Such a set is referred to as an ensemble of volumes around the particular pixel in the video. The ensemble of volumes, E(x,y,t), surrounding each pixel (x,y) in the video at time t, is given by Equation (4) where $R_{(x,y,t)} \in R^3$ is a region with pre-defined spatial and temporal dimensions centered at point (x,y,t) in the video (e.g., $r_x \times r_y \times r_z$) and J indicates the total number of volumes inside the ensemble. These large contextual 3D spaces are employed to construct higher-level codebooks. Optionally, rather than a cubic ensemble of volumes as depicted in FIG. 6B, other volumetric representations may be employed including, for example, spherical, cuboid, cylindrical, etc.

$$E(x,y,t) = \{v_j^{E(x,y,t)}\} \triangleq \{v_j : v_j \subset R_{(x,y,t)}\}_{i=1}^J \quad (4)$$

1.2.2. Contextual Information and Spatio-Temporal Compositions

Figure 6C:
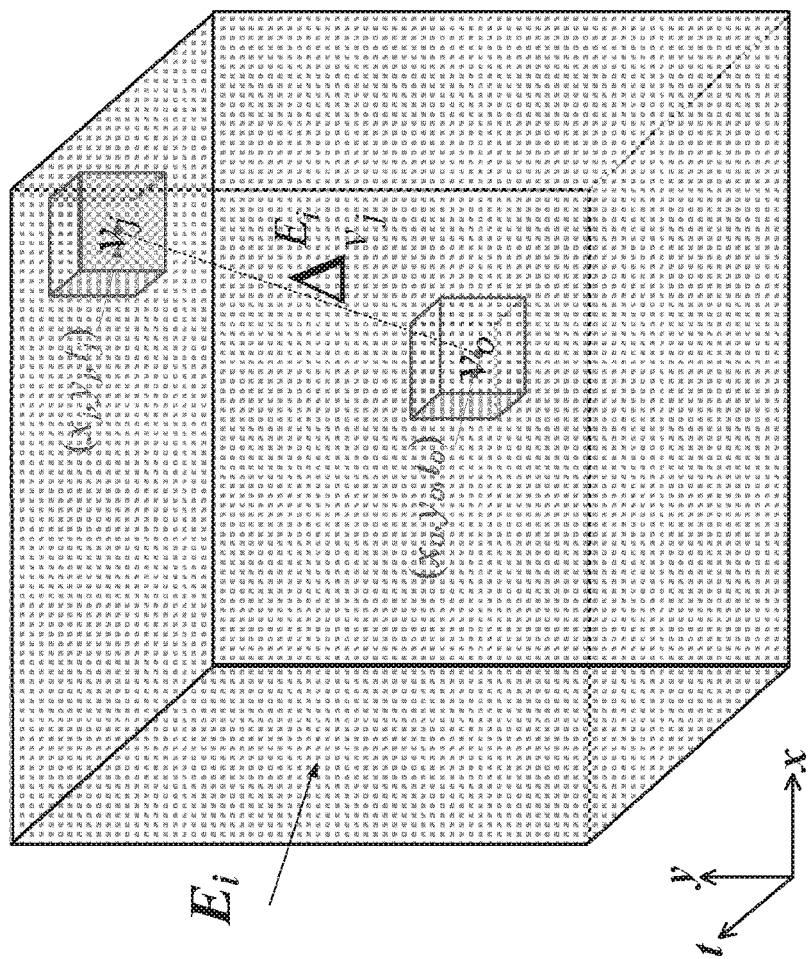
FIG. 6C illustrates relative spatio-temporal coordinates of a particular video volume within an ensemble.

To capture the spatio-temporal compositions of the video volumes, the relative spatio-temporal coordinates of the volume in each ensemble can be exploited, as shown in FIG. 6C. Assume that the ensemble of video volumes at point $(x_i,y_i,t_i)$ is $E_i$, that the central video volume inside that ensemble is called $v_0$, and that $v_0$ is located at the point $(x_0,y_0,t_0)$ in absolute coordinates. Therefore, $\Delta_{v_j}^{E_i} \in R^3$ is the relative position (in space and time) of the jth video volume. $v_j$, inside the ensemble of volumes as given by Equation (5). Then each ensemble of video volumes at point $(x_i,y_i,t_i)$ is represented by a set of such video volumes and their relative positions, and hence Equation (4) can be rewritten as Equation (6).

$$\Delta_{v_j}^{E_i} = (x_j - x_0, y_j - y_0, t_j - t_0) \quad (5)$$

$$E(x,y,t) = \{\Delta_{v_j}^{E_i}, v_j, v_0\}_{j=1}^J \quad (6)$$

An ensemble of volumes is characterized by a set of video volumes, the central video volume, and the relative distance of each of the volumes in the ensemble to the central video volume, as represented in Equation (6). This provides a view-based graphical spatio-temporal multiscale description at each pixel in every frame of a video. A common approach for calculating similarity between ensembles of volumes is to use the star graph model in [A7, A11, A49]. This model exploits the joint probability between a database and a query ensemble to decouple the similarity of the topologies of the ensembles and that of the actual video volumes [A11]. In order to avoid such a decomposition, the inventors estimate the probability distribution function (pdf) of the volume composition in an ensemble and then measure similarity between these estimated pdf s.

During the codeword assignment process described in Section 1.1.2, each volume $v_j$ inside each ensemble was assigned to a label $c_m \in C^3$ with some degree of similarity $w_{j,m}$, using Equation (3). Given the codewords assigned to the video volumes, each ensemble of volumes can be represented by a set of codewords and their spatio-temporal relationships. Let $c_m \in C^3$ be the codeword assigned to the video volume $v_j$ and $c_n \in C^3$ the codeword assigned to the central video volume $v_0$. Therefore, Equation (6) can be rewritten as Equation (7) where $\Delta$ denotes the relative position of the codeword $c_m$ inside the ensemble of volumes. By representing an ensemble as a set of codewords and their spatio-temporal relationships, the topology of the ensemble, $\Gamma$, may defined as given by Equation (8) where $\Gamma$ is the topology of an ensemble of video volumes that encodes the spatio-temporal relationships between codewords inside the ensemble. $\Gamma_{m,n}(\Delta) \in \Gamma$ is taken to be the spatio-temporal relationship between two codewords, $c_m$ and $c_n$ in the ensemble. Therefore, the relationship defined by Equation (9) is obtained.

$$v_j \leftarrow c_m \qquad (7)$$

$$v_0 \leftarrow c_n$$

$$E(x_i, y_i, t_i) = \bigcup_{\substack{m-1:M^\vartheta \\ n-1:M^\vartheta}} \{\Delta, c_m, c_n\}_{j=1:J}$$

$$\Gamma = \bigcup_{\substack{m-1:M^\vartheta \\ n-1:M^\vartheta}} \{\Gamma_{m,n}(\Delta)\} \qquad (8)$$

$$\Gamma_{m,n}(\Delta) = (\Delta, c_m, c_n) \qquad (9)$$

Let v denote an observation, which is taken as a video volume inside the ensemble. Assume that its relative location is represented by $\Delta_v$, and $v_0$ is the central volume of the ensemble. The aim is to measure the probability of observing a particular ensemble model. Therefore, given an observation, $(\Delta_{v_j}^{E_i}, v_j, v_0)$, the posterior probability of each topological model, $\Gamma_{m,n}\Delta$ may be written as Equation (10). This posterior probability defines the probability of observing the codewords $c_m$ and $c_n$, and their relative location, $\Delta$, given the observed video volumes $(\Delta_{v_j}^{E_i}, v_j, v_0)$ in an ensemble of volumes. Equation (10) can be rewritten as Equation (11).

$$P(\Gamma_{m,n}\Delta|(\Delta_{v_j}^{E_i},v_j,v_0)) = P(\Delta,c_m,c_n|\Delta_{v_j}^{E_i},v_j,v_0) \qquad (10)$$

$$P(\Delta,c_m,c_n|\Delta_{v_j}^{E_i},v_j,v_0) = P(\Delta,c_n|c_m,\Delta_{v_j}^{E_i},v_j,v_0)P(c_m|\Delta_{v_j}^{E_i},v_j,v_0) \qquad (11)$$

Since now the unknown video volume, $v_j$, has been replaced by a known interpretation, $c_m$, the first factor on the right hand side of Equation (11) can be treated as being independent of $v_j$. Moreover, it is assumed that the video volumes are independent Thus $v_0$ can be removed from the second factor on the right hand side of Equation (11) and hence, it can be rewritten as Equation (12). On the other hand, the codeword assigned to the video volume is independent of its position, $\Delta_{v_j}^{E_i}$, and hence Equation (12) can be reduced to Equation (13) which can then be re-written to yield Equation (14) which, if we assume independency between codewords and their locations can itself be re-written to yield Equation (15).

$$P(\Delta,c_m,c_n|\Delta_{v_j}^{E_i},v_j,v_0) = P(\Delta,c_n|c_m,\Delta_{v_j}^{E_i},v_j,v_0)P(c_m|\Delta_{v_j}^{E_i},v_j,v_0) \qquad (15)$$

$$P(\Delta,c_m,c_n|\Delta_{v_j}^{E_i},v_j,v_0) = P(\Delta,c_n|c_m,\Delta_{v_j}^{E_i},v_0)P(c_m|v_j) \qquad (13)$$

$$P(\Delta,c_m,c_n|\Delta_{v_j}^{E_i},v_j,v_0) = P(\Delta|c_m,c_n,\Delta_{v_j}^{E_i},v_j,v_0)P(c_n|c_m,\Delta_{v_j}^{E_i},v_0)P(c_m|v_j) \qquad (14)$$

$$P(\Delta,c_m,c_n|\Delta_{v_j}^{E_i},v_j,v_0) = P(\Delta|c_m,c_n,\Delta_{v_j}^{E_i})P(c_n|v_0)P(c_m|v_j) \qquad (15)$$

The first factor on the right hand side of Equation (15) is the probabilistic vote for a spatio-temporal position, given the codewords assigned to the central video volume of the ensemble, the codeword assigned to the video volume, and its relative position. It is noted that, given a set of ensembles of video volumes, the probability distribution function (pdf) in Equation (15) can be formed using either a parametric model or nonparametric estimation. Here, we approximate $P(\Delta|c_m,c_n,\Delta_{v_j}^{E_i})$ describing each ensemble in Equation (15) using (nonparametric) histograms. $P(c_m|v_j)$ and $P(c_n|v_0)$ in Equation (15) are the votes for each codeword entry and they are obtained in the codeword assignment procedure in Section 3.1.2. Eventually, each ensemble of volumes can be represented by a set of pdf s as given in Equation (16) where $P(\Gamma|E_i)$ is a set of pdf modeling topology of the ensemble of volumes. Therefore, similarity between two video sequences can be computed simply by matching the pdf s of the ensembles of volumes at each pixel.

$$P(\Gamma|E_i) = \bigcup_{\substack{m-1:M^\vartheta \\ n-1:M^\vartheta}} \{P(\Gamma_{m,n}(\Delta)|E_i)\Delta, c_m, c_n\}_{j=1:J} \qquad (16)$$

Rare Event Detection: The ensembles of STVs are employed to compare a new observation to the previous observations. This will produce a self-similarity map of the video and rare events can be identified. In addition, ensembles of STVs can be decomposed into two spatial- and temporal-oriented ensembles. This space/time decomposition makes it possible to identify pure spatial and temporal dominant/rare events.

Bag of Ensembles of Volumes: The ensembles of video volumes can be used for constructing the second level codebook, called the high-level one. Following the same inference mechanism in the traditional BOW, the activity recognition problem is solved which is described as follows.

A hierarchical Bag of Ensembles of Volumes: Given a codebook of ensemble of video volumes, a label can be assigned to every spatiotemporal region in the video. Therefore, higher level ensembles can be formed by considering spatio-temporal relationship between those regions, similar to the procedure describe in 1.2.1. and 1.2.2. The ensembles can be used for constructing the third level codebook. The same procedure can be done repeatedly to form multi-level codebooks of visual information. Following the same inference mechanism in the traditional BOW, the activity recognition and dominant/rare patterns detection problem is solved which is described as follows.

1.2.3. Codebook of Ensembles of Spatio-Temporal Volumes

Once a video or video clip has been processed, each ensemble of spatio-temporal volumes has been represented by a set of probability distribution functions (pdf s) as given in Equation (16). Having performed the first level of clustering in Section 1.1.2. and given the representation of each ensemble obtained in Equation (16), then the aim now is to cluster the ensembles. This then permits construction of a behavioral model for the query video. Although clustering can be performed using many different approaches, spectral clustering methods offer superior performance to prior art traditional methods. Moreover, they can be computed efficiently. Spectral clustering constructs a similarity matrix of feature vectors and seeks an optimal partition of the graph representing the similarity matrix using Eigen decomposition [A53]. Usually, this is followed by either k-means or fuzzy c-means clustering. However, the normalized decomposition method of [A54] can be exploited, although the k-means or fuzzy c-means clustering as well as other clustering algorithms may be employed.

By employing the overall pdf $P(\Gamma|E_i)$ in Equation (16) to represent each ensemble of volumes then it is possible to use divergence functions from statistics and information theory as the appropriate dissimilarity measure. Here the symmetric Kullback-Leibler (KL) divergence can be exploited to measure the difference between the two pdf s, f and g [55], as given in Equation (17) where KL(f||g) is the Kullback- Leibler (KL) divergence of f and g. Therefore, given the pdf of each ensemble of volumes in Equation (16) the similarity between two ensembles of volumes, $E(x_i, y_i, t_i)$ and $E(x_j, y_j, t_j)$ is defined by Equation (18) where $P(\Gamma|E(x_i,y_i, t_i))$ and $P(\Gamma|E(x_j,y_j,t_j))$ are the pdf s of the ensembles $E(x_i, y_i, t_i)$ and $E(x_j, y_j, t_j)$, respectively, obtained in Section 3.2.2. d is the symmetric KL divergence between the two pdf s in Equation (17) and σ is the variance of the KL divergence over all of the observed ensembles of STVs in the query.

$$d(f, g) = KL(f\|g) + KL(g\|f) \quad (17)$$

$$s_{E_i,E_j} = e^{-\frac{d^2(P(\Gamma|E_i)P(\Gamma|E_j))}{2\sigma^2}} \quad (18)$$

$$L = D^{-\frac{1}{2}} S_N D^{\frac{1}{2}} \quad (19)$$

Given the similarity measurement of the ensembles in Equation (18). The similarity matrix, $S_N$, for a set of ensembles of volumes is formed and the Laplacian calculated as per Equation (19) where D is a diagonal matrix whose ith diagonal element is the sum of all elements in the ith row of $S_N$. Subsequently, eigenvalue decomposition is applied to L and the eigenvectors corresponding to the largest eigenvalues are normalized and form a new representation of the data to be clustered [A54]. This is followed by online fuzzy single-pass clustering [A56] to produce $M^g$ different codewords for the high-level codebook of ensembles of STVs, where $C^g = \{c_i\}_{i=1}^{M^g}$, for each pixel.

1.2.4. Informative Codeword Selection

When considering activity recognition in order to select a particular video in a target set that contains a similar activity to the one in the query video, the uninformative regions (e.g., background) should be excluded from the matching procedure. This is conventionally performed in all activity recognition algorithms. Generally, for shape-template and tracking based approaches this is done at the pre-processing stages using such methods as background subtraction and Region of Interest (ROI) selection. However, as noted supra these can have inherent problems. On the other hand, selecting informative rather than uninformative regions is a normal aspect of BOW-based approaches that constructs STVs at interest points. These are intrinsically related to the most informative regions in the video. When considering the framework for activity recognition herein described, then the high-level codebook of ensembles of STVs is used to generate codes for all pixels in each video frame. Accordingly, it can be important to select only the most informative codewords and their related pixels. Given the high-level codebook, $C^g$, constructed in Section 1.2.3, then it is seen that a codeword is assigned to each pixel p(x, y) at time (t) in the video. Therefore, in a video sequence of temporal length T, a particular pixel p(x, y) is represented as a sequence of assigned codewords at different times as given by Equation (20).

$$p(x,y) = \{p(x,y) \leftarrow c_i \cdot \forall t \in T, c_i \in C^g\} \quad (20)$$

Figure 7A:
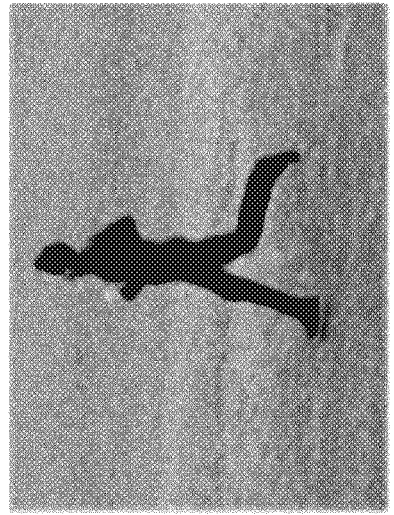
FIG. 7A is a sample video frame.
Figures 7B, 7C:
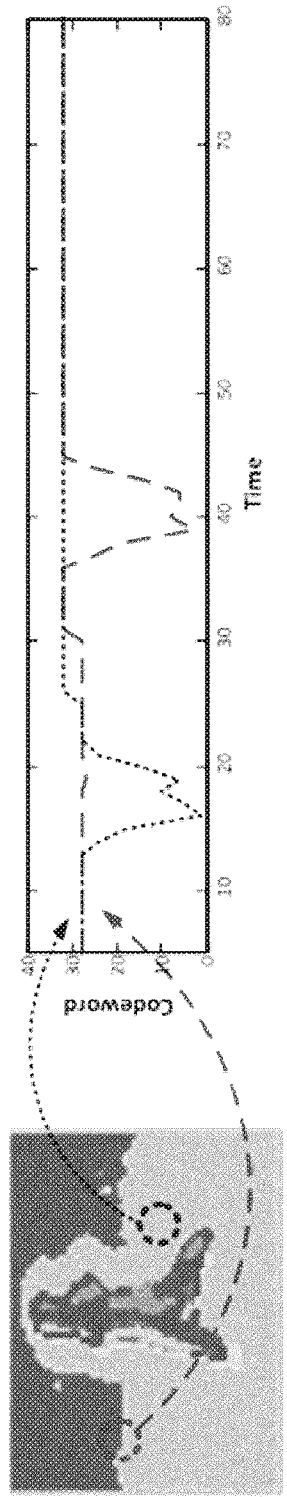
FIG. 7B is a schematic diagram depicting informative codeword selection via the sample video frame, and high-level codewords assigned to every pixel in the video frame.
FIG. 7C is a graph illustrating temporal correspondence of the codewords at each pixel.

A sample video frame and the assigned codewords are illustrated in FIGS. 7A to 7C. In order to remove non-informative codewords, e.g. codewords which represent the scene background, each pixel and its assigned codewords are analyzed as a function of time. As an example, FIG. 7C plots the assigned codewords to the sampled pixels in the video over time. It is observed that the pixels related to the background or static objects show stationary behavior. Therefore their associated codewords can be removed by employing a simple temporal filter at each pixel. This method was inspired by the pixel-based background model presented in [A57], where a time series of each of the three quantized color features was created at each pixel. A more compact model of the background may then determined by temporal filtering, based on the idea of the Maximum Negative Run-Length (MNRL). The MNRL is defined as the maximum amount of time between observing two samples of a specific codeword at a particular pixel [A57]. The larger the MNRL, the more likely the codeword is not the background. However, in contrast to [A57] the assigned codewords may be employed as the representative features for every pixel, as obtained from the high level codebook $C^g$, see Equation (20).

An advantage of selecting informative codewords at the highest level of the coding hierarchy is that compositional scene information comes into play. Accordingly, the computational cost may be reduced and the need for a separate background subtraction algorithm(s) eliminated. In summary, at first, the query video is densely sampled at different spatio-temporal scales in order to construct the video volumes. Then a low level codebook is formed and each volume $v_j$ is assigned to a codeword $c_i, c_i \in C^{\Im}$, with similarity $w_{i,j}$. Then a larger 3D volume around each pixel, containing many STVs, the so-called ensemble of STVs, is considered. The spatio-temporal arrangement of the volumes inside each ensemble is a model based on a set of pdf s. At the next level of the hierarchical structure, another codebook is formed for these ensembles of STVs, $C^{\Im}$. The two codebooks are then employed for finding similar videos to the query. Two main features characterize the constructed probabilistic model of the ensembles. First the spatio-temporal probability distribution is defined independently for each codebook entry. Second, the probability distribution for each codebook entry is estimated using (non-parametric) histograms. The former renders the approach capable of handling certain deformations of an object's parts while the latter makes it possible to model the true distribution instead of making an over-simplifying Gaussian assumption.

2. ACTIVITY RECOGNITION

2.1 Similarity Map Construction and Video Matching

Within activity recognition the overall goal is to find similar videos to a query video in a target set and consequently label them according to the labeled query video using the hierarchical codebook presented in Section 1 supra. FIG. 8 summarizes the process of determining the hierarchical codebooks and how the similarity maps are constructed.

The inference mechanism is the procedure for calculating similarity between particular spatio-temporal volume arrangements in the query and the target videos. More precisely, given a query video containing a particular activity, Q, we are interested in constructing a dense similarity map for every pixel in the target video, V, by utilizing pdf s of the volume arrangements in the video. At first, the query video is densely sampled and a low level codebook is constructed for local spatio-temporal video volumes. Then the ensemble of video volumes is formed. These data are used to create a high level codebook, $C^g$, for coding spatiotemporal compositional information of the video volumes, as described in Section 3. Finally, the query video is represented by its associated codebooks. In order to construct the similarity map for the target video, V, it is densely sampled at different spatio-temporal scales and the codewords from $C^\Im$ are assigned to the video volumes. Then the ensembles of video volumes are formed at every pixel and the similarity between the ensembles in V and the codewords in $C^\Im$ is measured using Equation (18). In this way, a similarity map is constructed at every pixel in the target video, $S_{Q,V}(x, y, t)$. The procedure for similarity map construction is described in detail in FIG. 8. Note again that no background and foreground segmentation and no explicit motion estimation are required in the proposed method.

Having constructed a similarity map, it remains to find the best match to the query video. Generally two scenarios are considered in activity recognition and video matching: (1) Detecting and localizing an activity of interest; and (2) Classifying a target video given more than one query, which is usually referred to as action classifications For both of these, the region in the target video that contains a similar activity to the query must be selected at an appropriate scale. Multi-scale activity localization is performed so that ensembles of volumes are generated at each scale independently. Hence, a set of independent similarity maps are produced for each scale. Therefore, for a given ensemble of volumes, E(x,y,t) in the target video, a likelihood function is formed at each scale as given by Equation (21) where $S_{Q,V}(x,y,t)$ is the similarity between the ensemble of volumes in the target video, E(x,y,t), and the most similar codeword in the high level codebook, $c_k \in C^*$, and scale represents the scale at which the similarity is measured. In order to localize the activity of interest, i.e., finding the most similar ensemble of volumes in the target video to the query, the maximum likelihood estimate of the scale at each pixel is employed. Accordingly, the most appropriate scale at each pixel is the one that maximizes the following likelihood estimate defined by Equation (22).

$$p(S_{Q,V}(x, y, t) \mid \text{scale}) \qquad (21)$$

$$\text{scale}^* = \underset{\text{scale}}{\text{argmax}}\ p(S_{Q,V}(x, y, t) \mid \text{scale}) \qquad (22)$$

In order to find the most similar ensemble to the query, a detection threshold is employed. Hence, an ensemble of volumes is said to be similar to the query and contains the activity of interest if $S_{Q,V}(x,y,t)|\text{scale} \geq \gamma$ at scale*. In this way, the region in the target video that matches the query is detected.

For action classification problem, we consider a set of queries, $Q = \cup \{Q_i\}$, each containing a particular activity. Then the target video is labeled according to the most similar video in the query. For each query video, $Q_i$, two codebooks are formed and then the similarity maps are constructed as described in FIG. 8. This produces a set of similarity maps for all activities of interest. Therefore, the target video contains a particular activity, i*, that maximizes the accumulated similarity between all ensembles of volumes in the target video as given by Equation (23).

$$i^* = \underset{i}{\text{argmax}} \left( \sum_{E(x,y,t) \in V} S_{Q,V}(x, y, t) \right) \qquad (23)$$

$$Q_i \in Q$$

Despite the simple inference mechanism employed within this embodiment for action recognition and localization, the obtained experimental results show the strength of the method described herein with respect to similarity map construction between two videos. That is, once a similarity map is constructed, an inference mechanism 18 of any complexity can be used for event recognition. It is also noted that the proposed statistical model of codeword assignment and the arrangement of the spatiotemporal volumes permits small local misalignments in the relative geometric arrangement of the composition. This property, in addition to the multi-scale volume construction in each ensemble, enables the algorithm to handle certain non-rigid deformations in space and time.

This, is performed since human actions are not considered to be reproducible, even for the same person. It would be evident to one skilled in the art that establishing an activity recognition process from a single example eliminates the need for a large number of training videos for model construction and significantly reduces computational costs. However, learning from a single example may not be as general as the models constructed using many training examples, and therefore in some embodiments of the invention the results may not be as general as the prior art model-based approaches. However, it would also be evident that constructing a generic viewpoint and scale invariant model for an activity requires a large amount of labeled training data 46, which do not currently exist. Moreover, imposing strong prior training examples assumes particular types of activities thereby reducing the search space of possible poses considered against the example, which limits the prior art model-based approaches in generalized deployment for action recognition. Accordingly, an online in-use action recognition system according to the principles discussed herein may be augmented with a new action through the provisioning of a single example of the action which implies a short query video, potentially a single frame.

2.2 Event Recognition and Content Based Video Retrieval—Experimental Results

The methodology described herein was tested on three different datasets, KTH [A12]. Weizmann [A13] and MSR II [A14], in order to determine its capabilities for action recognition. The Weizmann and KTH datasets are the standard benchmarks within the prior art for action recognition. The Weizmann dataset consists of ten different actions performed by nine actors, and the KTH action data set contains six different actions, performed by twenty-five different individual in four different scenarios (indoor, outdoor, outdoor at different scales, and outdoor with different clothes). The MSR II dataset consists of fifty four (54) video sequences, recorded in different environments with cluttered backgrounds in crowded scenes, and contains three types of actions similar to the KTH, namely boxing, hand clapping, and hand waving. The methodology was evaluated for three different scenarios. The first scenario being "action matching and retrieval using a single example", in which both target and query videos are selected from the same dataset. This task measures the capability of the proposed approach for video matching. The second scenario is the "single dataset action classification" task in which more than one query video is employed to construct the model of a specific activity. Here, single dataset classification implies that both query and target videos are selected from the same dataset. Finally, in order to measure the generalization capability of the algorithm to find similar activities in videos recorded in different environments, "cross-dataset action detection" was performed. This scenario implies that that the query and target videos could be selected from different datasets.

Video matching and classification were performed using KTH and Weizmann, which are single-person, single-activity videos. The evaluation employed them to compare with the current state-of-the-art even though they were collected in controlled environments. For cross-dataset action recognition, the KTH dataset was used as the query set, while the target videos were selected from the more challenging MSR II dataset. The experiments demonstrate the effectiveness of the hierarchical codebook method for action recognition in these various categories. In all cases, it was assumed that local video volumes are of size $n_x=n_y=n_t=5$, and the HOG is calculated assuming $n_\theta=16$ and $n_\phi=8$. The ensemble size was set to $r_x=r_y=r_1=50$. The number of codewords in the low- and high-level codebooks were set to 55 and 120 respectively. Later in this section the effect of different parameters on the performance of the algorithm is assessed.

2.2.1. Action Matching and Retrieval Using a Single Example

Since the proposed method is a video-to-video matching framework with a single example it is not necessary to have a training sequence. This means that one can select one labeled query video for each action, and find the most similar one to it in order to perform the labeling. For the Weizmann dataset one person for each action was used as a query video and the remainder, eight other individuals, as the target sets. This was performed for all individuals within the dataset and the results were averaged. The confusion matrix for the Weizmann dataset is shown in FIG. 9A, achieving an average recognition rate of 91.9% over all 10 actions. The columns of the confusion matrix represent the instances to be classified, while each row indicates the corresponding classification results.

Figure 9B:
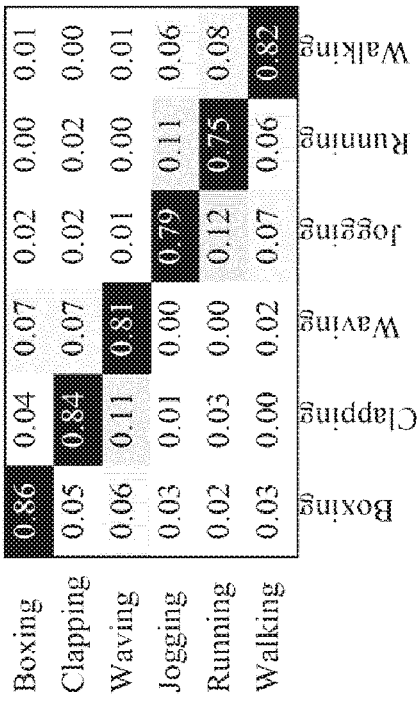
FIG. 9B depicts a confusion matrix for single video action matching using a KTH dataset.
Figure 9A:
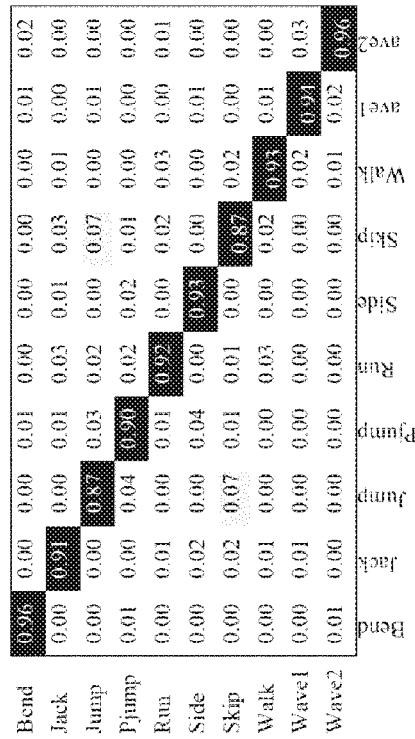
FIG. 9A depicts a confusion matrix for single video action matching using a Weizmann dataset.

The same experiment was also performed on the KTH dataset yielding the confusion matrix shown in FIG. 9B. The average recognition rate was 81.2% over all 6 actions. The results indicate that the process employed outperforms state-of-the-art approaches, even though the process requires no background/foreground segmentation and tracking. The average accuracy of the other methods is presented in Table 1. The overall results on the Weizmann dataset are better than those on the KTH dataset. This is predictable, since the Weizmann dataset contains videos with more static backgrounds and more stable and discriminative actions than the KTH dataset.

TABLE 1

Action Recognition Comparison with State-of-the-Art for Single Video Action Matching

| Method | Dataset | |
| --- | --- | --- |
|  | KTH | Weizman |
| Invention | 81.2 | 91.9 |
| Thi et al. [A59] | 77.17 | 88.6 |
| Seo et al. [A9] | 69 | 78 |

In order to measure the capabilities of the method in dealing with scale and illumination variations, the average recognition rate was reported for different recording scenarios in the KTH dataset. According to [A12], KTH contains four different recording conditions which are: (S1) outdoors; (S2) outdoors with scale variations; (S3) outdoors with different clothes; and (S4) indoors. The evaluation procedure employed here is to construct four sets of target videos, each having been obtained under the same recording condition. Then, a query is selected from one of these four scenarios and the most similar video to the query is found in each target dataset in order to perform the labeling. The average recognition rates are presented in Table 2. When the target and query videos are selected from the same subset of videos with the same recording conditions, the average recognition rate is higher than when they are taken under different recording conditions. Moreover, although the embodiments of the invention were presented as scale- and illumination-invariant, the results in Table 2 indicate that, in these experiments, the recognition rate decreases when the query and target videos have been taken under different recording conditions. This is particularly evident when the target videos are recorded at different scales (see the second column in Table 2). Thus scale and clothing variations degrade the performance of the algorithms more than variations in illumination. Accordingly, an activity model constructed using just a single example cannot adequately account for all scale/illumination variations.

TABLE 2

Single Video Action Matching in the KTH Dataset When Target Videos are Limited to Four Subsets.

|  |  | Target | | | |
| --- | --- | --- | --- | --- | --- |
|  |  | S1 | S2 | S3 | S4 |
| Query | S1 | 88.5 | 71.4 | 82.1 | 83.6 |
|  | S2 | 72.1 | 74.2 | 69.7 | 71.6 |
|  | S3 | 81.9 | 70.5 | 77.1 | 80.8 |
|  | S4 | 82.3 | 73.6 | 81.1 | 84.4 |

2.2.2. Single Dataset Action Classification

Figures 10A, 10B:
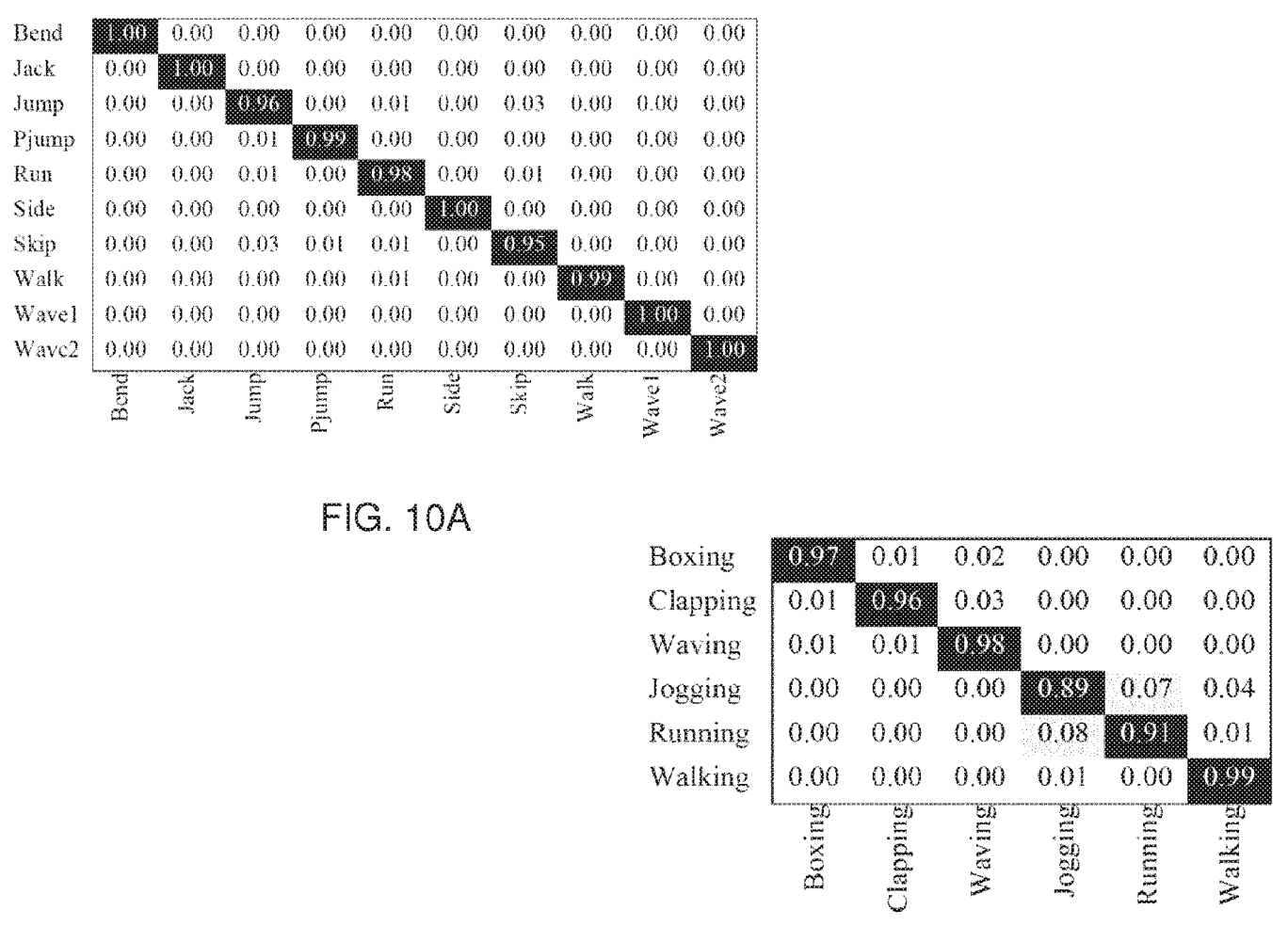

In order to make an additional quantitative comparison with the state-of-the-art, the comparison was extended it to the action classification problem. This refers to the more classical situation in which a set of query videos rather than just a single one are employed, as discussed previously. The algorithm has been evaluated according to an ability to apply the correct label to a given video sequence, when both the training and target datasets are obtained from the same dataset. The Weizmann and KTH datasets were tested, and applied the standard experimental procedures in the literature. For the Weizmann dataset, the common approach for classification is to use leave-one-out cross-validation, i.e., eight persons are used for training and the videos of the remaining person are matched to one of the ten possible action labels. Consistent with other methods in the literature, the four scenarios were mixed for each action in the KTH dataset. The standard experimental procedure was followed for this dataset [A12], in which 16 persons are used for training and nine for testing. This is done 100 times and after which the average performance over these random splits is calculated [A12]. The confusion matrix for the Weizmann dataset is reported in FIG. 10A and the average recognition rate is 98.7% over all 10 actions in the leave-one-out setting. As expected from earlier experiments reported in the literature, our results indicate that the "skip" and "jump" actions are easily confused, as they appear visually similar. For the KTH dataset, we achieved an average recognition rate of 95% for the six actions as shown in the confusion matrices in FIGS. 10A and 10B. As observed from FIG. 10B, the primary confusion occurs between jogging and running, which was also problematical for the other approaches. This is due to the inherent similarity between the two actions. The recognition rate was also compared to other approaches (see Table 3). Comparing our results with those of the state-of-the-art, it is observed that they are similar, though again the method does not require any background/foreground segmentation and tracking.

TABLE 3

Comparison of Action Recognition with the State-of-the-Art (Percentage of the average recognition rate).

| Method | Evaluation Approach | Dataset KTH | Weizmann |
|---|---|---|---|
| Invention | Split | 95.0 | 98.7 |
| Seo er. al. [A9] | Split | 95.1 | 97.5 |
| Thi et al. [A59] | Split | 94.67 | 98.9 |
| Tian et al. [A60] | Split | 94.5 | |
| Liu at al. [A42] | Leave one out | 94.2 | |
| Zhang at al. [A43] | Split | 94.0 | |
| Wang et al. [A36] | Split | 93.8 | |
| Yao et al. [A28] | Split | 93.5 | 97.8 |
| Bregunzio et al. [A31] | Leave one out | 93.17 | 96.6 |
| Ryoo et at [A44] | Split | 91.1 | |
| Yu at al. [A45] | Leave one out | 95.67 | |
| Mikolajczyk er al. [A8] | Split | 95.3 | |
| Jiang at al. [A27] | Leave one out | 95.77 | |

(Note)
For the KTH dataset the evaluation is made using either leave one out or data split as described in the original paper [A12].

2.2.3. Cross-Dataset Action Matching and Retrieval

Figure 11:
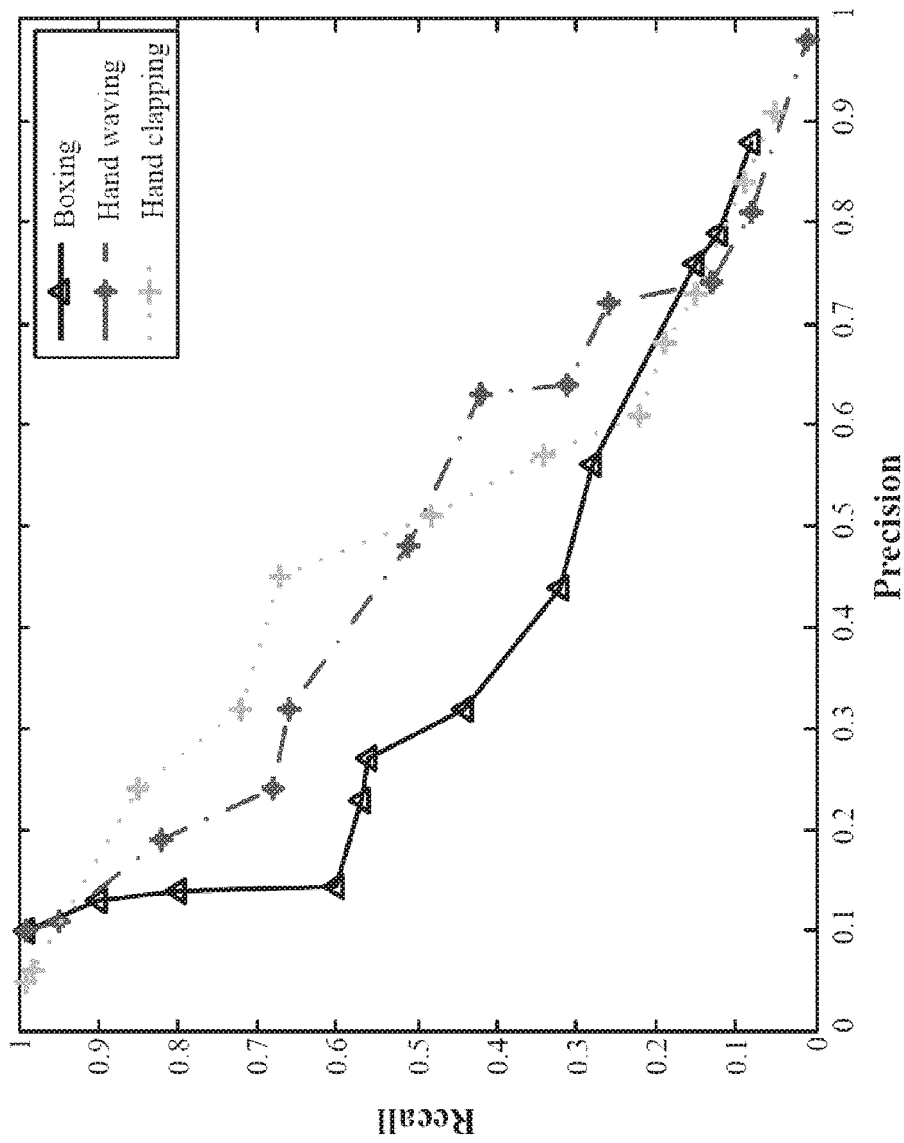
FIG. 11 depicts the precision-recall curves for cross-dataset action recognition.

Similar to other approaches for action recognition [A60], the cross-dataset recognition is used to measure the robustness and generalization capabilities of the algorithm. In this paradigm, the query videos are selected from one dataset (the KTH dataset in these experiments) and the targets from another (the MSR II dataset), so that similar actions performed by different persons in different environments are compared. The three classes of actions were selected from the KTH dataset as the query videos, i.e. boxing, hand waving, and hand clapping, including 25 persons performing each action. A hierarchical codebook was created for each action category and the query was matched to the target videos. The detection threshold, γ, was varied to obtain the precision/recall curves for each action type, as shown in FIG. 11. This achieved an overall recognition rate of 79.8%, which is comparable to the state-of-the-art, as shown in Table 4.

3. ANOMALY DETECTION

Within Section 1 a multi-scale hierarchical codebook methodology was presented which includes a hierarchical structure including four elements; namely sampling and coding a video using spatio-temporal volumes to produce a low-level codebook, constructing an ensemble of video volumes and representing their structure using probabilistic modeling of the compositions of the spatio-temporal volumes over a range of volumes, constructing a high-level codebook for the volume ensembles, and analyzing the codewords assigned to each pixel within the video image as a function of time in order to determine salient regions. Subsequently, in Section 2 this multi-scale hierarchal codebook methodology was employed in establishing activity recognition between a single query video and a video dataset.

In this section and the subsequent sections the multi-scale hierarchal codebook methodology is applied to simultaneously learning dominant and rare events in space and time. This is a generalized problem of abnormality detection, in which a model is learned for dominant events. In addition, spatio-temporal events are decomposed into spatial and temporal events to capture abnormalities in both space and time. As noted supra an anomaly may be defined as the spatio-temporal compositions in a video or set of videos with low probability of occurrence with respect to the previous observations. This implies that the anomalies are spatial, temporal, or spatio-temporal outliers that are different from the regularly observed patterns. The anomalies can be defined with respect to a context, meaning that a particular activity in a particular context would be an anomaly, while in another context it might be normal [B11].

Referring to FIG. 3 there are depicted the steps of the proposed anomalous activity recognition algorithm exploiting spatio-temporal compositions (STCs). As with the activity recognition, initially, a codebook model is constructed to group similar spatio-temporal video volumes and remove redundant data; Subsequently, a large contextual region (in space and time) around each video volume is examined although now the compositional relationships between video volumes are approximated using a mixture of Gaussians. To construct such a probabilistic model, a small number of video frames containing normal behaviors is necessary to initiate the on-line learning process. The minimum number of frames is governed by the extent of the size of the temporal context. Thus large numbers of training videos, containing valid behaviors, are unnecessary, as is usually the case with prior art approaches to anomaly detection.

Accordingly, the problem is transformed to a reconstruction problem using the formulation for anomaly detection in Equation (24) such that the problem is essentially reduced to being defined as an outlier detection problem, i.e. finding the events that are not similar enough to the previously observed events in the video. Therefore, given a video sequence, V, containing a set of events $V=\{e_i\}_{i=1}^N$ and a similarity measure S, the concept of an anomaly is defined for a particular event $e_q$ is given by Equation (24) where γ is a threshold.

$$e_q \in V$$

$$S_{q,i}=S(e_q,e_i)e_i \in V-\{e_q\} \quad (24)$$

$e_q$ is an anomaly if $\forall i, s_{q,i} \leq \gamma$

This implies that the event $e_q$ is not similar enough to any of the observed events. Similar to [B4], each event $e_i$ consists of a set of spatio-temporal video volumes, $p_k$, defined for all pixels inside a much larger contextual region around each pixel. As noted supra such a set is called an ensemble of volumes around the particular pixel in the video. The ensemble of volumes $E_i(x,y,t)$ is defined at each point in the video where (x,y) refer to the spatial position in the frame and t to the temporal location in the video. Accordingly re-writing Equation (4) for $p_k=v_j$ and j=k yields Equation (25) wherein $p_k=v_j$ is a spatio-temporal video volume (e.g. of size 7×7×4) and $R_i$ is a larger region in space and time around each pixel (e.g. of size 50×50×50). Although this formulation is straightforward, finding an anomaly is not trivial. Using this definition, the problem of finding short-term anomalous events will be modeled by means of a set of spatio-temporal volumes while using a probabilistic model of their spatial and temporal arrangements.

$$e_i = E_i = \{p_k^{E_i}\} \triangleq \{p_k : p_k \subset R_{(x,y,t)}\}_{k=1}^{K} \quad (25)$$

Equation (24) implies that the similarity between a newly observed video frame and all previous observations may be calculated according to Equation (24). In order to make a decision about new observations in a reasonable time, information regarding the spatio-temporal volumes and their relative arrangement in the regions of interest should be efficiently stored in the database. Accordingly, the following focuses on two issues, the reconstruction process, and a fast inference mechanism for anomaly detection. Accordingly, the algorithms described herein are intended to reduce the number of spatio-temporal volumes stored in the dataset in order to limit the search time, while still retaining a compact and accurate representation of the spatio-temporal arrangement of all volumes.

As illustrated in FIG. 3, the algorithm includes three main steps: sampling and coding the video to construct spatio-temporal volumes, probabilistic modeling of relative compositions of the spatio-temporal volumes, and application of the inference mechanism 18 to make decisions about newly observed videos. To construct a probabilistic model for an arrangement of the spatio-temporal volumes of "normal" actions, a few sample video frames containing such behaviors are used. These examples are observed in order to initialize (or train) the algorithm. Within the following sections these video frames are referred to as the "training set" 46. Although, currently, this probabilistic model is created during initialization, any other valid action that has not actually been observed during initialization can also be used.

3.1 Sampling and Coding

For anomaly detection, the intent is to measure the similarity between various spatio-temporal volumes in the observation set and the incoming video data in order to examine whether the actions are anomalous. Thus, newly observed data must be re-constructed using historical data. First, as described in respect of Section 1, the video 40 is densely sampled and spatio-temporal video volumes constructed from the densely sample video. This is then followed by codebook construction for grouping similar video volumes allowing the redundancy in the video volumes to be reduced, whilst retaining both informative volumes and the uncertainties in the codeword assignment. As noted supra during this process the codebook is continuously pruned to eliminate those that are either infrequent or very similar to the others, which ultimately generates M different codewords that are taken as the labels for the video volumes. $C = \{c_i\}_{i=1}^{M}$. As it is intended to measure the similarity of a new observation to a subset of previously observed normal actions, the codebook is formed using videos that contain valid actions.

Figure 12:
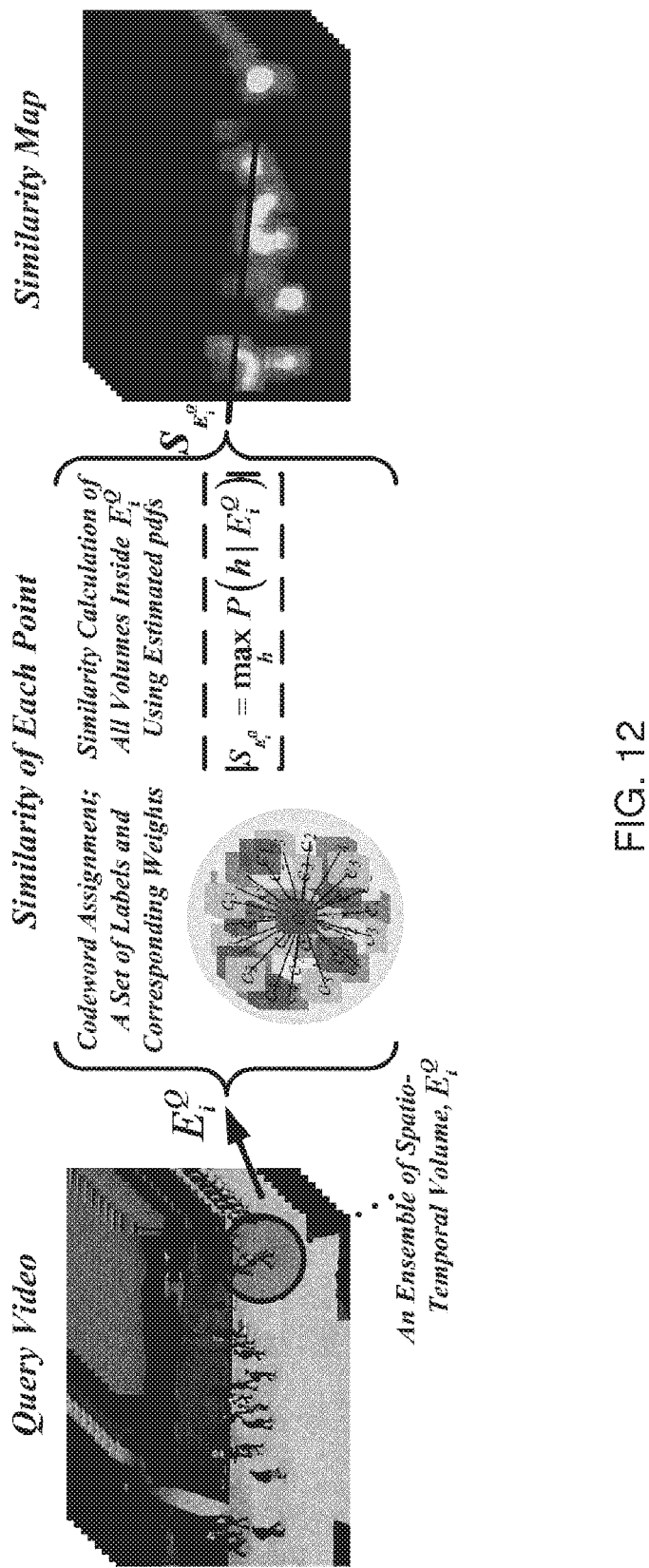
FIG. 12 depicts schematically the detection of anomalies in video data containing realistic scenarios.

After the initial codebook formation, each 3D volume, $v_i$, can be assigned to all labels, $c_i$'s with a degree of similarity, $w_{i,j}$, as shown in FIG. 6A. If one now considers a new visual observation, the query, then the goal is to estimate the likelihood of each pixel in the query of being normal. To accomplish this, a large region R (e.g. 50×50×50) around each pixel is considered and the likelihood is calculated by measuring the similarity between the volume arrangement in the query and the dataset as described by Equation (24). However, as discussed supra in respect of Section B the region R now contains many volumes with different spatial and temporal sizes. Accordingly, abnormality detection is reduced to constructing a similarity map of new observations with respect to all of the previous ones (FIG. 12). In doing this, the similarity between many different topologies of ensembles of volumes is taken into account in order to capture the specific context of each pixel. The use of spatio-temporal context surrounding a pixel will tend to influence the ultimate choice of the codeword associated with a particular pixel.

3.2 Capturing the Topology of an Ensemble of Spatio-Temporal Volumes

Figure 13A:
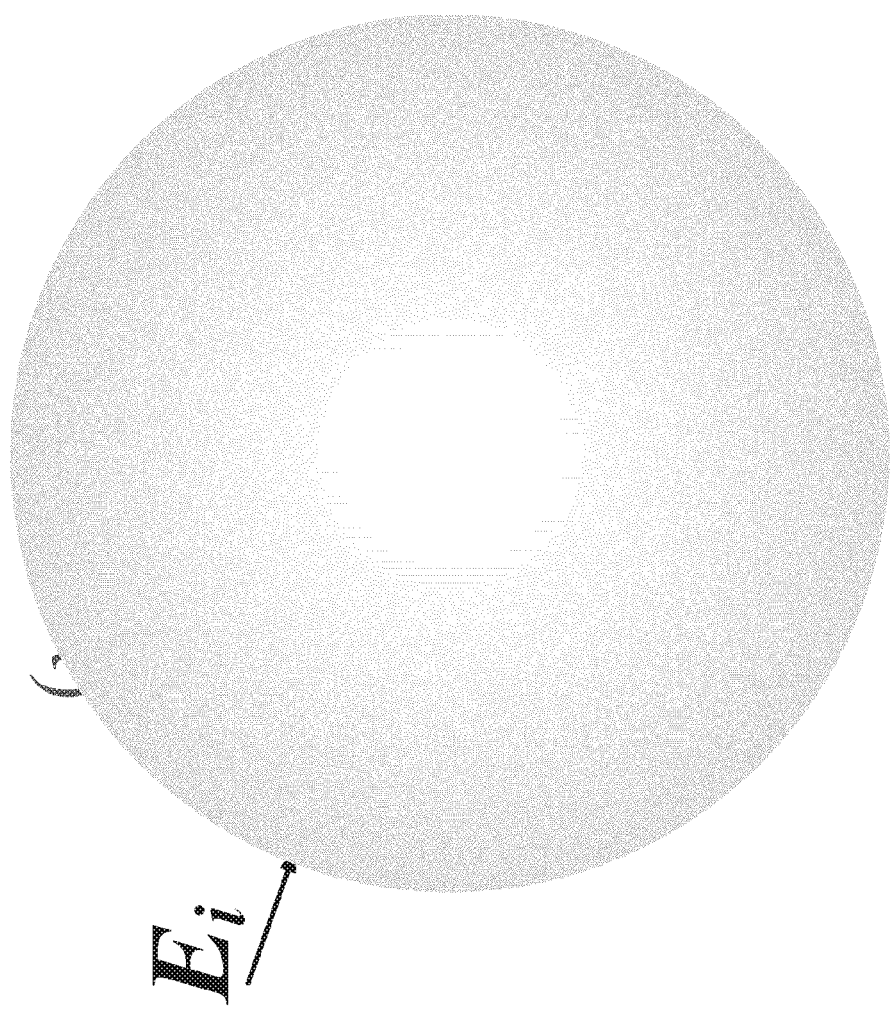
FIG. 13A depicts the relative spatio-temporal coordinates of a particular video volume inside an ensemble of volumes.

Accordingly, as discussed supra in Section B we represent an ensemble of video volumes, $E_i$ at $(x_i, y_i, t_i)$ containing K spatio-temporal volumes. Hence, the ensemble $E_i$ is centered at a video volume $v_i$ located at the point $(x_i, y_i, t_i)$ in absolute coordinates. Now, in contrast to the discussion supra we use the relative spatio-temporal coordinates of the volume in an ensemble to account for its position, as shown in FIG. 13A. Hence, considering the kth volume in $E_i$ we define $\Delta_{v_k}^{E_i} \in R^3$ as the relative position in space and time of the k th video volume, $v_k$, located at the point $(x_k, y_k, t_k)$ inside the ensemble of volumes $\Delta_{v_k}^{E_i}$ as defined by Equation (26).

$$\Delta_{v_k}^{E_i} = (x_k - x_i, y_k - y_i, t_k - t_i) \quad (26)$$

$$E_i = \{\Delta_{v_k}^{E_i}, v_k, v_i\}_{k=1}^{K} \quad (27)$$

Figure 13B:
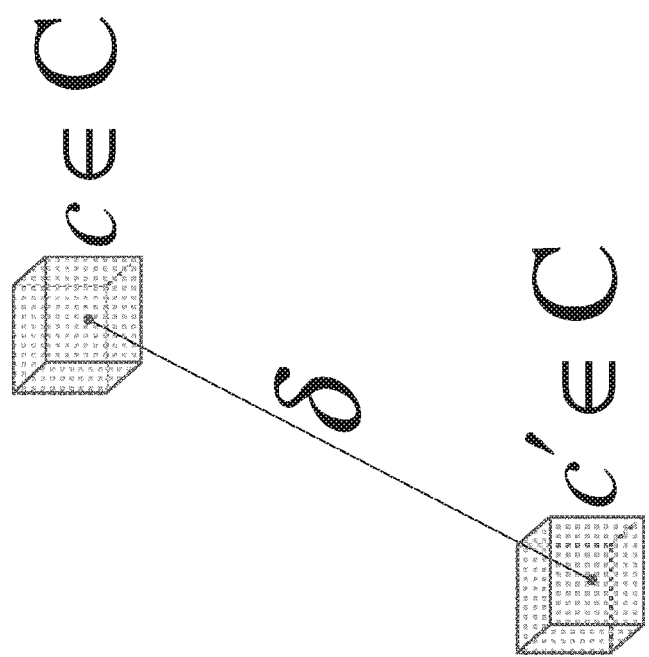
FIG. 13B depicts codeword assignment to the video volumes inside the ensemble.

Now each ensemble of video volumes at location $(x_i, y_i, t_i)$ is represented by a set of such video volumes and their relative positions with respect to the central video volume. Accordingly, Equation (25) may be re-written as Equation (27) where K is the total number of video volumes inside the ensemble. Now during the codeword assignment process described in the Sections B.2.3 and B.2.4 a codeword $c \in C$ would now be assigned to each video volume, $v_k$, inside each ensemble with an associated degree of similarity determined by the Euclidean distance as defined in Equation (3). Given the codewords assigned to the video volumes, then each ensemble of volumes can be represented by a set of codewords and their spatio-temporal relationships. Assuming that $V \subset R^{n_x, n_y, n_t}$ is the space of the descriptors for a video volume and that C is the codebook constructed then let $c: V \to C$ be a random variable, which assigns a codeword to a video volume. Assume that $c': V \to C$ is a random variable denoting the assigned codeword to the central video volume of an ensemble. Therefore, $\delta: R^3 \to R^3$ is a random variable denoting the relative position of a codeword c to the codeword assigned to the central video volume of the ensemble, c'. Given this then as in Section 1.2.3 and 1.2.4 an ensemble of volumes can be represented as a graph of codewords and their spatio-temporal relationship, as shown in FIG. 13B.

Having defined the representation of the ensemble of volumes in Equation (27) and given the assigned codewords to the video volumes as described above, a set of hypotheses describing the topology of each ensembles can be defined. Those hypotheses are then used for constructing a similarity map between the topologies of the ensembles in a new observation with respect to all of the previous observations. If we consider each hypothesis, h, as a tuple $h = (c, c', \delta)$. Therefore, the set of hypotheses, H, which describe the topology of each ensemble is defined by Equation (28).

$$H = \bigcup_{h} \{h\} = \bigcup_{\substack{c \in C \\ c' \in C}} \{(c, c', \delta)\} \quad (28)$$

Suppose we now consider sampling the video frame-by-frame and pixel-by-pixel in each frame. Let $O=(v_k, v_i, \Delta_{v_k}^{E_i})$ signify a single observation, where $v_k$ denotes any observed video volume inside an ensemble, $E_i$; $v_i$ denotes the observed video volume at the center of the ensemble; and $\Delta_{v_k}^{E_i}$ is the relative location of the observed video volume, $v_k$, with respect to the $v_i$, inside $E_i$. The aim is to measure the probability of each hypothesis given the observation. Therefore, given an observation, O, the posterior probability of each hypothesis, h, is given by Equation (29). The posterior probability in Equation (29) defines the probability of observing the codewords c, c', and their relative position, $\delta$, given the observed video volumes $(v_k, v_i, \Delta_{v_k}^{E_i})$. Accordingly, Equation (28) can be rewritten as Equation (29).

$$P(h|O) = P(c, c', \delta | v_i, v_i, \Delta_{v_k}^{E_i}) \quad (28)$$

$$P(c, c', \delta | v_k, v_i, \Delta_{v_k}^{E_i}) = P(c' | \delta, c, v_k, v_i, \Delta_{v_k}^{E_i}) P(c | v_k, v_i, \Delta_{v_k}^{E_i}) \quad (29)$$

Now, in a similar manner as with the action recognition since an observed video volume, $v_k$, has been replaced by a postulated interpretation, c, the first factor on the right hand side of Equation (9) can be treated as being independent of $v_k$. Moreover, as it is assumed that video volumes $v_k$ and $v_i$ are independent. Hence, $v_i$ can be removed from the second factor on the right hand side of Equation (29) such that it can be rewritten as Equation (30). On the other hand, the codeword assigned to a video volume is independent of its position, $\Delta_{v_k}^{E_i}$. Accordingly, Equation (30) can be reduced to Equation (31), which can be re-written as Equation (32). Similarly, by assuming independency between codewords and Equation (32) can be reduced to Equation (33).

$$P(c, c', \delta | v_k, v_i, \Delta_{v_k}^{E_i}) = P(c' | \delta, c, v_i, \Delta_{v_k}^{E_i}) P(c | v_k, \Delta_{v_k}^{E_i}) \quad (30)$$

$$P(c, c', \delta | v_k, v_i, \Delta_{v_k}^{E_i}) = P(c' | \delta, c, v_i, \Delta_{v_k}^{E_i}) P(c | v_k) \quad (31)$$

$$P(c, c', \delta | v_k, v_i, \Delta_{v_k}^{E_i}) = P(\delta | c, c', v_i, \Delta_{v_k}^{E_i}) P(c' | c, v_i, \Delta_{v_k}^{E_i}) P(c | v_k) \quad (32)$$

$$P(c, c', \delta | v_k, v_i, \Delta_{v_k}^{E_i}) = P(\delta | c, c', \Delta_{v_k}^{E_i}) P(c' | v_i) P(c | v_k) \quad (33)$$

Accordingly, knowing the codeword assigned to the video volume, c, and the codeword assigned to the central video volume of the ensemble, c', the first factor on the right hand side of Equation (33), $P(\delta | c, c', \Delta_{v_k}^{E_i})$, represents the probabilistic vote for a spatio-temporal position, $\delta$. Thus, given a set of ensembles of video volumes, it can be formed using either a parametric model or non-parametric estimation. Within this description this pdf is approximated using a combination of Gaussians. The maximum number of Gaussians is set to three and the parameters of the Gaussians are optimized using an expectation-maximization procedure [B65]. The second and third terms in the right hand side of Equation (33) $P(c' | v_i)$ and $P(c | v_k)$ are the votes for each codeword entry and are obtained as a result of the codeword assignment procedure. Thus, given an ensemble of spatio-temporal video volumes, the likelihood of its composition can be computed simply by using the pdf s instead of laboriously comparing all other video volumes compositions in the dataset. As discussed in the next section, anomalous events are determined from these pdf s by selecting those compositions with very low likelihood of occurrence. Comparing this with [B4], in which an exhaustive search was employed to determine the optimal ensemble it is evident that the present methodology is capable of retaining adequate information about the spatio-temporal arrangement of the volumes while reducing the memory requirements. It also greatly reduces the dimension of the search space for finding similar regions in the dataset for a new observation.

3.3. Detecting Anomalous Patterns (Inference Mechanism)

Next, consider the scenario of a continuously operating surveillance system. At each temporal sample t, a single image is added to the already observed frames and the resulting video sequence, the query, Q, is formed. In order to detect anomalous patterns, the posterior probability of each pixel in the query video is calculated using the ensemble of the spatio-temporal volumes around it to determine whether the point is related to the normal events or is suspicious. Given Equation (28) which details the ensemble topology hypotheses, H, obtained from the previous section, the posterior probability of an ensemble of volumes in the query is calculated as $P(H|E_i^Q)$. Here $E_i^Q$ represents the ensemble of video volumes in the query centered at point $(x_i, y_i, t_i)$. Thus given $E_i^Q$, we wish to search for previously observed ensembles that are most similar to the newly observed ensemble in terms of both their video volumes and topologies. In other words, the posterior probability should be maximized as provided by Equation (34)

$$\max_h P(H | E_i^Q) = \max_{\substack{c \in C \\ c' \in C}} P(c, c', \delta | E_i^Q) \quad (34)$$

Since each ensemble is represented by its spatio-temporal video volumes, relative position and the central volume, and assuming that the observed video volumes are independent, then the right side of the above equation can be written as the product of the posterior probability of every video volume inside the ensemble yielding Equation (35) where $q_k$ is the video volume inside $E_i^Q$, $q_i$ is the central volume of $E_i^Q$, $\Delta_{q_k}^{E_i^Q}$ is the relative position of the $q_k$, and K is the total number of spatio-temporal video volumes inside the ensemble. Referring to Equation (33), it is obvious that $P(c, c', \delta | q_k, q_i, \Delta_{q_k}^{E_i^Q})$ can be re-written as given by Equation (36) and accordingly, the maximum posterior probability in Equation (34) can then be re-written as Equation (36).

$$P(c, c', \delta | E_i^Q) = \prod_k^K P\left(c, c', \delta | q_k, q_i, \Delta_{q_k}^{E_i^Q}\right) \quad (35)$$

$$P(c, c', \delta | E_i^Q) = \prod_k^K P\left(\delta | c, c', \Delta_{q_k}^{E_i^Q}\right) P(c | q_k) P(c | q_i) \quad (36)$$

$$\max_{\substack{c \in C \\ c' \in C}} P(c, c', \delta | E_i^Q) = \max_{\substack{c \in C \\ c' \in C}} \prod_k^K P\left(\delta | c, c', \Delta_{q_k}^{E_i^Q}\right) P(c | q_k) P(c | q_i) \quad (37)$$

It can be appreciated that this is a straightforward computation because the prior probability of each spatio-temporal volume in the query has been calculated during codeword assignment as described in Section 3.1. The posterior probability is calculated using the estimated probability distribution functions in Section 3.2.

In summary, at first, the query, Q, is densely sampled at different spatio-temporal scales in order to construct the video volumes. Each volume $q_k$ is assigned to a codeword $c \in C c \in C$ with similarity being obtained from their normalized weight as derived from Equation (3) exploiting Euclidean distance. The probability of being normal of every pixel in a video frame is then calculated using the spatio-temporal arrangement of the volumes inside each ensemble, $E_i^Q$. As a result, the likelihood of every pixel in each frame is approximated, see FIG. 12. Ultimately, the likelihoods of all in the video frame will yield a similarity map of the whole frame. It would be evident that those regions in a frame of the video containing suspicious behavior(s) will have less similarity to the examples already observed. Thus, decisions about anomalous actions can be made using the calculated similarity map, which is based on a threshold. In the experiments described in this paper, a single threshold for all test sequences was applied to the similarity map. The similarity map was processed before thresholding by a spatio-temporal median filter to reduce noise effects and outliers. However, it would be evident that alternatively, multiple thresholds may be applied with or without filtering for noise reduction and/or outlier reduction.

It may be noted that the proposed statistical model of codeword assignment and the arrangement of the spatio-temporal volumes permit small local misalignments in the relative geometric arrangement of the composition. This property, in addition to the multi-scale volume construction in each ensemble, enables the algorithm to handle certain non-rigid deformations in space and time. This is likely necessary since human actions are not exactly reproducible, even for the same person.

3.4. Algorithm Initialization

Before reviewing experimental results, initialization of the algorithm is presented. The scenario considered implies on-line and continuous surveillance of a particular scene in order to detect anomalous patterns. Accordingly, the system requires that only the first n frames of the video stream initiate the process. n should be taken to be at least equal to the temporal size of the ensembles, $R_t$, as given by Equation (25) in order to construct a successful model of the previous observations. These n frames must contain only normal events, and the inventors refer to them as the training or initialization sequence. The actual number of initialization frames (n) required and its effect on the detection results are presented below. To initiate the codebook during the first n frames, each video volume is assigned to a codeword with a similarity weight using the procedure explained in Section 3.1. In addition, probability distribution functions of spatio-temporal arrangements of the codewords are also estimated.

This can be accomplished either online or offline. When the next frame, (n+1)th frame, arrives it is densely sampled to construct spatio-temporal video volumes and the ensembles of these video volumes. Their similarity to the volumes that have already been obtained is computed using the codebook constructed during the initialization procedure and inference mechanism described in Section 3.3. In this manner the algorithm learns newly observed normal events in an unsupervised manner. In a manner similar to [B3, B4], dominant events are assumed to be the normal activities whilst rarely observed activities are considered as anomalies.

4. ANOMALY DETECTION—EXPERIMENTAL RESULTS

The algorithm described supra was tested on crowded and non-crowded scenes (one or two persons in the scene) in order to measure the capabilities of the invention for anomalous activity recognition. Four publicly available datasets of anomalous events were used: the Weizmann anomalous walking patterns of a person [B4] (http://www.wisdom.weizmann.ac.il/~vision/Irregularities.html); the University of California San Diego (UCSD) pedestrian dataset (http://www.svr:l.ucsd.edu/progects/anomaly), which has recently been published and actually consists of two datasets [B6]; the subway surveillance videos" [B3]; and the anomaly detection datasets [B8] (http://www.cse.yorku.ca/vis1on/research/spatiotemporal-anomalous—behavior.shtml),
wherein the last contains videos captured under variable illumination conditions. Except for the first dataset, the others were gathered in realistic environments. To evaluate performance, the results were also compared with other pixel-level approaches of current interest, such as Inference by Composition (IBC) [B4], Mixture of Dynamic Textures (MDT) [B6], Space-Time Markov Random Fields (ST-MRF) [B42], Local Optical Flows [B3], and spatio-temporal oriented energy filters [B8]. The IBC method is currently considered to be one of the most accurate for pixel level saliency detection and was tested to demonstrate that the presently described algorithm produced similar results.

IBC calculates the likelihood of every point in each frame. This is achieved by examining the spatio-temporal volumes and their arrangements in a large region surrounding the pixels in a query video. ST-MRF models the normal activity using multiple probabilistic principle component analysis models of local optical flow [B42], while MDT can be considered as an extension of the dynamic texture-based models and is capable of detecting both spatial and temporal abnormalities [B6]. Although the latter requires a large training dataset, it was used here for comparing results because of its superior performance on the UCSD pedestrian dataset.

4.1. Datasets for Anomaly Detection

The first dataset discussed illustrates the situation with one or two persons within the scene. The training video is short (24 seconds) and contains normal acted behaviors representing two different actions of a single person, walking and jogging. The query is a long video clip which contains both acted normal and abnormal behaviors of one or two persons in the scene. In some sequences one of individuals performs a normal action and the other, a suspicious action. The existence of the simultaneous occurrence of both normal and suspicious activities in the video provides an opportunity to evaluate the localization ability of the proposed method. The suspicious behaviors in the dataset are abnormal walking patterns, crawling, jumping over objects, falling down, etc.

The second dataset used for performance evaluation of the proposed approach was the UCSD pedestrian dataset. It contains video sequences from two pedestrian walkways where abnormal events occur. The dataset contains different crowd densities, and the anomalous patterns are the presence of non-pedestrians on a walkway (bicyclists, skaters, small carts, and people in wheelchairs). The UCSD pedestrian dataset contains 34 normal video clips for the first scene (UCSD Ped 1) and 36 video clips containing one or more anomalies for testing; and 16 normal video clips for the second scene (UCSD Ped 2), together with 14 test video clips.

The third dataset contains two actual surveillance videos of a subway station [B3] recorded by a camera at the entrance and exit gates. The entrance gate surveillance video is 96 minutes long and shows normal events such as going down through the turnstiles and entering the platform. There are also scenes containing 66 anomalous events, mainly walking in the wrong direction, irregular interactions between people and some other events, including sudden stopping, running fast, etc. [B3]. The second video, the exit gate surveillance video, is 43 minutes long and contains 19 anomalous events, mainly walking in the wrong direction and loitering near the exit [B3]. Neither the surveillance videos nor groups of frames within them are labeled as training or testing videos.

The fourth dataset contains real-world videos with more complicated dynamic backgrounds plus variable illumination conditions. Notwithstanding the significant environmental changes in this dataset the abnormalities are actually simplistic motions (e.g. motion in the scene or different motion direction). Three videos from this dataset were used, which have variable illumination and dynamic backgrounds: the Train, the Belleview, and the Boat-Sea video sequences. The Train sequence is the most challenging one in this dataset [B8] due to drastically varying illumination and camera jitter. In this sequence, the abnormalities relate to the movement of people. The other sequence is a traffic scene in which the lighting conditions change gradually during different times of the day and the abnormalities are cars entering the intersection from the left or right. In the last video sequence the abnormalities are the passing boats in the sea. Similar to the subway surveillance video dataset, there are no separate training and testing sequences.

4.2. Performance Evaluation: Abnormality Detection and Localization

Figure 14:
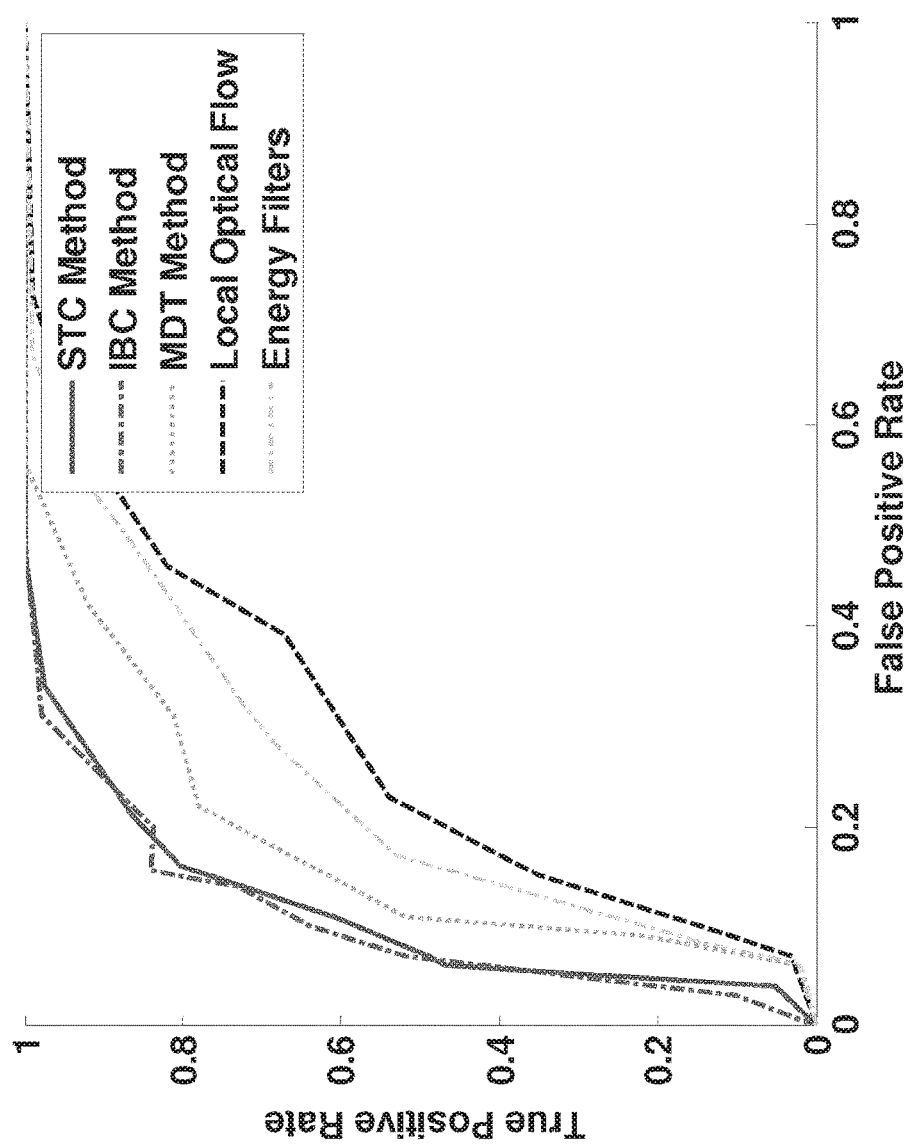
FIG. 14 depicts a comparison of ROCs.
Figure 15A:
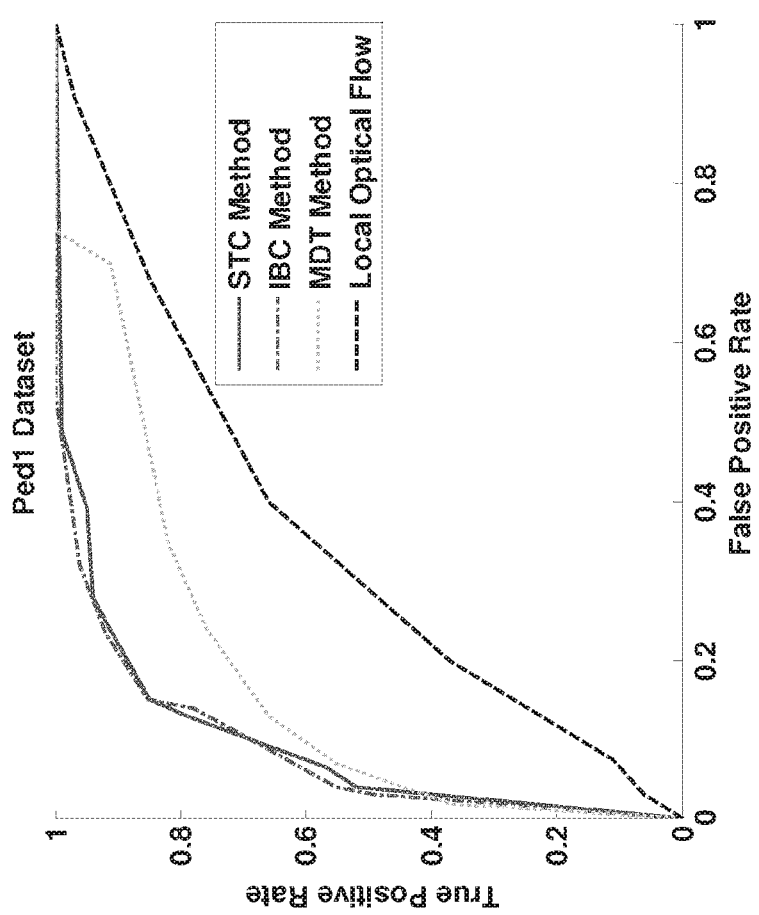
FIG. 15A depicts a comparison of ROCs for the UCSD pedestrian 1 dataset.
Figure 15B:
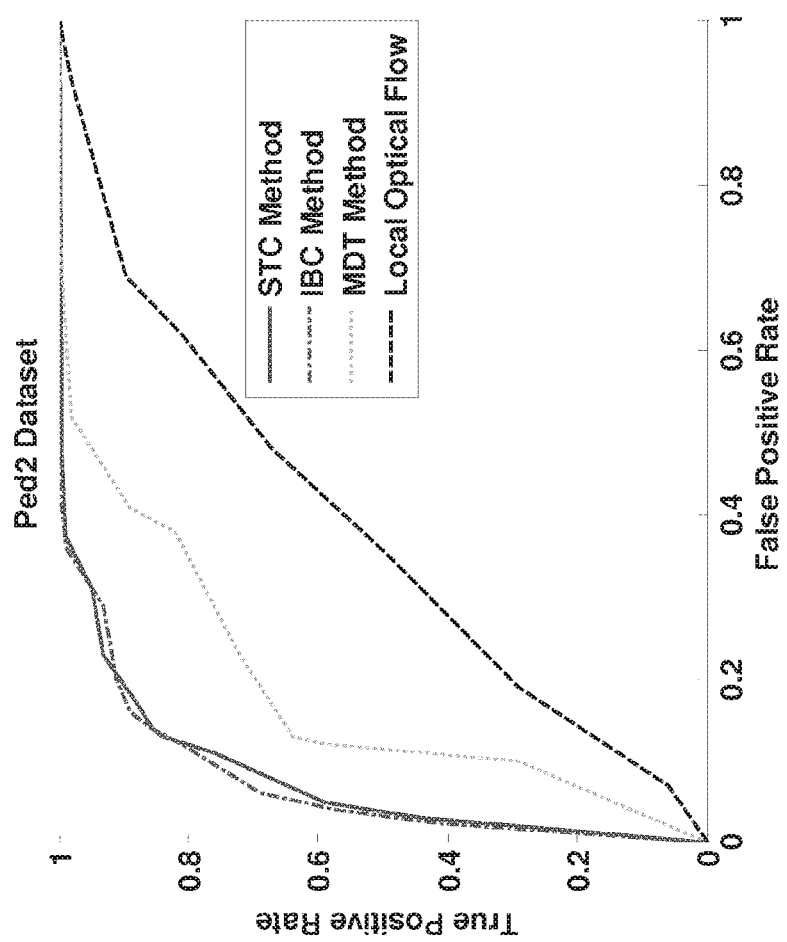
FIG. 15B depicts a comparison of ROCs for the UCSD pedestrian 1 dataset.

Performance evaluation of any anomaly detection method can be conducted either at the frame or pixel level. Frame level detection implies that a frame is marked as suspicious if it contains any abnormal pixel, regardless of its location. On the other hand, pixel level detection attempts to measure the localization ability of an algorithm. This requires the detected pixels in each video frame to be compared to a pixel level ground truth map. Clearly, such abnormality localization is more important than marking the whole frame as suspicious. We first consider a quantitative comparison of different approaches for anomaly detection at the frame level. Referring to FIG. 14 there are depicted the receiver operating characteristic (ROC) for the first dataset (containing anomalous walking patterns), plotted as a function of the detection threshold for different anomaly detection methods. Following the evaluation procedure of [B3, B4], each frame is marked as abnormal if it contains at least one pixel detected as an anomaly. Similarly the inventors performed frame level detection on the UCSD pedestrian dataset and the ROC curves are illustrated in FIGS. 15A and 15B. It is clear from FIGS. 14, 15A and 15B respectively that the IBC and STC produce more accurate results than the others, particularly MDT on the UCSD pedestrian dataset. It may be noted that MDT had been previously reported to have achieved the highest recognition rate for the UCSD dataset [B10].

It may also be noted that the similar performance of the STC (invention) and IBC was probably predictable, because STC summarizes the spatio-temporal relationships between the video patches, while IBC maintains these by storing all spatio-temporal arrangements of all volumes in the dataset. This indicates that there was no performance loss notwithstanding the fact that STC (invention) is based on probabilities and performs in real-time with substantially lower memory and processing requirements. Thus while the two methods may achieve similar results for anomalous event detection, the STC methodology according to embodiments of the invention offers advantages over IBC. First it is faster, see Table 4, and, secondly, it requires much less memory to store the learned data. These issues would also be important if the presently described approach were to be used to describe and summarize normal rather than just anomalous behaviors.

TABLE 4

Required Computational Time (Processing Time per Frame in Seconds)

| | Algorithm Used for Anomaly Detection | | |
|---|---|---|---|
| Dataset | STC Method (Invention) | MDT Method | IBC Method |
| Ped1 | 0.19 | 21 | 69 |
| Ped2 | 0.22 | 29 | 83 |
| Subway | 0.24 | 38 | 113 |
| Walking Patterns | 0.23 | 32 | 74 |

The second approach for performance evaluation is to measure the localization performance by evaluating it at the pixel level. To date, pixel level localization can only be measured for a small number of datasets among existing public databases, since it requires ground truth maps. USCD pedestrian datasets [B6], and the anomaly detection dataset [B8] are the two datasets that include ground truth maps in which each region containing an anomalous event is marked manually. Thus the detected pixels in each video frame are compared to the ground truth map at the pixel level. For UCSD pedestrian datasets, anomaly detection is deemed to have occurred when at least 40% of the actual anomalous pixels have been detected. Otherwise it is considered to be a false alarm. The equal error rate (EER), the percentage of misclassified frames when the false positive rate is equal to the miss rate, is calculated for both pixel and frame level analyses and presented in Table 2.

TABLE 5

Quantitative Comparison of the Invention (STC) and the State-of-the-Art for Anomaly Detection using the UCSD Pedestrians Dataset

| Method | Dataset | Frame Level (%) | Pixel Level EER (%) | Number of Training Frames |
|---|---|---|---|---|
| Invention | Ped1 | 15 | 27 | 200 |
| | Ped2 | 13 | 26 | 180 |
| MDT [B6] | Ped1 | 25 | 58 | 6800 |
| | Ped2 | 24 | 54 | 2880 |
| IBC [B4] | Ped1 | 14 | 26 | 6800 |
| | Ped2 | 13 | 26 | 2880 |
| Zaharescu and Wildes [B8] (Note) | Ped1 | 29 | 41 | 6800 |
| | Ped2 | 27 | 36 | 2880 |
| Bertini et al [B10] (Note) | Ped1 | 31 | 70 | 6800 |
| | Ped2 | 30 | — | 2880 |
| Reddy et al [B57] (Note) | Ped1 | 22.5 | 32 | 6800 |
| | Ped2 | 20 | — | 2880 |
| Antic and Ommer [B66] | Ped1 | 18 | — | 6800 |
| | Ped2 | 14 | — | 2880 |
| ST-MRF [B42] | Ped1 | 40 | 82 | 6800 |
| | Ped2 | 30 | — | 2880 |
| Local Optical Flow [B3] (Note) | Ped1 | 38 | 76 | 6800 |
| | Ped2 | 42 | — | 2880 |

(Note)
Method claimed to have real time performance

The results in Table 5 demonstrate that as expected IBC, outperformed the prior art approaches both at the frame and pixel levels. Furthermore, it can detect anomalous patterns without significant performance degradation when there is perspective distortion and changes in spatial scale (UCSD Ped 1 dataset). This is in distinction to optical flow approaches that cannot handle this issue easily [B6]. Moreover the computational time required by the method described in this paper is significantly lower than other non-local approaches within the prior art. In order to make a fair comparison of different approaches, the STC algorithm must be judged against the other prior algorithms that claim real time performance as indicated in Table 5. Thus, it can be observed that the STC algorithm according to embodiments of the invention outperforms all other real-time algorithms and achieves improved results for the UCSD pedestrian dataset at both frame level detection and pixel level localization. It should also be noted that the results reported in Table 2 for all other methods were obtained using 50 video sequences for training, with a total of 6,800 video frames, while the STC algorithm presented herein used just one short video sequence of 200 frames. This is a major advantage the STC algorithm according in that it does not require long video sequences for initialization.

Experiments on another real-world video dataset were also carried out, namely the subway surveillance dataset. The training strategy for the subway surveillance video is different from the UCSD pedestrian dataset, since no training set containing only normal events is available. Therefore, two approaches were used for initialization. The first one exploited a fixed number of frames, which is similar to previously reported approaches. Analogous to [B42, B54], the first 5 minutes of the entrance gate video and the first 15 minutes of the exit gate video were chosen for initialization. The second approach was to continue learning newly observed events while still detecting the anomalies. The results are presented in Table 6. Compared with the other approaches for abnormality detection, the STC algorithm produces comparable results to the state of the art. It can also be observed that that performance of the STC algorithm is independent of the initialization strategy, although continuous learning does provide slightly better results.

TABLE 6

Comparison of Different Methods and Learning Approaches for the Subway Videos.

| Method | Dataset | Training | Abnormal Events | False Alarm |
|---|---|---|---|---|
| Invention | Entrance | 5 min. | 60/66 | 4 |
|  | Exit | 15 min. | 19/19 | 2 |
| Invention | Entrance | Continuous Learning | 61/66 | 4 |
|  | Exit | Continuous Learning | 19/19 | 2 |
| ST-MRF [B42] | Entrance | 5 min. | 57/66 | 6 |
|  | Exit | 15 min. | 19/19 | 3 |
| Dynamic Sparse Coding [B54] (Note) | Entrance | Continuous Learning | 60/66 | 5 |
|  | Exit | Continuous Learning | 19/19 | 2 |
| Sparse Reconstruction [B58] (Note) | Entrance | 10 min. | 27/31 | 4 |
|  | Exit | 10 min. | 9/9 | 0 |
| Local Optical Flow [B3] (Note) | Entrance | 5 min. | 17/21 | 4 |
|  | Exit | 15 min. | 9/9 | 2 |

(In the fourth column, the first number denotes the detected anomalous events; the second is the actual number of anomalous events)
(Note) indicates that the method is claimed to have real time performance).

Figure 16:
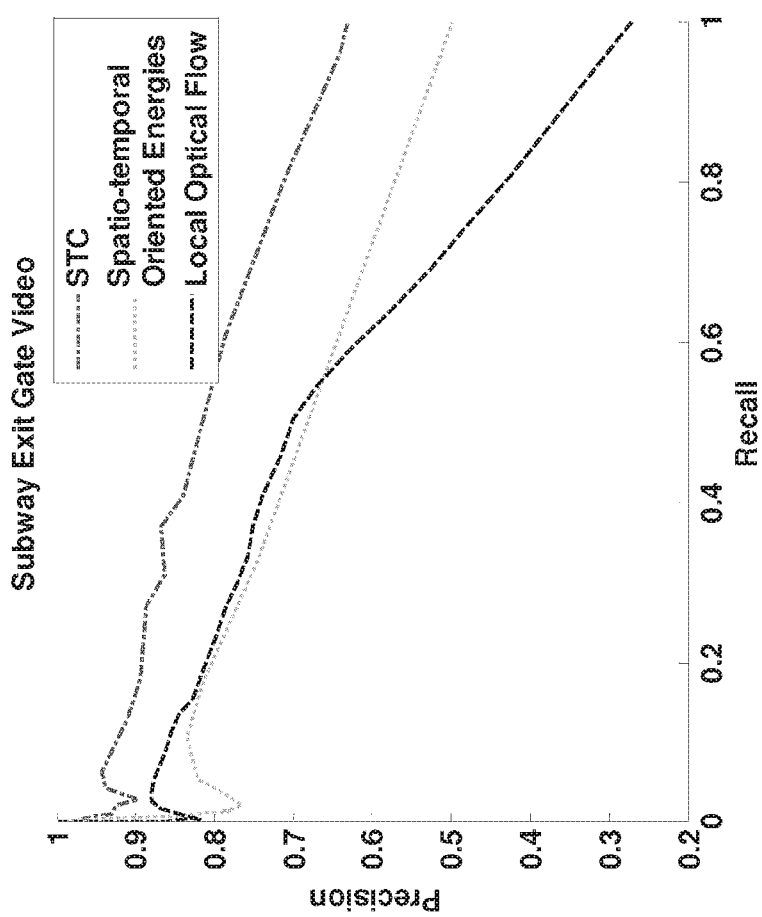
FIG. 16 depicts a comparison of precision/recall curves for abnormality localization for the subway exit gate video surveillance sequence.

The localization performance of the STC algorithm was also evaluated using pixel level ground truth. Abnormality detection was performed for the subway exit gate video using the same initialization strategy as the frame level detection. The ground truth map for this video was produced manually by the authors of [B8] for wrong way motion abnormalities. Referring to FIG. 16 there is depicted the precision recall curves of the proposed algorithm and that of the spatio-temporal oriented energies method [B8]. The STC algorithm shows superior performance. This can be attributed to the fact that it accounts for contextual information in the scene and hence it is capable of learning complicated behaviors. Although adding contextual information increases the computational complexity of the STC algorithm when compared to local approaches, it is still fast enough for real-time abnormality detection and localization.

Although the experiments described above indicate that the STC algorithm can detect complicated abnormal behaviors in realistic scenes (UCSD pedestrian dataset and subway surveillance videos), experiments were also conducted for the fourth dataset. Although this dataset contains relatively simple abnormal events, the inventors tested it to evaluate the effect of continuous learning under variable and difficult illumination conditions. The same strategy was followed for initialization of the algorithm as in [B8], in which the first 800 frames of the Train video and the first 200 frames of the Belleview and Boat-Sea video sequences were considered to be the initialization frames (these contain a total of 19,218, 2,918 and 2,207 frames, respectively). The results were compared with two alternative pixel-level anomaly detection methods, namely spatio-temporal oriented energies [B8] and local optical flow [B3]. Although the abnormalities in this dataset are actually low level motions, pixel-level background models and behavior template approaches [B30] are excluded from the comparisons as they do not achieve acceptable results [B8]. The precision-recall curve of the STC algorithm STC method and two alternatives are presented in FIGS. 17A to 17C.

Figure 17A:
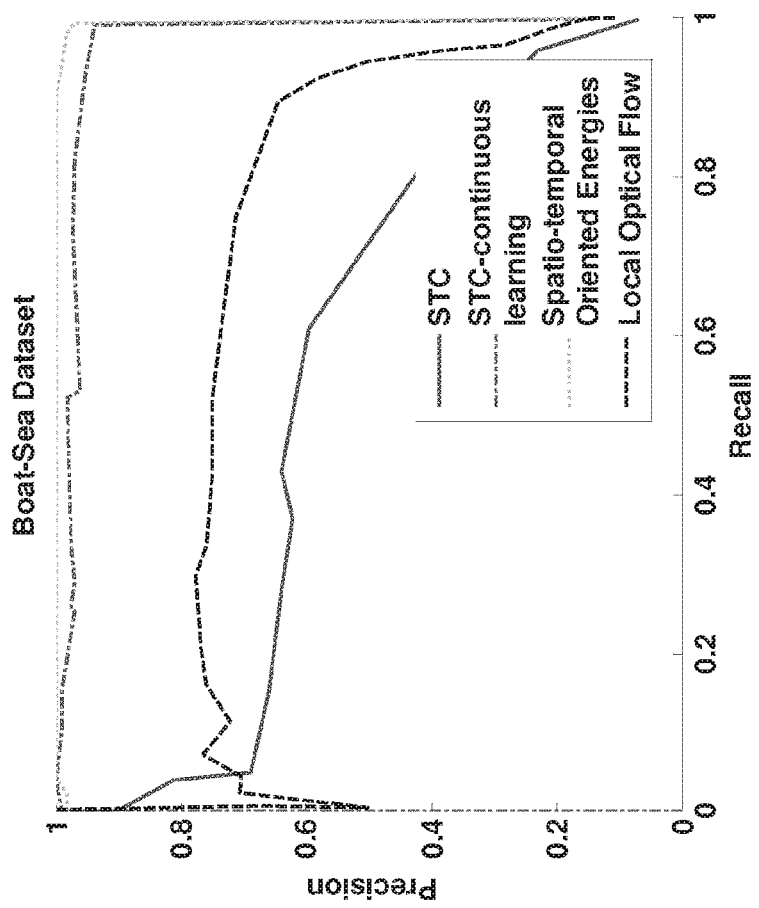
FIG. 17A depicts comparisons of precision/recall curves for abnormality localization for a first challenging dataset.
Figure 17B:
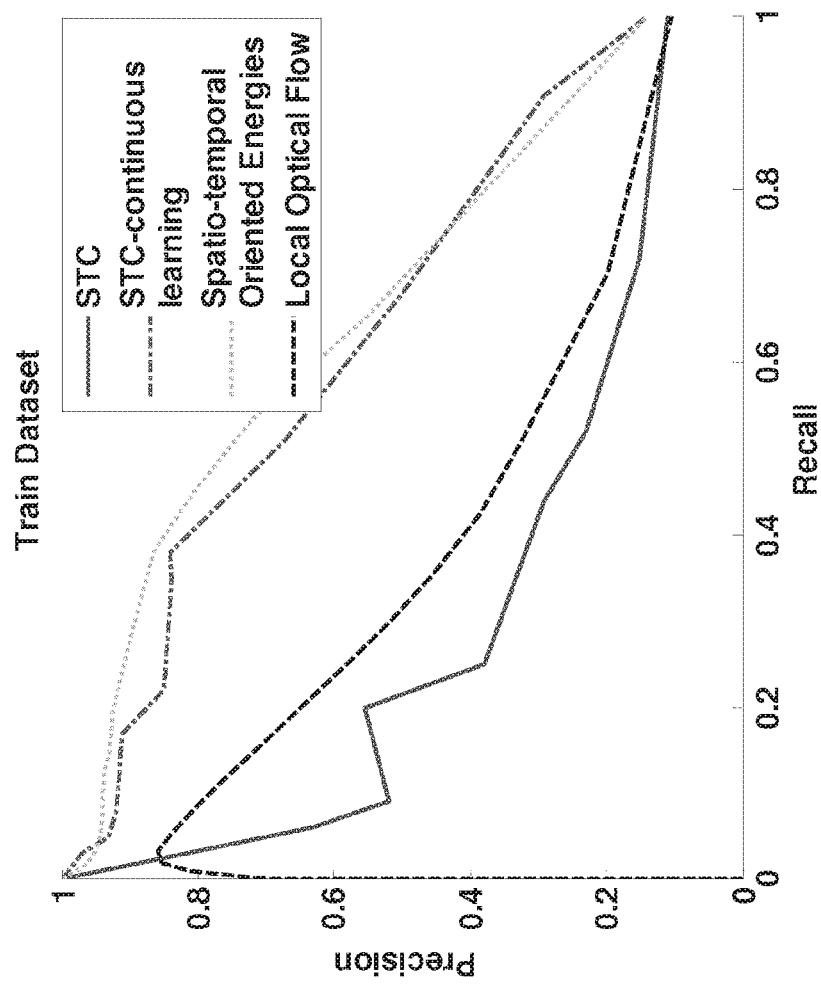
FIG. 17B depicts comparisons of precision/recall curves for abnormality localization for a second challenging dataset.
Figure 17C:
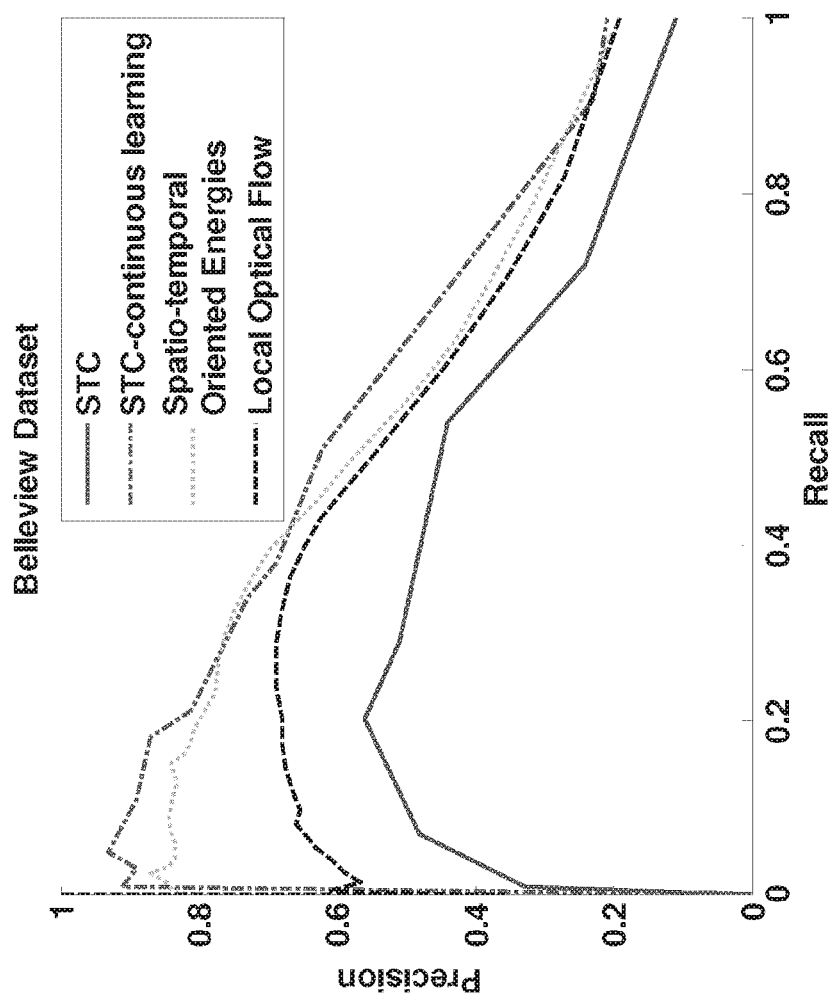
FIG. 17C depicts comparisons of precision/recall curves for abnormality localization for a third challenging dataset.
Figure 18:
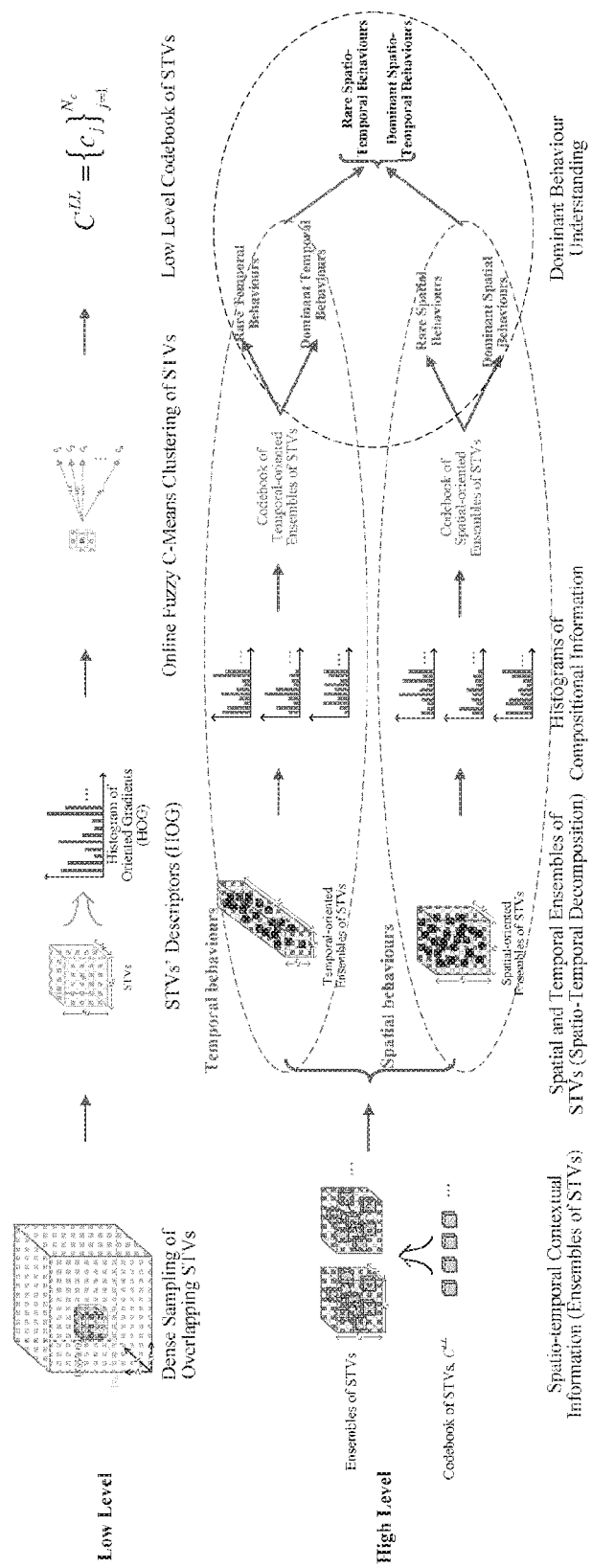
FIG. 18 is a schematic diagram of an algorithm overview for behavior understanding.

Comparing first the performance in FIGS. 17A to 17C of the two strategies employed by the STC algorithm, it is obvious that using simultaneous and continuous learning and detection of abnormalities is superior to employing only an initial training set. In contrast, it can be observed that simple local optical flow features, combined with online learning [B3] do not yield acceptable results in the former case. Notwithstanding this, we also note that [B3] was actually fairly capable of detecting abnormalities in other realistic datasets (Tables 5 and 6), Therefore, it appears that the optical flow approach has difficulty capturing temporal flicker and dynamic textures. In the case of rapid changes in illumination, using a more complex feature descriptor, such as oriented energies in [B8], produces slightly better results than the STC algorithm according to an embodiment of the invention (the Train sequence) with faster execution time. On the other hand, it may be noted that this method should not be used for more complex behaviors for two reasons: it is too local and does not consider contextual information.

Accordingly, it is evident that the STC algorithm has a competitive performance in terms of accuracy and computational cost when compared to the prior art approaches for anomaly detection for four challenging datasets. Moreover, it is fast enough for online applications and requires fewer initialization frames. When a separate training set is not available, the algorithm is capable of continuously learning the dominant behavior in an unsupervised manner while simultaneously detecting anomalous patterns. Clearly, this is the preferred behavior for any potential visual surveillance system operating in an unconstrained environment.

Accordingly, the STC algorithm when presented with complicated abnormal behaviors without drastic changes in illumination or dynamic backgrounds outperforms all other real-time and non-real-time methods with the exception of IBC in terms of abnormality detection and localization but the STC algorithm produces similar results to IBC with significantly fewer computations. In the case of simple abnormal events such as motion/direction detection in the fourth dataset with dynamic backgrounds and variable illumination conditions. In this scenario continuous learning allows the STC algorithm to handle environmental changes. Moreover, it is more robust to gradual changes, as it requires updating the pdf s to learn newly observed behaviors.

5. SIMULTANEOUS DOMINANT AND RARE EVENT MODELING

Referring to Section 1.1.1 Multi-Scale Dense Sampling a set of spatio-temporal volumes are described as being constructed through dense sampling together with the generation of a descriptor vector for each video volume. Subsequently, as the number of these volumes is extremely large a clustering process was presented in 1.1.2. Codebook of Video Volumes wherein the similarity between each observed volume and the codewords already existing in the codebook was used to determine whether the codewords are updated or a new one is formed. Each codeword was also updated with a weight of $w_{i,j}$ based upon utilizing Euclidean distance to establish similarity between the volume and the existing codeword.

Within 1.1.2 it was also stated that other clustering methods could be employed and accordingly, within this section an online fuzzy clustering approach is employed. The basic idea is to consider a chunk of data, cluster it, and then construct another chunk of data using the new observations. The clusters are then updated. Here we adopt the online single-pass fuzzy clustering algorithm of [A56]. If $N_d$ denote the number of feature vectors in the dth chunk of data and $N_c$ the number of cluster centroids (codewords), then these are represented by a set of vectors, $C=\{c_n\}_{n=1}^{N_c}$. The objective function (J) for fuzzy probabilistic clustering is modified to yield Equation (38) where the parameter $w_j$ is the weight of the jth sample. Note that in the original version, $w_j=1, \forall j$ [A56]. Using the Euclidean distance as the similarity measurement between STVs descriptors, we define the update rule for the cluster center, similarity matrix and the weights $w_i$, are defined by Equations (39) to (41).

$$J = \sum_{i=1}^{N_C} \sum_{j=1}^{N_d} u_{i,j}^m w_j d_{ij}(h_j, c_i) \quad (38)$$

$$u_{n,j} = \left( \sum_{i=1}^{N_C} \left( \frac{\|h_j - c_n\|}{\|h_j - c_i\|} \right)^{\frac{2}{m-1}} \right)^{-1} \quad (39)$$

$$c_n = \frac{\sum_{j=1}^{N_d} w_j u_{n,j}^m h_j}{\sum_{j=1}^{N_d} w_j u_{n,j}^m} \quad (40)$$

$$w_i = \sum_{j=1}^{N_d+N_C} u_{i,j} w_j \quad (41)$$

Accordingly, through this clustering procedure a set of clusters is formed for the STVs. These are used to produce is a codebook of STVs and sets of similarity values for every STV. Ultimately, each STV will be represented by a set of similarity values $\{u_{j,i}\}_{j=1}^{N_C}$.

5.2 Volume Ensembles and Space/Time Decomposition

As discussed supra, in order to understand a video sequence in respect of the scene background and to make correct decisions regarding normal and/or suspicious events within the foreground it necessary to analyze the spatio-temporal volumes within the clusters. As noted also supra a major limitation within the prior art approaches is a lack of context at each pixel in the video. The context being the spatio-temporal composition. Again, by considering a multi-scale spatio-temporal volume, R, around each pixel we can capture this context, for example via a probabilistic framework. Thus the region R contains many video volumes and thereby captures both local and more distant information in the video frames. This ensemble of volumes was defined in Equation (4) and is re-written below as Equation (42) where s=x, y and {i,I} denote the counter and total number of volumes within an ensemble rather than {j,J} in Equation (4).

$$E_{s,t} = \{v_i^{E_{s,t}}\}_{i=1}^I = \{v_i : v_i \in R_{s,t}\}_{i=1}^I \quad (42)$$

In this embodiment, in order to capture the spatio-temporal compositions of the video volumes, the relative spatio-temporal coordinates of the volume in each ensemble are used. Accordingly, $$x_{\substack{E_{s,t} \\ v_i}} \in \| \|^3$$

is the relative position of the ith video volume, $v_i$ (in space and time), inside the ensemble of volumes, $E_{s,t}$, for a given point (s,t) within the video. During the codeword assignment process described in the previous section, each volume $v_i$ inside each ensemble was assigned to all labels $c_j$ with weights of $u_{j,i}$ using. If we now let the central volume of $E_{s,t}$ be given by $v_c$ then the ensemble is characterized by a set of volume position vectors, codewords and their related weights as indicated by Equation (43).

$$E_{s,t} = \left\{ x_{v_i E_{s,t}}, u_{ji} \right\}_{i=1:I, j=1:N_C} \quad (43)$$

$$P_{E_{s,t}}(v) = P(x_v, c_1, c_2, \ldots, c_n) = \sum_{i=1}^n P(x_v \mid v = c_i) P(v - c_i) \quad (44)$$

One common approach to calculating similarity between ensembles of volumes is to use the star graph model. This model uses the joint probability between a database and a query ensemble to decouple the similarity of the topologies of the ensembles and that of the actual video volumes. As described supra to avoid such a decomposition estimate the probability distribution function (pdf) of the volume composition in an ensemble. Thus, the probability of a particular arrangement of volumes v inside the ensemble of $E_{s,t}$ is given by Equation (44) wherein the first term in the summation expresses the topology of the ensembles, while the second term expresses the similarity of their descriptors (i.e. the weights for the codeword assignments at the first level). As we wish to represent each ensemble of volumes by its pdf, $P_{E_{s,t}}(v)$. Accordingly, given the set of volume positions and their assigned codewords, the pdf of each ensemble can be formed using either a parametric model or non-parametric estimation. Within the following description the pdf describing each ensemble are calculated using (non-parametric) histograms.

As noted supra an objective of real-time online surveillance is to detect normal spatial and temporal activities distinguish and ultimately distinguish them from spatial (shape and texture changes) and temporal abnormalities. As these are typically foreground regions within the image the approach may also be considered as performing a focus of attention task. Accordingly, in order to individually characterize the different behaviors within the video, an approach wherein two sets of ensembles of spatio-temporal volumes are formed is exploited, one for the spatially oriented ensembles of volumes and the other, for the temporally oriented ones. These being given by Equation (45) wherein $D^S$ and $D^T$ represent the sets of spatially- and temporally-oriented ensembles, respectively, and $(r_x \times r_y \times r_t)$ is the size of the ensembles in Equation (42)

$$D^S = \{E_{s,t} | r_t << \min\{r_x, r_y\}\}$$

$$D^T = \{E_{s,t} | r_t >> \max\{r_x, r_y\}\} \tag{45}$$

5.3 Ensemble Clustering

Upon completion of the processes described in respect of Sections 5.2 and 5.3 then each ensemble pdf represents a foreground object in the video. The histogram of each ensemble, as obtained from Equation (44), is employed as the feature vector to cluster the ensembles. This then permits the construction of a behavioral model for the video, as well as inferring the dominant behavior. Using the pdf to represent each ensemble of volumes makes it possible to use a divergence function from statistics and information theory as the dissimilarity measure. The symmetric Kullback-Leibler (KL) divergence can be used to measure the difference between the two pdfs. Accordingly, the distance between two ensembles of volumes, $E_{s_i,t_i}$ and $E_{s_j,t_j}$, is defined by Equation (46) where the terms $$P_{E_{s_i,t_i}} \text{ and } P_{E_{s_j,t_j}}$$

are the pdfs of the ensembles $E_{s_i,t_i}$ and $E_{s_j,t_j}$ respectively, and d is the symmetric KL divergence between the two pdfs. Subsequently, online fuzzy single-pass clustering is applied, as described in Section F.1, thereby, producing a set of membership values for each pixel. This clustering is performed independently for the two sets of ensembles, $D^S$ and $D^T$, respectively as obtained from Equation (45). The resulting two codebooks are then represented $C^S = \{c_{k_S}^S\}_{k_S=1}^{N_S}$ and $C^T = \{c_{k_T}^T\}_{k_T=1}^{N_T}$ respectively.

5.4 Behaviour Analysis and Online Model Updating

The result of the video processing outlined in Sections 5.1 to 5.3 permits construction of a set of behavior patterns for each pixel. Since, as stated supra previously, we are interested in detecting dominant spatial and temporal activities as an ultimate means of determining both spatial (shape and texture changes) and temporal abnormalities (foreground regions). Hence, if one considers the scenario of a continuously operating surveillance system. At each temporal sample I, a single image is added to the already observed frames and a new video sequence, the query, Q, is formed. The query is densely sampled in order to construct the video volumes and thereby, the ensembles of STVs, as described in Section 5.1 to 5.3. Now, given the already existing codebooks of ensembles constructed in Section 5.3, each pixel in the query, $q_i$, is characterized by a set of similarity matrices, $U_{q_i}^S = \{u_{k_S,i}^S\}_{k_S=1}^{N_S}$ and $U_{q_i}^T = \{u_{k_T,i}^T\}_{k_T=1}^{N_T}$. We note that $u_{k_S,i}^S$ and $u_{k_T,i}^T$, respectively, are the similarity of the observation to the $k_S$ spatial and $k_T$ temporal cluster of ensembles.

Accordingly, the description that best describes a new observation is given by Equation (46).

$$(k_S^*, k_T^*) = \arg\left(\max_{k_S}\{u_{k_S,i}^S\}, \max_{k_T}\{u_{k_T,i}^T\}\right) \tag{46}$$

$$(\alpha u_{k_S^*,i}^S + \beta u_{k_T^*,i}^T) \overset{\text{dominant}}{\underset{\text{rare}}{\gtrless}} (\alpha \Theta_{k_T^*} + \beta \Theta_{k_S^*}) \tag{47}$$

To infer normality or abnormality of the query, $q_i$, two similarity thresholds, $\Theta_{k_S}$ and $\Theta_{k_T}$, are employed as evident in Equation (47) where $\alpha$ and $\beta$ are preselected weights for the spatial and temporal codebooks, respectively and $\Theta_{k_S}$ and $\Theta_{k_T}$ are the learnt likelihood thresholds for the kth codeword of the spatial and temporal codebooks, respectively.

To determine these, a set of previously observed pixels is employed, $D = \{p_i\}$, as represented by the two cluster similarity matrices obtained previously, $U_{p_i}^S = \{u_{k_S,i}^S\}_{k_S=1}^{N_S}$ and $U_{p_i}^T = \{u_{k_T,i}^T\}_{k_T=1}^{N_T}$. Accordingly, the previous observations can be divided into $N_S$ and $N_T$ disjoint subsets as given by Equations (48A) and (48B) where $D_{k_S}$ and $D_{k_T}$ contain only the most representative examples of each cluster, $k_S$ and $k_T$ respectively. It is evident from Equation (48) that the representativeness is governed by the parameter $\epsilon$. Next, the likelihood thresholds are calculated according to Equations (49A) and (49B) respectively where the parameter $\gamma \in [0,1]$ controls the abnormality/normality detection rate and $|D|$ indicates the number of members of D. Accordingly, it is evident from Equation (47) the parameters $\alpha$ and $\beta$ are seen to control the balance between spatial and temporal abnormalities based on the ultimate objective of the abnormality detection. As an example, if the objective is to detect the temporal abnormality in the scene (background/foreground segmentation), then one can assume that $\alpha = 0$.

$$\Theta_{k_S} = \frac{\gamma}{|D_{k_S}|}\sum_{i \in D_{k_S}} \log u_{k_S,i}^S + \frac{1-\gamma}{|D|-|D_{k_S}|}\sum_{i \notin D_{k_S}} \log u_{k_S,i}^S \tag{48A}$$

$$\Theta_{k_T} = \frac{\gamma}{|D_{k_T}|}\sum_{i \in D_{k_T}} \log u_{k_T,i}^T + \frac{1-\gamma}{|D|-|D_{k_T}|}\sum_{i \notin D_{k_T}} \log u_{k_T,i}^T \tag{48B}$$

5.5 Online Model Updating

Online continuous surveillance of a particular scene has been considered in order to simultaneously detect dominant and anomalous patterns. As described supra the algorithm only requires the first N frames of the video stream to initiate the process. This is achieved by constructing the codebook of STVs, ensembles of volumes, and finally the codebook of ensembles. When new data are observed, the past $N_d$ frames are always employed to update the learnt codebooks, i.e. the clusters of both STVs and ensembles of STVs. This process is performed continuously and the detection thresholds, $\Theta_{k_S}$ and $\Theta_{k_T}$ are updated in an ongoing manner as described by Equations (49A) and (49B) based on the previously learnt codebooks.

5.6 Experimental Results

The algorithm has been against a series of datasets, including the dominant behavior understanding dataset in Zaharescu and Wildes as well as the UCSD pedestrian dataset and subway surveillance videos referred to supra. In all cases, it was assumed that local video volumes are of size 5×5×5 and the HOG is calculated assuming $n_\theta=16$, $n_\phi=8$ and $N_d=50$ frames. Parameters α and β were selected depending on the desired goal of the abnormality detection. These were set empirically to 0.1 and 0.9 for motion detection and to 0.5 for abnormal activity detection. Quantitative evaluation and comparison of different approaches are presented in terms of precision-recall and ROC curves, obtained by varying the parameter γ in Equations (49A) and (49B).

Figure 19A:
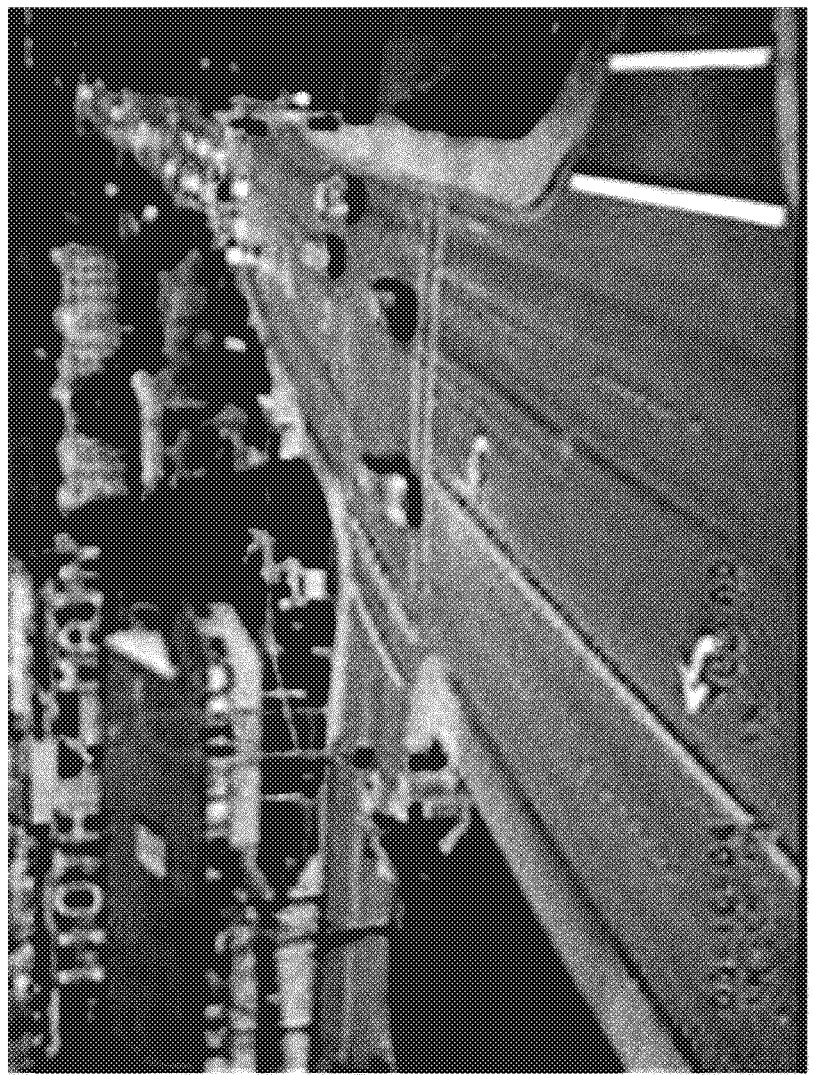
FIG. 19A depicts the dominant behavior understanding on data captured by a camera during different times of the day with a representative sample frame.
Figure 19B:
FIG. 19B depict the dominant behavior understanding on data captured by a camera during different times of the day with dominant behaviours identified.
Figure 19C:
FIG. 19C depicts the dominant behavior understanding on data captured by a camera during different times of the day with abnormalities identified.
Figure 20A:
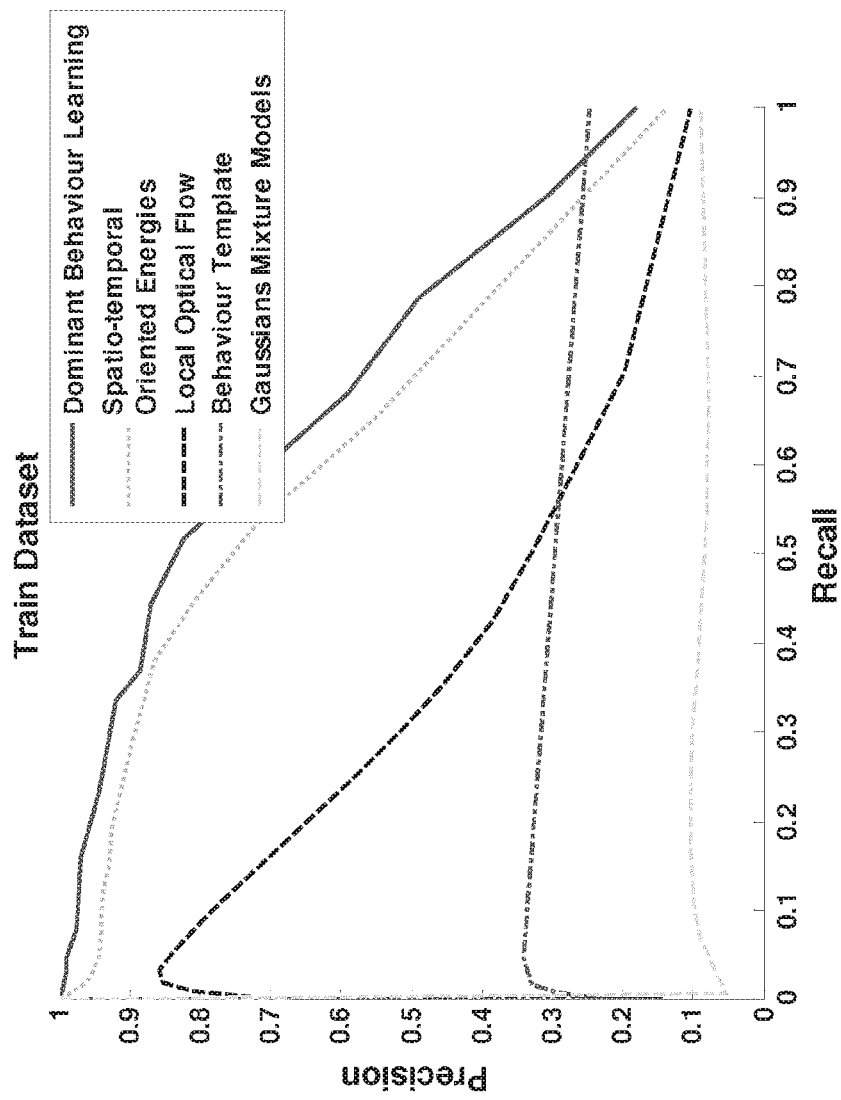
FIG. 20A depicts the precision/recall curves for a first scenario.
Figure 20B:
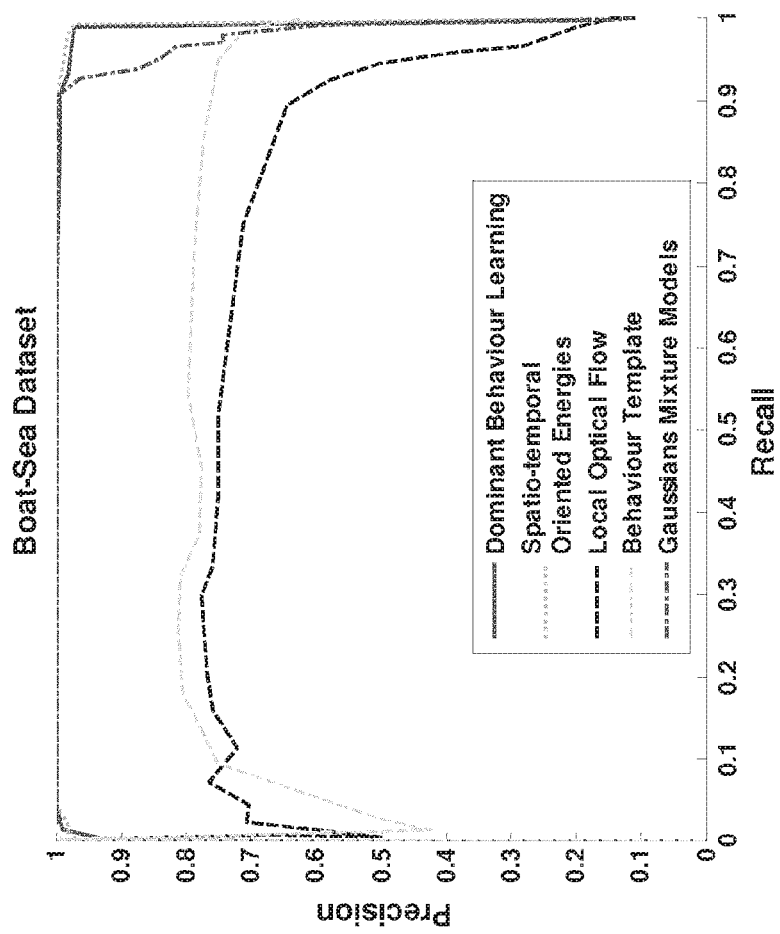
FIG. 20B depicts the precision/recall curves for a second scenario.
Figure 20C:
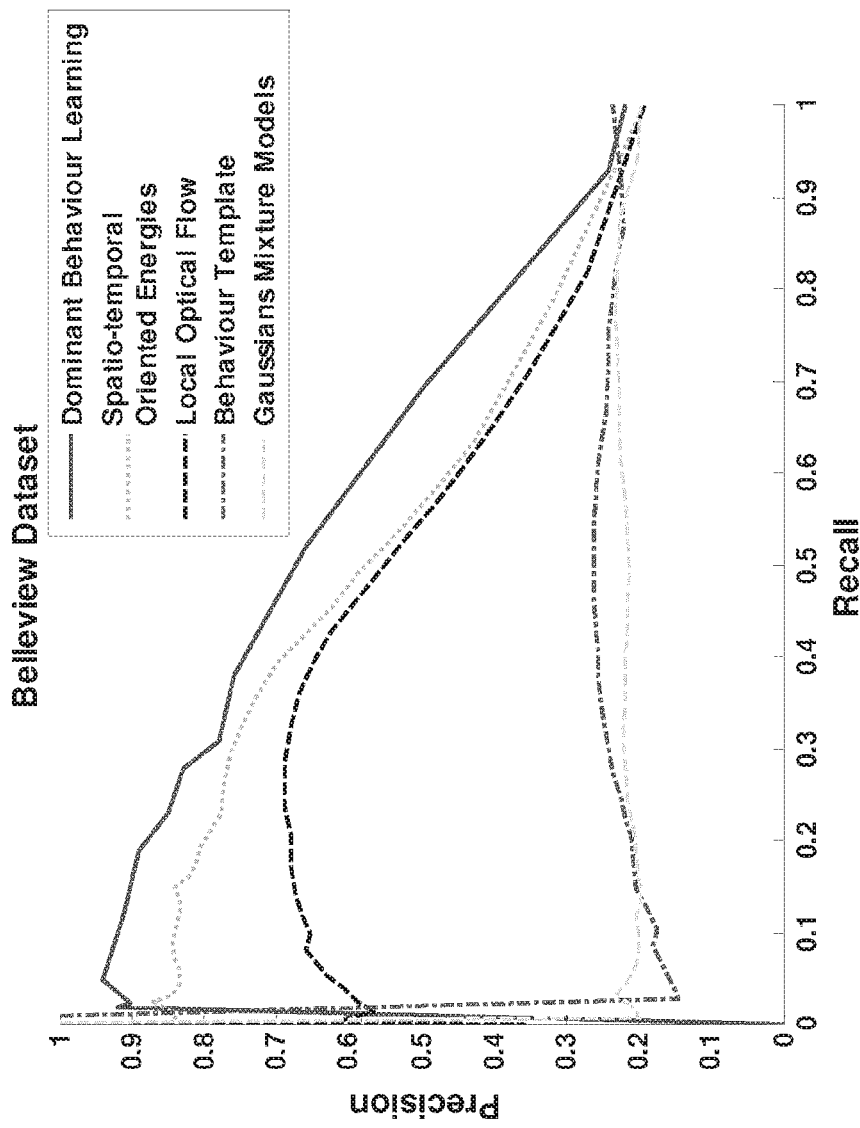
FIG. 20C depicts the precision/recall curves for a third scenario.

The first dataset included three videos sequences. The first one, Belleview, is a traffic scene in which lighting conditions gradually change during different times of the day. The dominant behaviors are either the static background or the dynamic cars passing through the lanes running from top to bottom. Thus, the rare events ("abnormalities") are the cars entering the intersection from the left. FIGS. 19A, 19B, and 19C illustrate a sample frame from this sequence together with the dominant and abnormal behavior maps, respectively. In the Boat-Sea video sequence, the dominant behavior is the waves while the abnormalities are the passing boats since they are newly observed objects in the scene. The Train sequence, is one of the most challenging videos available due to drastically varying illumination and camera jitter. The background changes rapidly as the train passes through tunnels. In this sequence the abnormality relates to people movement. FIGS. 20A and 20B depict the resulting precision/recall curves. In each instance the initialization strategy of Zaharescu and Wildes was employed and the results compared with two alternative pixel-level anomaly detection methods: spatio-temporal oriented energies and local optical flow.

As the abnormalities in this dataset are low level motions, the pixel-level background models, e.g. Gaussians Mixture Models, were also included and the behavior template approach for comparison. Comparing the performance of the different approaches in FIGS. 20A and 20B, it is evident that the algorithm, despite its increased speed, reduced computational complexity, and lower memory requirements, is comparable or superior to these prior art techniques. In particular, the method based on spatio-temporal oriented energy filters produced results comparable to the embodiment of the invention but might not be useful for more complex behaviors as it is too local and does not consider contextual information. It is also clear that prior art methods for background subtraction (e.g. GMM) fail to detect dominant behaviors in scenes containing complicated behaviors, such as the Train and Belleview video sequences. However, they still do produce good results for background subtraction in a scene with a stationary background (Boat-Sea video sequences). In the latter case, the so-called abnormality (the appearance of the boat) is sufficiently different from the scene model. Thus, GMM seems promising for this video. On the other hand, it is observed that simple local optical flow features, combined with online learning, do not yield acceptable results in the scenes with dynamic backgrounds. It appears that the optical flow approach has difficulty capturing temporal flicker and dynamic textures.

Figure 21A:
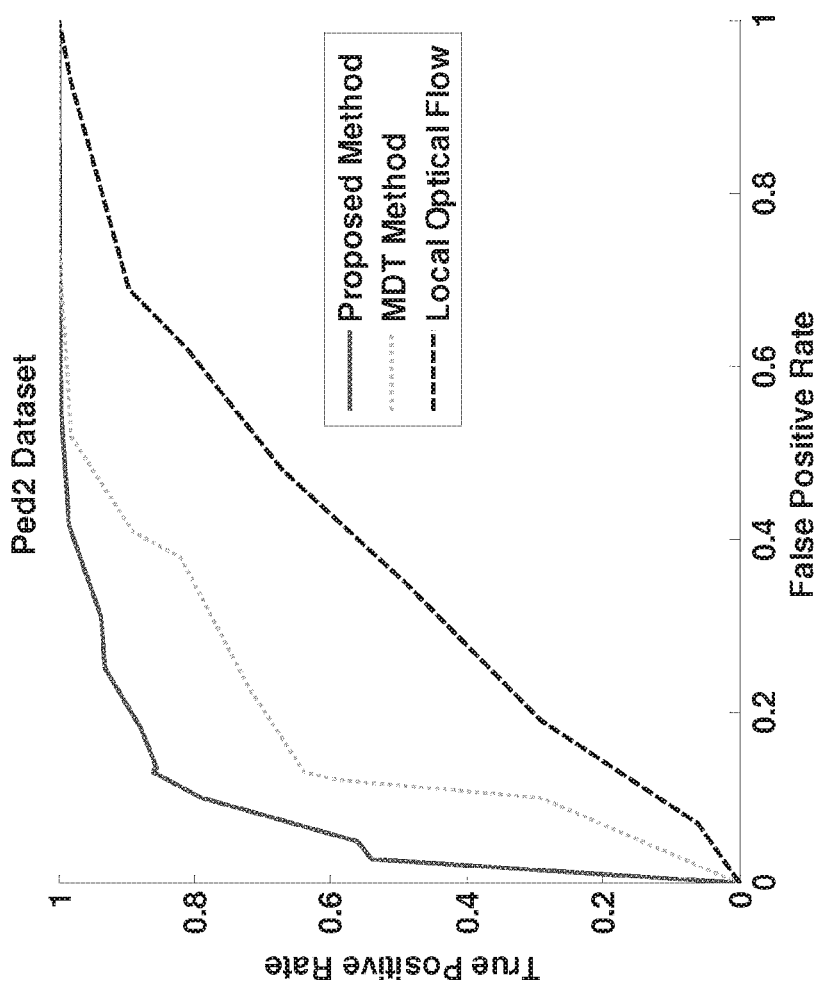
FIG. 21A depicts frame level abnormality detection using the UCSD pedestrian datasets with a sample frame, detected anomalous regions, and ROC curves for a first pedestrian dataset.
Figure 21B:
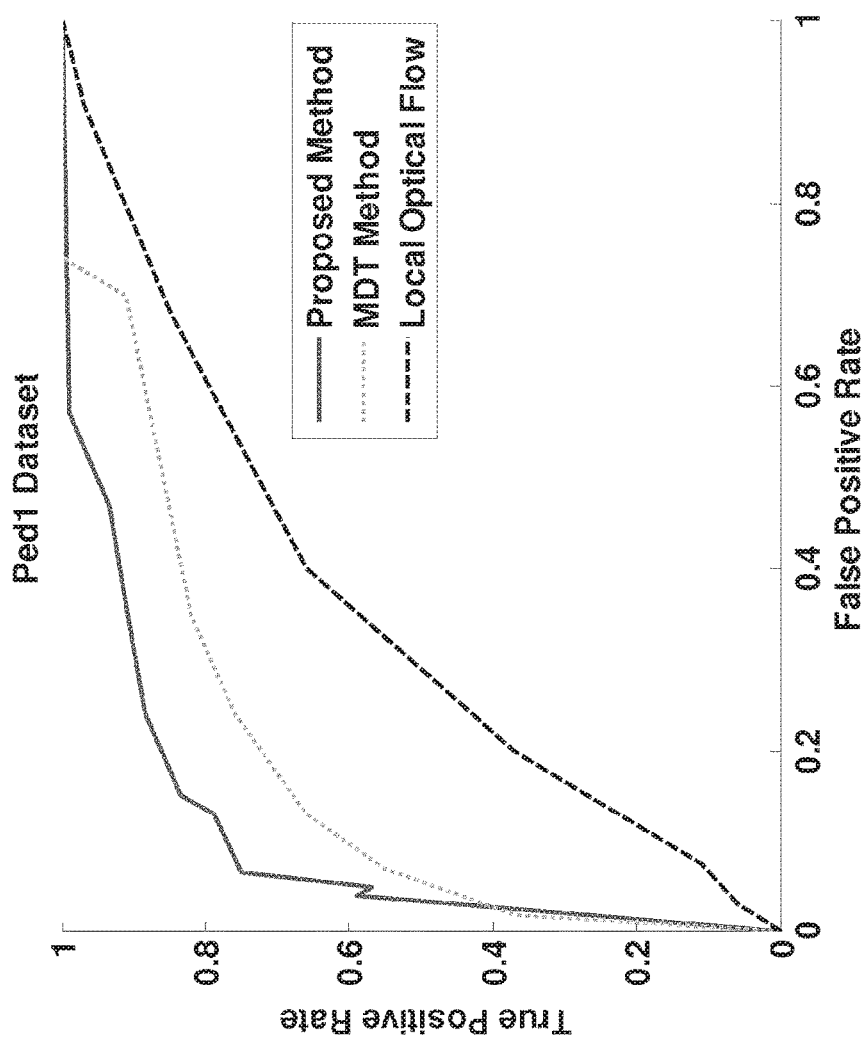
FIG. 21B depicts frame level abnormality detection using the UCSD pedestrian datasets with sample frame, detected anomalous regions, and ROC curves for a second pedestrian dataset.

Experiments with the UCSD pedestrian dataset were also conducted. It contains video sequences from two pedestrian walkways where abnormal events occur. The dataset exhibits different crowd densities, and the anomalous patterns are the presence of nonpedestrians on a walkway (e.g. bikers, skaters, small carts, and people in wheelchairs). Referring to FIGS. 21A and 21B, there are presented samples of two videos with the detected suspicious regions as well as the ROC curves for different methods. In order to make a quantitative comparison the equal error rate (EER) was also calculated for both pixel and frame level detection.

The results obtained are presented within in Table 7 and indicate that the proposed algorithm outperformed all other real-time algorithms and achieved the best results for the UCSD pedestrian dataset at both frame level detection and pixel level localization. Further, in common with the results supra on other embodiments of the invention the number of initialization frames required by the algorithm according to an embodiment of the invention is significantly lower than the alternatives, 200 frames versus 6,400 frames), It would be evident that this is a major advantage of the algorithm that can also learn dominant and abnormal behaviors on the fly. Moreover the computational time required by the algorithm according to an embodiment of the invention is significantly lower than others in the literature.

TABLE 7

Quantitative Comparison of Embodiment of Invention versus Prior Art for using the UCSD Ped 1 Dataset.

| Algorithm | EER (Frame Level) (%) | EER (Pixel Level) (%) |
|---|---|---|
| Invention (Note) | 15 | 29 |
| MDT [B6] | 25 | 58 |
| Sparse Reconstruction [B58] | 19 | — |
| Bertini et al [B10] (Note) | 31 | 70 |
| Reddy et al [B57] (Note) | 22.5 | 32 |
| ST-MRF [B42] | 40 | 82 |
| Local Optical Flow [B3] (Note) | 38 | 76 |
| Saligrama and Chen | 16 | — |

(Note)
Method claimed to have real time performance

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

6. REFERENCES

[A1] R. Poppe A survey on vision-based human action recognition, image Vision Comput. 28 (6) (2010) 976-99D.

[A2] P. Turaga, R. Chellappa, V S. Subrahmanian, O. Udrea, Machine recognition of human activities: a survey, IEEE Trans. Circuits Syst. Video Technol. 18 (11) (Z008) 1473-1488.

[A3].C. Niebles, H. C. Wang, L. Fei-Fei, Unsupervised learning of human action categories using spatial-temporal words, in J. Comput. Vision 79 (3) (2008) 299-318,

[A4] S. Savarese, A, DelPozo,], C. Niehles, F,-F, Li, Spatial-temporal correlations for unsupervised action classification, WMVC, 2008, pp. 1-8.

[A5] L. Wang, L Cheng, Elastic sequence correlation for human action analysis. IEEE Trans. image Process. 20 (6) (2011) 1725-1738.

[A6] D. Weinland, K Ronfard, E. Boyer, A survey of vision-based methods for action representation, segmentation and recognition, Comput. Vision image Underst. 115 (2) (2011) 224-241.

[A7] O. Boiman, M. Irani, Detecting irregularities in images and in video, Int.]. Comput. Vision 74 (1) (2007) 17-31.

[A8] K. Mikolajczyk, H. Uemura, Action recognition with appearance—motion features and fast search trees, Comput. Vision image Underst. 115 (3) (2011) 426-438.

[A9] H. Seo, P. Milanfar, Action recognition from one example, IEEE Trans. Pattern Anal. Mach. Intell. 33 (5) (Z011) 867-832.

[A10] K. G. Derpanis, M. Sizintsev, K. Cannons, R, P. Wildes Efficient action spotting based on a spacerime oriented structure representation, Computer Vision and Pattern Recognition (CVPR), 2010 IEEE Conference on, 2010, pp. 1990-1997.

[A11] A. Oikonomopoulos, I. Patras, M. Pantic, Spatiotemporal localization and categorization of human actions in unsegmented image sequences, IEEE Trans. Image Process. 20 (4) (2011) 1126-1140.

[A12] C. Schuldt, I. Laptev, B. Caputo, Recognizing human actions: a local SVM approach. ICPR, vol. 3, 2004, pp. 32-35.

[A13] L, Gorelick, M. Blank, E. Shechtrnan, M. Irani R. Basfl. ACUDHS 35 space-time shapes, IEEE Trans. Pattern Anal. Mach. Intell. 29 (12) (2007) 2247-2253.

[A14] J. Yuan, Z. Liu, Y. Wu, Discriminative video pattern search for efficient action detection, IEEE Trans. Pattern Anal. Mach. Intell. 33 (9) (2011) 1728-1743.

[A15] M. J. Roshtkhari, M. D. Ievme, A multi-scale hierarchical codebook method for human action recognition in videos using a single example, Conference on Computer and Robot Vision (CRV), 2012, pp. 132-189.

[A16] D. Ramanan, D. A. Forsyth. Automatic annotation of everyday movements. Adv. Neural Inf. Process. Syst. 16 (2004) 1547-1554.

[A17] C. Rao, A. Yilinaz, M. Shah, View-invariant representation and recognition of actions, Int. J. Coinput. Vision 50 (2) (2002) 203-226.

[A18] F. Yuan, G.» S. Xia, H. Sahbi, V. Prinet, Mid-level features and spatio-temporal context for activity recognition, Pattern Recogn. 45 (12) (2012) 418241191.

[A19] H. Wang, A. Klaser, C. Schmiti, L. Cheng» 1_in, Action recognition by dense trajectories. Computer V151011 and Pattern Recognioon (CVPR), 2011 IEEE Conference on, 2011. pp. 315973176.

[A20] H. Yang. L Shao. F. Zheng, L. Wang, Z. Song, Recent advances and trends in visual tracking: a review, Neurocomputing 74 (18) (2011) 3823-3831.

[A23] A. Yilmaz, M. Shah, Actions sketch: a novel action representation, Computer Vision and Pattern Recognition (CVPR), IEEE Conference on, 2005, pp. 984-989.

[A24] E. Shechtman, M. Irani, Space-time behavior-based correlation-or-how to tell if two underlying motion fields are similar without computing them? IEEE Trans. Pattern Anal. Mach. Intel]. 29 (11) (2007) 2045-2056.

[A25] AA. Efros, A. C, Berg, G. Mori,]. Malik, Recognizing action at a distance. Computer Vision (ICCV), IEEE international Conference on, 2003, pp. 726-733.

[A26] Y. Ke, R. Si.\kthankai', M. Hebert. Volumetric features for video event detection, Int. Comput. Vision 88 (3) (2010) 339-362.

[A27] Z. Jiang, L. Zhe, L. S. Davis, Recognizing human actions by learning and matching shape-motion prototype trees, IEEE Trans. Pattern Anal. Mach. Intell. 24 (3) (2012) 5337547.

[A28] A. Yao, J. Gall. L. Van Gool, A Hough tl'ansform-1) ased voting framework for action recognition, Computer Vision and Pattern Recognition (CVPR), IEEE Conference on, 2010, pp. 2061-2058.

[A29] S. Sadanand, I.]. Corso, Action bank: a high-level representation of activity in video, Computer Vision and Pattern Recognition (CVPRJ, 2012 IEEE Conference on, 2012. pp. 123471241.

[A30] S. Khamis, V. I, Morariu, L, S. Davis, A flow model for joint action recognition and identity maintenance, Computer Vision and Pattern Recognition (O/PR), 2012 IEEE Conference on, 2012, pp. 12184225.

[A31] M. Eregonzio, G. Sliaogang, X. Tao, Recognising action as clouds of space-time interest points, Computer Vision and Pattern Recognition (CVPR), IEEE Conference on, 2009, pp. 1543-1955.

[A32] B. Chakraborty, M. B. Holte, T. B. Moesliind, J. Gonzalez, Selective spatio-temporal interest points, Comput. Vision image Underst, 116 (3) (2011) 395410.

[A33] A. Kovashka, K. Grauman, Learning a hierarchy of discriminative space—time neighborhood features for human action recognition, Computer Vision and Pattern Recognition (CVPR), IEEE Conference on, 2010. pp. 2046-2053.

[A34] G. Yu, J. Yuan, Z. Liu, Unsupervised random forest indexing for fast action search, Computer Vision and Pattern Recognition (O/PR), IEEE Conference on, 2011. pp. 865-872.

[A35] D. Han, L Bo, C. Sminchisescu, Selection and context for action recognition, Computer Vision (ICCV), IEEE International Conference on. 2009, pp. 19334940.

[A36] J. Wang, Z. Chen, Y. Wu, Action recognition with multiscale spatio-temporal contexts, Computer Vision and Pattern Recognition (CVPRJ, IEEE Conference on, 2011, pp. 3125-3192.

[A37] J. Yuan, Z. Iiu, Y. Wu, Discriminative subvoliime search for efficient action detection. Computer Vision and Pattern Recognition (CVPR), IEEE Conference on, 2009. pp. 244272449.

[A38] L Kratz, K, Nishino, Anomaly detection in extremely crowded scenes using spatio-temporal motion pattern models, Computer Vision and Pattern Recognition (CVPR), IEEE Conference on, 2009, pp. 1446-1453.

[A39] H. Wang, M. M. Ullali, A. Klaser, I. Laptev, C. Scliniid, Evaluation of local spatio-temporal features for action recognition, BMVC, 2009.

[A40] O. Boiman, E. Shechtman, M. Irani, In defense of Nearest-Neighbor based image classification. Computer Vision and Pattern Recognition (CVPR), IEEE Conference on. 2008. pp. 1992-1999.

[A41] S. Lazebnik, C. Schmid,]. Ponce, Beyond bags of features: spatial pyramid matching for recognizing natural scene categories, Computer Vision and Pattern Recognition (CVPR), IEEE Conference on, vol. Z, 2006. pp. 2159-2178.

[A42] j. Liu, M. Shah, Learning human actions via information maximization, Computer Vision and Pattern Recognition (CVPR), IEEE Conference on, 2008, pp. 1-8.

[A43] V. Zhang, X. Liu, M.-C. Chang. W. Ge. T. Chen, Spatio-temporal phrases for activity recognition computer vision, European Conference on Computer Vision (ECCV), vol. 7574, Springer. Berlin/Heidelberg, 2012, pp. 707-721.

[A44] M. S. Ryoo, J. K. Aggarwal, Spatio-temporal relationship match: video structure comparison for recognition of complex human activities, Computer Vision (ICCV), IEEE International Conference on, 2009, pp. 15934600.

[A45] T.-H. Yu, T.-K. Kim, R. Cipolla, Real-time action recognition by spatiotemporal semantic and structural forests, Proceeding: of the British machine vision conference, 2010, p. 56.

[A46] A. Gilbert, J. Illingworth, R. Bowden, Action recognition using mined hierarchical compound features, IEEE Trans. Pattern Anal. Mach. Intell. 33 (99) (2011) 883-857.

[A47] M. Marszaek, C. Schmid, Spatial weighting for bag-of-features, Computer Vision and Pattern Recognition (CVPR), IEEE Conference on, vol. 2, 2006, pp. 21 i8-2125.

[A48] A, Gilbert, J. Illingworth, R. Bowden, Scale invariant action recognition using compound features mined from dense spatio-temporal corners, European Conference on Computer Vision (ECCV), Springer-Verlag, 2008, pp. 222-233.

[A49] M. Bertini, A. Del Bimbo, L. Seidenari, Multi-scale and real-time non-parametric approach for anomaly detection and localization, Comput. Vision Image Underst. 116 (3) (2012) 320-329.

[A50] P, Scovanner, S, Ali, M. Shah, A 3-dimensional sift descriptor and its application to action recognition, International Conference on Multimedia, 2007. pp. 357360.

[A51] M. J. Roshtkhari. M. D. Levine, Online dominant and anomalous behavior detection in videos, Computer Vision and Pattern Recognition (CVPR). 2013 IEEE Conference on, 2013, pp. 2609-2616.

[A52] H. Zhong, J. Shi, M. Visontai, Detecting unusual activity in video, Computer Vision and Pattern Recognition (G/PR), IEEE Conference on, vol. 2, 2004, pp. 819-826.

[A53] U. Von Luxburg, A tutorial on spectral clustering, Stat. Comput. 17 (4) (2007) 395-416.

[A54] A. Y. Ng, M. I. Jordan, Y. Weiss. On spectral clustering: analysis and an algorithm, Adv. Neural Inf. Process. Syst. 14 (2002) 845-856.

[A56] P. Hore, L. Hall, D. Goldgof. Y. Cu, A. Maudsley, A. Darkazanli, A scalable framework for segmenting magnetic resonance images, 1. Signal Proc. Syst. 54 (1) (2009) 183-203.

[A57] K. Kim, T. H. Chalidabhongse, D. Hawvood, L. Davis. Real-time foreground-background segmentation using codebook model, Real-Time imaging 11 (3) (2005) 172-185.

[A59] T. H. Thi, L Cheng, J. Zhang, L Wang, S. Satoh, Integrating local action elements for action analysis. Compul. Vision Image Underst. 116 (3) (2012) 378-395.

[A60] Y. Tian, L Cau. Z. Liu, Z. Zhang, Hierarchical filtered motion for action recognition in crowded videos, IEEE Trans. Syst. Man Cybern. 42 (3) (2012) 313-323.

[A61] M. Javan Roshtkhari. M. D. Levine, An on-line, real-time learning method for detecting anomalies in videos using spatio-temporal compositions, Comput. Vision Image Underst. 117 (10) (2013) 1436-1452.

[B3] A. Adam, E. Rivlin, I. Shimshoni, D. Reinitz, Robust real-time unusual event detection using multiple fixed-location monitors, IEEE Transactions on Pattern Analysis and Machine Intelligence 30 (3) (2008) 555-560

[B4] O. Boiman, M. Irani, Detecting irregularities in images and in video, International Journal of Computer Vision 74 (1) (2007) 17-31.

[B5] L. Kratz, K. Nishino, Anomaly detection in extremely crowded scenes using spatio-temporal motion pattern models, in: 2009 IEEE Conference on Computer Vision and Pattern Recognition (CVPR), 2009, pp. 14464453.

[B6] V. Mahadevan, L, Weixin, V. Bhalodia, N. Vasconcelos, Anomaly detection in crowded scenes, in: 2010 IEEE Conference on Computer Vision and Pattern Recognition (CVPR). 2010, pp. 19754981.

[B7] R. Mehran, A. Oyama, M. Shah, Abnormal crowd behavior detection using social force model, in: 2009 IEEE Conference on Computer Vision and Pattern Recognition (CVPR), 2009, pp. 935-942.

[B8] A. Zaharescu, R. Wildes, Anomalous behaviour detection using spatiotemporal oriented energies, subset inclusion histogram comparison and event-driven processing. in: K. Daniilidis, P. Maragos, N. Paragios (Eds). 2010 European Conference on Computer Vision (ECCV), 2010. pp. 563-576.

[B9] H. Zhong, J. Shi, M. Visontai, Detecting unusual activity in video, in: 2004 IEEE Conference on Computer Vision and Pattern Recognition (CVPR), vol. 2, 2004, pp. 819-826.

[B10] M. Bertini, A. Del Bimbo, L. Seidenari, Multi-scale and real-time non-parametric approach for anomaly detection and localization, Computer Vision and Image Understanding 116 (3) (2012) 320-329.

[B11] A. Wiliem. V. Madasu, W, Boles, P. Yarlagadda, A suspicious behaviour detection using a context space model for smart surveillance systems, Computer Vision and linage Understanding 116 (2) (2012) 194-209.

[B12] O. P. Popoola, K. Wang, Video-based abnormal human behavior recognition—review, IEEE Transactions on Systems, Man, and Cybernetics, Part C: Applications and Reviews (2012) 144, http://dx.doi.org/10.1109/TSMCC2011.2178594.

[B29] K. Kim, T. H. Chalidabhongse, D. Harwood, L. Davis, Real-time foreground background segmentation using codebook model, Real-Time Imaging 11 (3) (2005) 172-185.

[B30] P. M, Jodoin, J. Konrad, V. Saligrama, Modeling background activity for behavior subtraction, in: 2008 ACM/IEEE International Conference on Distributed Smart Cameras (ICDSC), 2008, pp. 1-10.

[B31] Y. Benezeth, P. M. Jodoin, V. Saligrama, C. Rosenberger, Abnormal events detection based on spatio-temporal co-occurrences, in: 2009 IEEE Conference on Computer Vision and Pattern Recognition (CVPR), 2009, pp. 2458-2465.

[B32] E. B. Ermis, V. Saligrama, P. M. jodoin, J. Konrad, Motion segmentation and abnormal behavior detection

[B33] B. Chakraborty, M. B. Holte, T. B. Moeslund, J. Gonzlez, Selective spatio-temporal interest points, Computer Vision and Image Understanding 116 (3) (2012) 396-410.

[B34] P. Dollar, V. Rabaud, G. Cottrell, S. Belongie, Behavior recognition via sparse spatio-temporal features, in: 2nd joint IEEE International Workshop on Visual Surveillance and Performance Evaluation of Tracking and Surveillance, IEEE, 2005. pp. 65-72.

[B35] A. Gilbert. J. Illingwoith, R. Bowden. Action recognition using mined hierarchical compound features, IEEE Transactions on Pattern Analysis and Machine Intelligence 33 (99) (Z011) 883-897.

[B36] Y. Ke, R. Sukthankar, M. Hebert, Volumetric features for video event detection, International journal of Computer Vision 88 (3) (2010) 339-362.

[B37] A. Kovashka, K. Grauman, Learning a hierarchy of discriminative space-time neighborhood features for human action recognition. in: 2010 IEEE Conference on Computer Vision and Pattern Recognition (CVPR), 2010. pp. 2046-2053,

[B38] A. Oikonomopoulos, I. Patras. M. Pantic. Spatioteinporal localization and categorization of human actions in unsegmented image sequences, IEEE Transactions on Image Processing 20 (4) (2011) 1126-1140.

[B39] K. Rapantzikos, Y. Avrithis, S. Kollias, Dense saliency-based spatiotemporal feature points for action recognition, in: 2009 IEEE Conference on Computer Vision and Pattern Recognition (CVPR) 2009, 1111. 1454-1461.

[B40] S. Savarese. A. DelPozo, C. Niebles. Fei-Fei. Li, Spatial-temporal correlations for unsupervised action classification, in: 2008 IEEE Workshop on Motion and video Computing (WMVC), 2008, pp. 1-8.

[B41] H. Seo, P. Milanfar, Action recognition from one example, IEEE Transactions on Pattern Analysis and Machine Intelligence 33 (5) (2011) 867-882.

[B42] J. Kim, K. Grauman, Observe locally, infer globally: a space-time MRF for detecting abnormal activities with incremental updates, in: 2009 IEEE Conference on Computer Vision and Pattern Recognition (CVPR), 2009, pp. 2921-2928.

[B43] M. Javan Roshtkhari, M. D. Levine, Online dominant and anomalous behavior detection in videos, in: 2013 IEEE Conference on Computer Vision and Pattern Recognition (CVPR), 2013, pp. 2609-2616.

[B44] A. Mittal, A. Monnet, N. Paragios, Scene modeling and change detection in dynamic scenes: a subspace approach, Computer Vision and Image Understanding 113 (1) (2009) 63-79.

[B54] B. Zhao, L. Fei-Fei, E. P. Xing, Online detection of unusual events in videos via dynamic sparse coding, in: 2011 IEEE Conference on Computer Vision and Pattern Recognition (CVPR), Colorado, Colo., 2011, pp. 3313-3320.

[B57] V. Reddy, C. Sanderson, B. C. Lovell, Improved anomaly detection in crowded scenes via cell-based analysis of foreground speed, size and texture, in: 2011 IEEE Conference on Computer Vision and Pattern Recognition Workshops (CVPRW). 2011, pp. 55-61,

[B58] Y. Cong. J. Yuan, J. Liu, Sparse reconstruction cost for abnormal event detection, in: 2011 IEEE Conference on Computer Vision and Pattern Recognition (CVPR). 2011, pp. 3449-3456.

[B65] R. O. Duda, P. E. Hart, D. G. Stork, Pattern Classification, second ed., Wiley, New York. 2001.

[B66] B. Antic, B. Ommer. Video parsing for abnormality detection, in: 2011 IEEE international Conference on Computer Vision (ICCV), 2011, pp. 2415-2422.

[B68] M. J. Roshtkhari, M. D. Levine, Human activity recognition in videos using a single example, Image and Vision Computing 31, no. 11 (2013): 864-876.

What is claimed is:

1. A method of analyzing a video, the method comprising:
   sampling the video to generate a plurality of spatio-temporal video volumes, each spatio-temporal video volume corresponding to a three-dimensional volume around a pixel in the video comprising a two-dimensional area around the pixel and a depth in time, to capture local information in space and time around the pixel;
   clustering similar ones of the plurality of spatio-temporal video volumes to generate a low-level codebook of video volumes;
   analyzing the low-level codebook of video volumes to generate a plurality of ensembles of volumes surrounding pixels in the video; and
   clustering the plurality of ensembles of volumes by determining similarities between the ensembles of volumes, to generate at least one high-level codebook.

2. The method of claim 1, further comprising generating multiple high-level codebooks by repeating the analyzing and clustering using spatial and temporal contextual structures.

3. The method of claim 1, wherein the similarities between the ensembles of volumes are determined using a probabilistic model.

4. The method of claim 3, wherein the probabilistic model utilizes a star graph model.

5. The method of claim 1, further comprising removing non-informative regions from the at least one high-level codebook.

6. The method of claim 5, wherein the non-informative regions comprise at least one background region in the video.

7. The method of claim 1, wherein each ensemble of volumes is characterized by a set of video volumes, a central video volume, and a relative distance of each of the volumes in the ensemble to the central video volume.

8. The method of claim 1, wherein the clustering is performed using a spectral clustering method.

9. The method of claim 1, wherein the codebooks comprise bags of visual words.

10. The method of claim 9, wherein the high-level codebook provides a multi-level hierarchical bag of visual words.

11. The method of claim 1, further comprising performing visual event retrieval by using the at least one high-level codebook to make an inference from the video.

12. The method of claim 11, wherein the visual event retrieval comprises comparing the video to a dataset and retrieving at least one similar video.

13. The method of claim 12, wherein the comparison determines videos in the dataset comprising similar events to the video.

14. The method of claim 12, further comprising generating a similarity map between the video and at least one video stored in the dataset.

15. The method of claim 14, wherein the similarity map is generated using a pre-trained hierarchical bag of video words.

16. The method of claim 11, wherein the visual event retrieval comprises activity and event labeling.

17. The method of claim 16, further comprising generating a similarity map between the video and at least one video stored in the dataset.

18. The method of claim 17, wherein the similarity map is generated using a pre-trained hierarchical bag of video words.

19. The method of claim 11, wherein the visual event retrieval comprises performing abnormal and normal event detection.

20. The method of claim 19, further comprising performing a decomposition of contextual information in the at least one high-level codebook.

21. The method of claim 19, further comprising generating a similarity map between the video and the previously observed frames in the same video.

22. The method of claim 19, further comprising generating a similarity map between the video and at least one video stored in the dataset.

23. The method of claim 21, wherein the similarity map is generated using training data comprising a video database.

24. The method of claim 19, further comprising performing online model updating.

25. A non-transitory computer readable medium comprising computer executable instructions for analyzing a video, comprising instructions for:
sampling the video to generate a plurality of spatio-temporal video volumes, each spatio-temporal video volume corresponding to a three-dimensional volume around a pixel in the video comprising a two-dimensional area around the pixel and a depth in time, to capture local information in space and time around the pixel;
clustering similar ones of the plurality of spatio-temporal video volumes to generate a low-level codebook of video volumes;
analyzing the low-level codebook of video volumes to generate a plurality of ensembles of volumes surrounding pixels in the video; and
clustering the plurality of ensembles of volumes by determining similarities between the ensembles of volumes, to generate at least one high-level codebook.

26. A video processing system comprising a processor, an interface for receiving videos, and memory, the memory comprising computer executable instructions for analyzing a video, comprising instructions for:
sampling the video to generate a plurality of spatio-temporal video volumes, each spatio-temporal video volume corresponding to a three-dimensional volume around a pixel in the video comprising a two-dimensional area around the pixel and a depth in time, to capture local information in space and time around the pixel;
clustering similar ones of the plurality of spatio-temporal video volumes to generate a low-level codebook of video volumes;
analyzing the low-level codebook of video volumes to generate a plurality of ensembles of volumes surrounding pixels in the video; and
clustering the plurality of ensembles of volumes by determining similarities between the ensembles of volumes, to generate at least one high-level codebook.

* * * * *